INVENTORS:
JOHN M. BAILEY, JR.,
ROBERT L. ADAMS &
JULIUS AGIN
BY John V. Regan
Attorney INVENTORS:
JOHN M. BAILEY, JR.,
ROBERT L. ADAMS &
JULIUS AGIN
BY John V. Regan
Attorney INVENTORS:
JOHN M. BAILEY, JR.,
ROBERT L. ADAMS &
JULIUS AGIN
BY John V. Regan
Attorney INVENTORS:
JOHN M. BAILEY, JR.,
ROBERT L. ADAMS &
JULIUS AGIN
BY John V. Regan
Attorney INVENTORS:
JOHN M. BAILEY, JR.,
ROBERT L. ADAMS &
JULIUS AGIN
BY John V. Regan
Attorney INVENTORS:
JOHN M. BAILEY, JR.,
ROBERT L. ADAMS &
JULIUS AGIN
BY John V. Regan
Attorney INVENTORS:
JOHN M. BAILEY, JR.,
ROBERT L. ADAMS &
JULIUS AGIN
BY John V. Regan
Attorney INVENTORS:
JOHN M. BAILEY, JR.,
ROBERT L. ADAMS &
JULIUS AGIN
BY John V. Regan
Attorney INVENTORS
JOHN M. BAILEY, JR
ROBERT L. ADAMS &
JULIUS AGIN
BY John V. Regan
Attorney INVENTORS:-
JOHN M. BAILEY, JR.
ROBERT L. ADAMS &
JULIUS AGIN
BY John V. Regan
Attorney

| SCAN LINE | SCANNING LOCATION | PULSE ANALYZER OUTPUT | STROKE COUNTER STATE | STROKE TRACKER STATE OLD | STROKE TRACKER STATE NEW | STROKE DECODER |
|---|---|---|---|---|---|---|
| (1) SCM | --- ---- | ------ | 0001 | ABCD | ABCD | |
| (2) SC1 | $P_1$ T | NEW | 1000 | ABCD | ABCD | SEARCH FOR A |
| (3) SC1 | $P_2$ T | NEW | 0100 | ABCD | BACD | SEARCH FOR A |
| (4) SC3 | $P_3$ T | TRACK | 0100 | BACD | ABCD | SEARCH FOR B |
| (5) SC3 | $P_4$ T | TRACK | 0100 | ABCD | BACD | SEARCH FOR A |
| (6) SC5 | $P_5$ T | TRACK | 0100 | BACD | ABCD | SEARCH FOR B |
| (7) SC5 | $P_6$ T | TRACK | 0100 | ABCD | BACD | SEARCH FOR A |
| (8) SC5 | $P_7$ L | FORK | 0010 | BACD | CBAD | SEARCH FOR A |
| (9) SC7 | $P_8$ T | TRACK | 0010 | CBAD | ACBD | SEARCH FOR B |
| (10) SC7 | $P_9$ T | TRACK | 0010 | ACBD | BACD | SEARCH FOR C |
| (11) SC7 | $P_{10}$ T | TRACK | 0010 | BACD | CBAD | SEARCH FOR A |
| (12) SC9 (13) SC11 (14) SC13 | SAME AS SCAN SC7 | | | | | |
| (15) SC19 | $P_{17}$ T (DELAYED) | TRACK | 0010 | CBAD | ACBD | SEARCH FOR B |
| (16) SC14 | $P_{18}$ L (DELAYED) | JOIN | 0010 | ACBD | B'ACD | SEARCH FOR C |
| (17) SC14 | $P_{21}$ T | TRACK | 0010 | B'ACD | CB'AD | SEARCH FOR A |
| (18) SCM | $P_{20}$ T (DELAYED) | END | 0010 | CB'AD | B'ACD | SEARCH FOR C |
| (19) SCM | $P_{21}$ T (DELAYED) | END | 0010 | B'ACD | CB'AD | SEARCH FOR A |
| (20) 1ST ARTIFICIAL VIDEO PULSE | -------- | END | 0010 | CB'AD | B'A'CD | SEARCH FOR C |
| (21) 2ND ARTIFICIAL VIDEO PULSE | -------- | END | 0010 | B'A'CD | C'B'A'D | ALL STROKES RETIRED |

Fig. 13.

INVENTORS:-
JOHN M. BAILEY, JR.,
ROBERT L. ADAMS &
JULIUS AGIN
BY John V. Regan
Attorney INVENTORS
JOHN M. BAILEY, JR.,
ROBERT L. ADAMS &
JULIUS AGIN
BY John V. Regan
Attorney INVENTORS
JOHN M. BAILEY, JR.
ROBERT L. ADAMS &
JULIUS AGIN
By John V. Regan
Attorney INVENTORS:
JOHN M. BAILEY, JR.,
ROBERT L. ADAMS &
JULIUS AGIN
BY John V. Regan
Attorney INVENTORS:
JOHN M. BAILEY, JR.,
ROBERT L. ADAMS &
JULIUS AGIN
BY John V. Regan
Attorney INVENTORS:
JOHN M. BAILEY, JR.,
ROBERT L. ADAMS &
JULIUS AGIN
BY John V. Regan
Attorney INVENTORS
JOHN M. BAILEY, JR.
ROBERT L. ADAMS &
JULIUS AGIN
BY John V. Regan
Attorney Fig. 21A. TRUTH TABLE

| COMMON FEATURES | DISTINGUISHING FEATURES | | | | | | |
|---|---|---|---|---|---|---|---|
| | | | GROUP I | | | | |
| | | I | | | | | |
| | WA | 1 | | | | | |
| | LTC | 0 | | | | | |
| | LVL | 1 | | | | | |
| | | | GROUP II | | | | |
| 1S LVL LVR | | H | M | N | U | W | 4 |
| | SBC | 0 | 0 | 0 | 1 | 0 | 1 |
| | LBC | 1 | 1 | X | 0 | X | 0 |
| | 1SH | 1 | 0 | 0 | 1 | 0 | 0 |
| | 1SD | 0 | 1 | 1 | 0 | 0 | X |
| | 1SU | 0 | 1 | 0 | 0 | 1 | X |
| | | | GROUP III | | | | |
| 1S | | J | L | T | Y | V | |
| | LVL | 0 | 1 | 0 | 0 | 0 | |
| | LVM | 0 | X | 1 | 1 | 0 | |
| | LVR | 1 | 0 | X | X | 0 | |
| | STC | X | 0 | 1 | 0 | 0 | |
| | | | GROUP IV | | | | |
| 2S 2FK 2JN | | A | D | O | P | 0 (NUMERIC) | |
| | SBC | 0 | 1 | 1 | 0 | 1 | |
| | LBC | 0 | 0 | 0 | 1 | 0 | |
| | TSQ | 0 | 1 | 0 | 1 | X | |
| | BSQ | 1 | 1 | 0 | 1 | X | |
| | WB | 0 | 0 | 0 | X | 1 | |
| | | | GROUP V | | | | |
| 2S 2FK $\overline{2JN}$ | | C | F | K | 4 | | |
| | SBC | 1 | 0 | X | 1 | | |
| | LBC | 0 | 1 | 0 | 0 | | |
| | 1SH | X | 1 | 0 | 0 | | |
| | 1SU | X | 0 | 1 | X | | |
| | 2SD | 0 | 0 | 1 | X | | |
| | LVR | 0 | 0 | 0 | 1 | | |
| | WA | 0 | X | X | X | | |
| | | | GROUP VI | | | | |
| 2S $\overline{2FK}$ 2JN | | 1 | 7 | | | | |
| | LTC | 1 | X | | | | |
| | SBC | 1 | 0 | | | | |

INVENTORS
JOHN M. BAILEY, JR.
ROBERT L. ADAMS &
JULIUS AGIN
BY John V. Regan
Attorney

Fig. 21B.

| COMMON FEATURES | | | DISTINGUISHING FEATURES | | | | |
|---|---|---|---|---|---|---|---|
| | | | | GROUP VII | | | |
| 3S | $\overline{2FK}$ | 2JN | | 2 | Z | X | |
| | | | 3FK | 1 | 1 | 1 | |
| | | | 3JN | 0 | 0 | 0 | |
| | | | SBC | 1 | 1 | X | |
| | | | STC | X | X | 0 | |
| | | | TSQ | X | 1 | 1 | |
| | | | 1SU | 1 | 0 | X | |
| | | | 1SH | 0 | 1 | 0 | |
| | | | 1SD | 0 | 0 | 1 | |
| | | | WA | X | 0 | 0 | |
| | | | | GROUP VIII | | | |
| | | | | S | 5 | E | 6 |
| 3S | 2FK | $\overline{2JN}$ | 3FK | 0 | 0 | 1 | 1 |
| | | | 3JN | 1 | 1 | 0 | 1 |
| | | | BCC | 0 | 1 | X | X |
| | | | | GROUP IX | | | |
| 3S | 2FK | 2JN | | Q | R | 9 | B |
| | | | 3FK | 1 | 1 | 0 | 1 |
| | | | 3JN | 0 | 0 | 1 | 1 |
| | | | BCC | 0 | 1 | X | X |
| | | | | GROUP X | | | |
| 3S | $\overline{2FK}$ | $\overline{2JN}$ | | G | | | |
| | | | | GROUP XI | | | |
| 4S | | | | 8 | 8 | 3 | 3 |
| | | | WC | 0 | 1 | 1 | 1 |
| | | | 2JN | 1 | 1 | 1 | 1 |
| | | | 3FK | 1 | 1 | 1 | 0 |
| | | | 3JN | X | 1 | 0 | 1 |

INVENTORS
JOHN M. BAILEY, JR.
ROBERT L. ADAMS &
JULIUS AGIN
BY John V. Regan
Attorney 3,290,650

CHARACTER READER UTILIZING STROKE AND CAVITY DETECTION FOR RECOGNITION OF CHARACTERS

John M. Bailey, Jr., Barrington, Robert L. Adams, Haddonfield, and Julius Agin, Cherry Hill, N.J., assignors to Radio Corporation of America, a corporation of Delaware Filed May 13, 1963, Ser. No. 279,842
12 Claims. (Cl. 340—146.3)

*Table Of Contents*

| Topics | Col. |
|---|---|
| Introduction | 1 |
| Description of Drawings | 2 |
| General Description of Character Reader | 3 |
| Character Scanning | 4 |
| Character Features | 4 |
| Stroke Features | 5 |
| Cavity Features | 6 |
| Width Features | 7 |
| Additional Objects | 7 |
| Feature Recognition Circuits | 7 |
| General Description | 7 |
| Width Feature Detectors | 8 |
| Stroke Feature Detectors | 8 |
| Cavity Feature Detectors | 9 |
| Abbreviations | 9 |
| Detailed Description of Feature Recognition Circuits | 10 |
| Character Control, etc. | 10 |
| Stroke Feature Detectors | 13 |
| Pulse Analyzer | 13 |
| Long Vertical Stroke Position Detector | 15 |
| Stroke Tracker Control | 16 |
| Stroke Counter and Tracker | 17 |
| Stroke Decoders | 18 |
| Stroke Direction Analyzers | 20 |
| Operation of Stroke Feature Detectors | 21 |
| Stroke Direction Analyzer Operation | 26 |
| Cavity Feature Detectors | 27 |
| Top Cavity Detector | 27 |
| Operation of Top Cavity Detector | 29 |
| Bottom Cavity Detector | 31 |
| Operation of Bottom Cavity Detector | 32 |
| Feature Output Buffer Register and Control | 34 |
| General Description | 34 |
| Feature Output Buffer Register Control | 35 |
| Feature Output Buffer Register | 35 |
| Operation of Feature Output Buffer Register | 36 |
| Character Determining Circuit | 37 |
| General Description | 37 |
| Detailed Description | 38 |
| Operation | 40 |
| Summation | 41 |

INTRODUCTION

This invention relates to character readers, and more particularly to character recognition methods and circuits for use in such readers.

Certain character readers operate to scan characters printed on a document and recognize the characters by the distinctive sets of video signals produced when different characters are scanned. The character reader then translates the recognized characters into a digitalized code representing the characters, for storing in a storage medium or for further processing by a computer.

Many presently available character readers are designed to read "turn around" documents, that is, documents produced by a computer-operated printer and thereafter returned to the character reader-computer combination. Such character readers generally contain relatively simple recognition systems capable of reading numeric characters only. Furthermore, such character readers usually are not capable of reading characters from fonts differing from the type in the printer for which the character reader was designed.

For maximum utility, a character reader should be capable of reading alpha-numeric characters (i.e., both alphabetic and numeric) which are printed on original input documents by various makes of printers. Furthermore, the character reader should also be capable of reading characters from different fonts rather than requiring a standardized font for all the equipments supplying the source documents to the character reader.

Accordingly, it is an object of this invention to provide a new and improved character reader capable of reading alpha-numeric characters.

It is another object of this invention to provide a new and improved character reader capable of reading alpha-numeric characters printed on original input documents.

It is another object of this invention to provide a new and improved character reader which is programmable to read alpha-numeric characters from a variety of different fonts.

A character reader in accordance with the invention utilizes the different topographical features exhibited by different alpha-numeric characters to differentiate one character from another. The major topographical features relied upon are stroke features and cavity features. The strokes of a character are the different portions into which the outline trace of the character may be divided. The cavities of a character are the partially enclosed areas formed at the top and/or bottom of some characters by portions of the outline trace of the character.

In an embodiment of the invention, alpha-numeric characters printed on a document are scanned successively by a plurality of vertical scans to derive video signals representing the features of the characters. The video signals are analyzed to derive the stroke and cavity features of the characters. The stroke features detected from the video signals include the number of strokes occurring in a character as well as their beginning, ending, direction, and relative positioning in a character. The cavity feature detected includes the occurrence and size of the cavities formed at the top and/or bottom of some characters (such as the top cavity in a "U" and the top and bottom cavities in an "M"). Additional cavity features detected are a comparison of the top-to-bottom cavity sizes, and the squareness of the top and bottom left corners of the characters. Finally, an additional feature, the width of the characters is also detected.

The feature signals derived from each character are stored pending completion of the scanning of the entire character and are then compared against a memory of stored features to ascertain the identity of the characters. Upon identification, the character reader produces a coded output signal representing the character for further processing by a computer.

The novel features which are considered to be characteristic of this invention are set forth with particularity in the appended claims. The invention itself, however, both to its organization and method of operation, as well as to additional objects and advantages thereof, will best be understood from the following description when read in conjunction with the accompanying drawings in which:

FIGURE 1 is a schematic block diagram of a character reader embodying the invention;

FIGURE 2, comprising FIGURES 2*a*, 2*b*, 2*c* and 2*d*, as well as FIGURE 3, comprising FIGURES 3*a*, 3*b* and 3*c*, are diagrammatic representations of the scanning of individual characters by the character reader in FIGURE 1;

FIGURE 13 is a tabular representation of the tracking of strokes in the stroke tracker of FIGURE 9;

FIGURES 21*a* and 21*b*, is a truth table utilized to recognize alpha-numeric characters.

GENERAL DESCRIPTION OF CHARACTER READER

Figures 1, 2A, 2B, 3C:
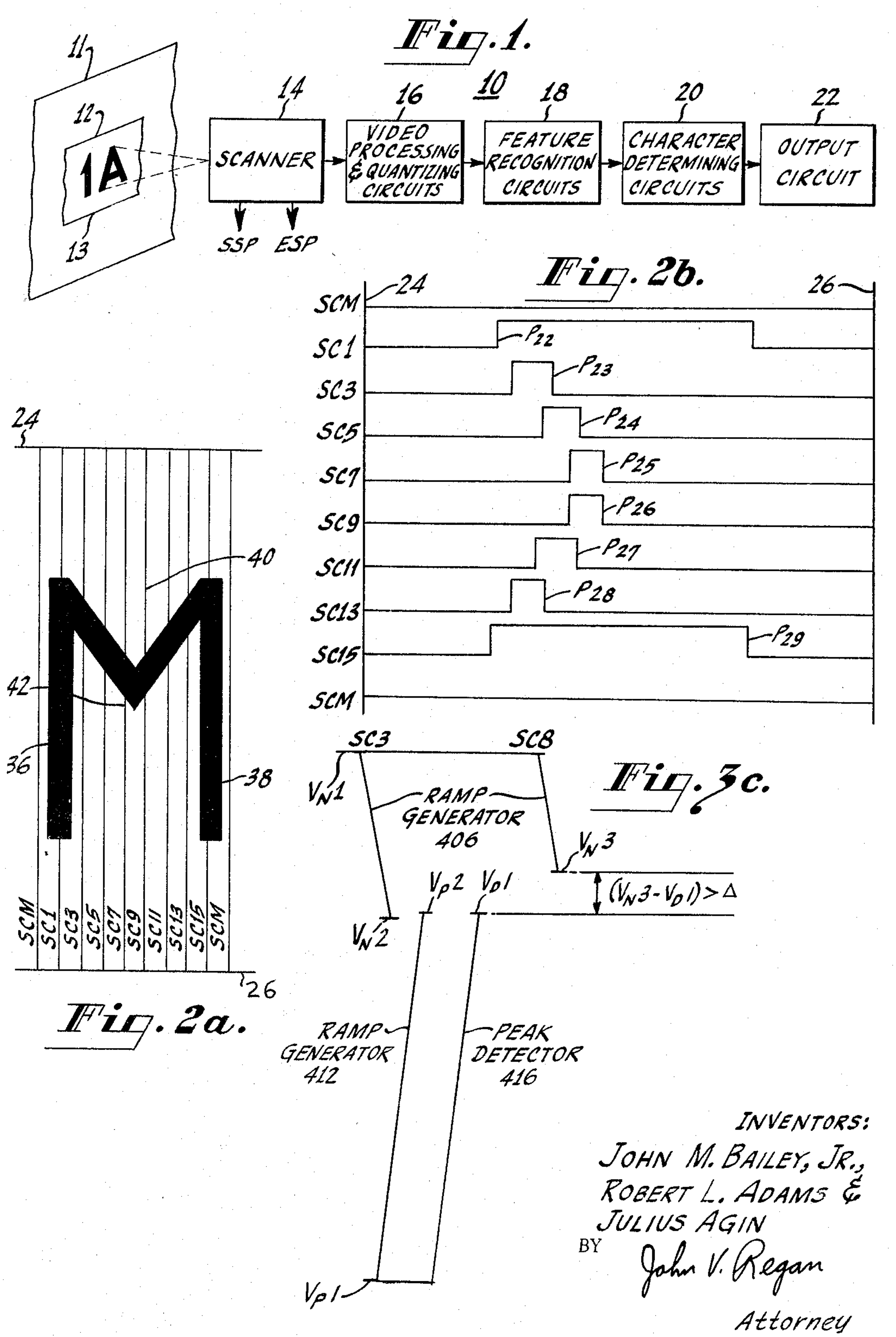

Referring to FIGURE 1, a schematic block diagram of a character reader 10 is illustrated. The character reader 10 includes a transport mechanism or document handling device 11 for transporting a document 12 having alpha-numeric characters 13 printed thereon. The mechanism 11 positions the document 12 so that the characters 13 are scanned by an electro-optical pickup device or scanner 14. The scanner 14 may comprise a photoconductive camera tube system such as a vidicon tube system or a flying spot scanner system. The characters 13 are normally printed in horizontal lines on the document 12 and the characters are scanned successively by a plurality of vertical scan lines which begin at the left of a character and end at the right thereof.

The output or video signals derived from the scanner 14 include signals from which the features of the characters are derived. The video signals are applied to a video processing and quantizing circuit 16 which processes the video signals to provide uniform amplitude pulses having fast rise and fall times. A representative scanner 14 and quantizing circuit 16 has been disclosed in a copending application for Seymour Klein entitled "Optical Scanning System for Character Reader," filed November 15, 1962, Serial No. 237,949, and assigned to the same assignee as the present application.

The quantized video signals are applied to a feature recognition circuit 18 which extracts and stores the desired feature signals. The feature signals stored in the recognition circuit 18 are applied to a character determining circuit 20 which recognizes the various feature signals as a particular character. The character determining circuit 20 produces a digitalized code representing the character when the character is recognized. The coded output of the character determining circuit 20 is applied to an output circuit or computer 22 for further processing.

CHARACTER SCANNING

In scanning a character, such as the alphabetic character "M" or numeric character "2" shown in FIGURES 2 and 3, respectively, the electron beam in the scanner 14 is deflected vertically from top to bottom while the document 12 is simultaneously moved at a uniform velocity from right to left by the transport mechanism 11. Thus, the characters on the document are scanned in succession by a plurality of scans which form an orthogonal scanning pattern or raster. The scanning cycle of the scanner 14 comprises a relatively slow vertical trace scan starting from an initial position 24 above the character being scanned (FIGURES 2 and 3) and ending at a terminal position 26 below the character. The trace scan is followed by a rapid retrace back to the initial position 24. The scanner 14 is blanked by periodically recurring blanking pulses so that no feature signals are produced during the retrace interval.

In one embodiment of a character reader constructed in accordance with the invention, the scanning rates were such that the document 12 horizontally moved past the scanner 14 at the rate of 100 inches per second and the characters were vertically scanned by a scanner 14 having a period of 50 microseconds ($\mu$s.), 6 $\mu$s. of which comprised the retrace time. The horizontal scanning need not be mechanical, i.e., by document movement, but may also be by deflection of the electron scanning beam, similar to the vertical deflection.

The characters "M" and "2" in FIGURES 2 and 3 are shown sliced by a plurality of vertical lines which represent the vertical scans of these characters. A normal width typewritten capital letter, including the white margin surrounding the letter, occupies twenty vertical scans of the scanner 14, or 1 milli-second of scanning time. Approximately sixteen of the twenty scans intercept the outline trace of the character. However, for the purpose of simplifying both the drawing and the description thereof, only ten of the twenty vertical scans are actually shown in FIGURES 2 and 3. In some fonts, such as those utilized in some electric typewriters, the numeric characters are narrower than the alphabetic characters. However, in FIGURES 2 and 3, the letter "M" is shown as substantially the same width as the numeral "2" for convenience. Two of the vertical scans, referenced SCM, scan only the margin of the characters, while the remaining eight, referenced SC1, SC3, etc., intercept the outline trace of the characters. The normal height of a typewritten capital letter is one half the height of a vertical scan line of the scanner 14, or occupies 22 $\mu$s. of a vertical scan. Thus, the scanner 14 overscans the characters appreciably. With such an overscan, a succession of characters printed in lines on a document may be considerably misaligned but will still be scanned.

Video pulses are generated by the scanner 14 during the trace portion of the scanning cycle when the outline trace of the character is intercepted, because of the contrast between the dark characters and the light document, assuming the characters are printed on a light background. The system can also be used to read light characters printed on a dark background by suitably adapting the two video circuits. The video pulses from reading the dark characters will be referred to herein as black pulses throughout the specification. Conversely, the absence of video will be referred to as white level or white pulses. The output signals from the scanner 14 are represented in FIGURES 2 and 3 as a series of lines containing pulses $P_1$, $P_2$, etc., representing the interception of the outline trace of the character. The pulses in FIGURES 2 and 3 are shown as quantized pulses after processing by the quantizer 16.

CHARACTER FEATURES

The character features extracted from the quantized video signals by the feature recognition circuits 18 are the stroke features, the cavity features, and the width features exhibited by the characters.

*Stroke features*

The stroke features include the number of strokes counted; the presence and horizontal positioning within the character of long vertical strokes; as well as the beginning, ending, positioning, and direction (UP, DOWN, HORIZONTAL) of all other strokes. A stroke may begin as a completely NEW stroke or as a FORK from a previously existing stroke, and may END by itself or end as a JOIN to another stroke. The outline trace of the numeral "2" in FIGURE 3*a* includes three strokes, a first or top stroke 30, a second or middle diagonal stroke 32, and a third or bottom horizontal stroke 34. The top and middle strokes 30 and 32 begin as NEW strokes while the bottom stroke 34 begins as a FORK from the previously existing middle stroke 32. The top and bottom strokes 30 and 34 END by themselves while the middle stroke 32 ends as a JOIN to the top stroke 30. All top strokes begin as NEW strokes and END by themselves. The direction of the middle stroke 32 is UP while the direction of the bottom stroke 34 is HORIZONTAL. As will be explained later, the direction of the top stroke 30 is detected as UP.

Figure 3A:
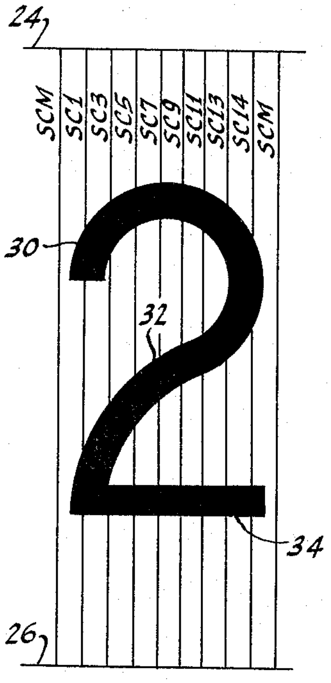

The above stroke features are extracted from the quantized video signals by the feature recognition circuits 18, as will now be briefly described. It is assumed in this description that the ten scans labelled in FIGURE 3*a* are the only ones that occur in scanning the numeral "2." In FIGURE 3*a*, the scan SCM does not intercept the outline trace of the numeral "2," and therefore does not contain any video pulses. The scan SC1 cuts a portion of the top stroke 30 and the bottom left corner of the character and produces pulses $P_1$ and $P_2$, respectively. The pulses $P_1$ and $P_2$, occurring for the first time, indicate that two NEW strokes are detected and are counted. Thus, a stroke is effectively defined by the character reader as a black video pulse or a black crossing occurring in the video signal. The feature recognition circuits 18 tag the NEW strokes with labels, e.g., stroke (A) and stroke (B), and tracks their occurrence throughout the remaining scans of the character.

The scan SC3 produces pulses $P_3$ and $P_4$. The pulses $P_3$ and $P_4$ overlap, respectively, the pulses $P_1$ and $P_2$ in the scan SC1 so that the feature recognition circuits 18 recognize that the strokes (A) and (B) (strokes 30 and 32, respectively), have occurred again. This is accomplished by comparing the video signals in one scan with the video signals in the immediately preceding scan, which has been delayed one full vertical scan period. Thus, strokes "A" and "B" have repeated themselves and TRACK "A" and TRACK "B" signals are produced.

The scan SC5 produces pulses $P_5$, $P_6$ and $P_7$ indicating that the portion of the outline trace of the character being read has three black crossings or three strokes. The pulse $P_5$ causes a TRACK "A" signal to be generated while the $P_6$ causes a TRACK "B" signal to be generated. However, the video signal becomes white between the pulses $P_6$ and $P_7$, whereas in the previous scan, the corresponding portion of the video signal was an uninterrupted black level. This indicates that a NEW stroke began as a FORK away from another previously existing stroke. Therefore, a third stroke is counted and is tagged stroke (C) (i.e., stroke 34).

The scans SC7 through SC13 produce TRACK signals for the (A), (B) and (C) strokes whenever they occur. The next scan is labelled SC14 for reasons that will be apparent subsequently. In the scan SC14, two pulses $P_{20}$ and $P_{21}$ occur whereas in the previous scan SC13 three pulses $P_{17}$, $P_{18}$ and $P_{19}$ occurred. This indicates to the feature recognition circuits 18 that a stroke ended as a JOIN to another stroke, i.e., stroke 32 ended by merging into stroke 30. TRACK (A) and JOIN (B) signals are therefore produced. A TRACK (C) signal is later produced by the pulse $P_{21}$.

In the scan SCM, the scanner 14 is once again scanning the margin between characters. No video pulses are detected so that END (A) and END (C) signals are produced.

As will be explained in more detail later, the feature recognition circuits 18 ignore certain stroke signals the first time they are detected as ending. The strokes are artificially reproduced by an EXTEND signal so that the tracking of the stroke may continue in case the END was not an actual ending of the stroke but merely a break in the stroke caused by a misprinting of the character.

Concurrently, the direction of each of the strokes (A), (B) and (C) is also detected by the feature recognition circuits 18. The scanning time, between the start of a vertical scan and the detection of a pulse defining the stroke, is measured periodically for each stroke to determine if a stroke goes UP, DOWN or remains HORIZONTAL. Thus, the scanning time, and consequently the distance, between the start of a scan and the pulses $P_2$, $P_4$, $P_6$, etc., of stroke (B) in FIGURE 3*a* (i.e., stroke 32) indicate that stroke (B) goes UP. Similar measurements are made for strokes (A) and (C).

The outline trace of the capital letter "M" in FIGURE 2*a* includes stroke features not occurring in the numeral "2" of FIGURE 3*a*. The character "M" includes long vertical left (LVL) and right (LVR) strokes 36 and 38, respectively. The occurrence of long vertical strokes in a character is detected by the relatively long video pulses $P_{22}$ and $P_{29}$ occurring in scans SC1 and SC15 (FIGURE 2*b*) when the strokes 36 and 38 of the outline trace of the character "M" are scanned. The detection of the long pulses indicates that a character contains a long vertical stroke. The scans in which such long pulses occur indicate whether the long vertical stroke appears in the left, right or middle portions of a character.

Even though both left and right long vertical strokes are recorded as occurring in the charatcer "M," the character is counted as a one stroke character since only one video pulse or one black crossing occurs in each scan of the character. The one stroke would be tagged stroke "A" in the scan SC1 and TRACK "A" signals would be generated in the remaining scans until an END "A" is produced in scan SCM. The direction of the one stroke in the character "M" would be recorded as both DOWN and UP.

*Cavity features*

The cavity features detected include the size of the partially enclosed areas or cavities formed at the top and/or bottom of characters by portions of the outline trace of the characters, such as the top cavity 40 and the bottom cavity 42 formed in the character "M" of FIGURE 2*a*. The top-to-bottom cavity sizes are compared and the squareness of a corner, such as top square corner in the character "F" and the top and bottom square corners in the character "B," are detected. The size of a bottom cavity at the center of a character is also measured.

The area of the top cavity 40 of the character "M" in FIGURE 2*a* is detected by measuring the amount of time spent in scanning below the highest black in a character, such as the top of the left stroke 36, but above the outline trace of the character. Thus, the leading edge of the pulse $P_{22}$ in scan SC1 of FIGURE 2*b* is utilized as a reference point and the time spent in scanning below this point in each scan, but above the leading edges of the pulses $P_{23}$, $P_{24}$, etc., is a measurement of the size of the top cavity 40.

With the above method of measuring top cavities, the area of the numeral "2" in FIGURE 3*a* below and to the left of the peak black point of pulse $P_8$ in scan SC7 would also be measured as a top cavity. However, the recognition of the numeral "2" would not be predicated on the small top cavity thereby detected.

Similarly, the area of the bottom cavity 42 of the character "M" in FIGURE 2*a*, is ascertained by utilizing the lowest black point as a reference point, i.e., the bottom of the left stroke 36, and measuring the scanning time above this level but below the outline trace of the character "M."

The areas of the top and bottom cavities are also compared and a feature signal is generated if the top cavity area exceeds that bottom cavity area. Additionally, the top and bottom cavity feature detectors measure the squareness of the top and bottom left corners, respectively. Finally, the bottom cavity at the center of a character is also measured.

*Width features*

The overall width of the characters are measured by counting the number of scans from the start of scanning a character to the end of scanning the character. Additionally, the measurement of the width of a character after the detection of a long vertical left (LVL) stroke helps to differentiate an alphabetic "B" from a numeral "8."

ADDITIONAL OBJECTS

Accordingly, it is an additional object of this invention to provide a character reader which detects the manner of the beginning and ending of strokes in a character.

It is still another object of this invention to provide a character reader which detects the beginning of a stroke which forks away from a previously existing stroke in a character and the ending of a stroke which joins another stroke in a character.

It is a further object of this invention to provide a character reader which counts and tags each stroke as it is detected in a character and then tracks the reoccurrence of the strokes without confusion throughout the remaining scans of the character.

It is still a further object of this invention to provide a character reader which detects the directions taken by individual strokes in a character.

It is another object of this invention to provide a character reader which measures the size of a cavity formed at the top of character by portions of the outline trace of the character.

It is still another object of this invention to provide a character reader which measures the size of a cavity formed at the bottom of a character by portions of the outline trace of the character.

It is a further object of this invention to provide a character reader which ascertains from the feature signals which of the strokes detected is the first or top stroke of a character.

FEATURE RECOGNITION CIRCUITS.—GENERAL DESCRIPTION

Figure 4:
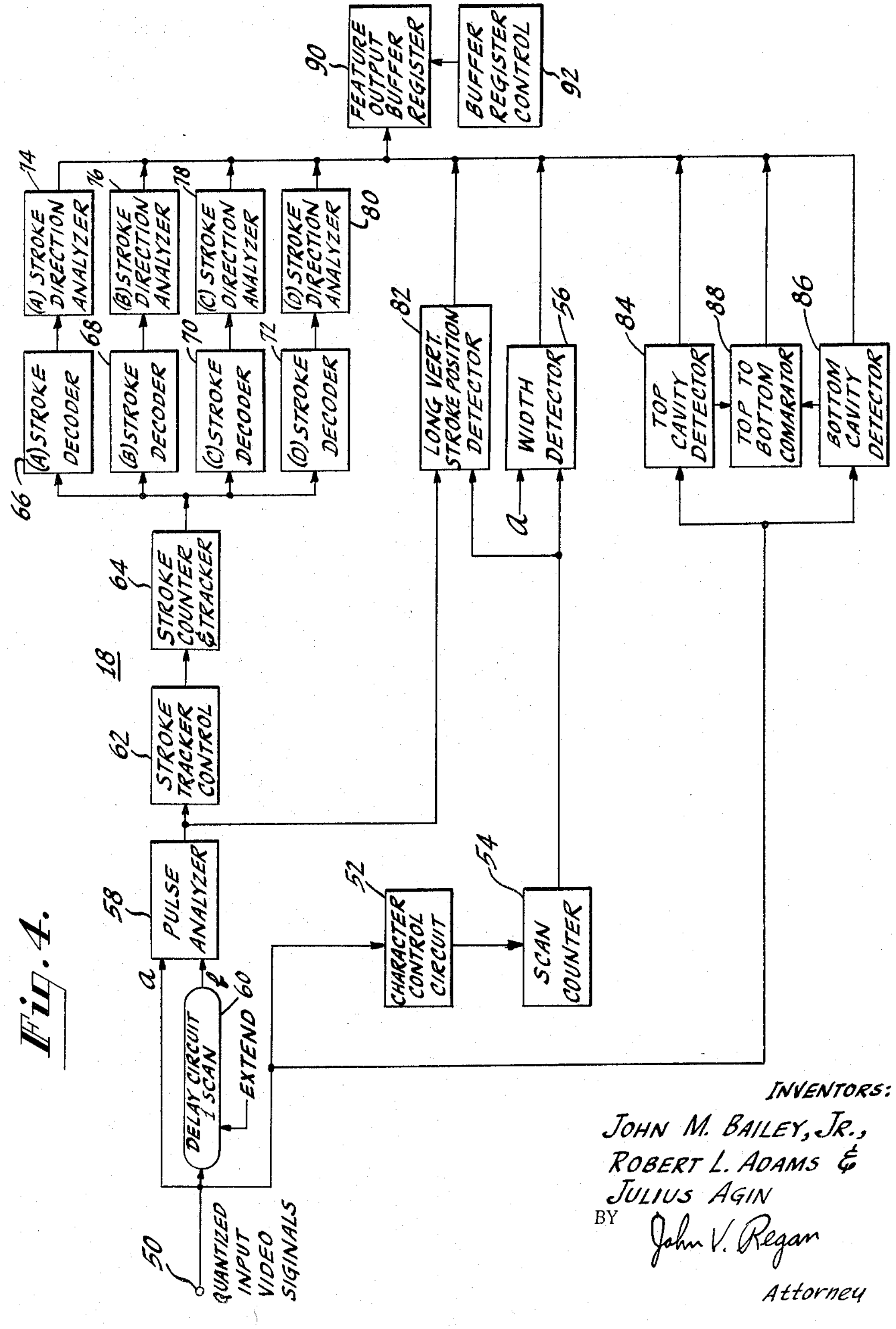
FIGURE 4 is a block diagram of the feature recognition circuits of FIGURE 1.

Referring now to FIGURE 4, there is illustrated an overall block diagram of the feature recognition circuits 18 of the character reader 10. For simplicity, all of the interconnections between the various blocks are not shown in FIGURE 4. The feature recognition circuits 18 include an input video signal terminal 50 to which are applied quantized video signals derived from the video processing and quantizing circuits 16. Video signals are applied from the terminal 50 to a character control circuit 52 which detects the beginning of the scanning of a character and the ending thereof. A scan counter 54 is coupled to the character control circuit 52 to count each scan after the start of scanning a character begins. The remaining feature detectors in the character recognition circuits 18 are divided into width feature detectors, stroke feature detectors, and cavity feature detectors.

*Width feature detectors*

A width feature detector 56 is coupled to the scan counter 54 to record the overall width of the characters scanned as determined by the number of scans required to scan the characters completely. The width detector 56 is also coupled to the input terminal 50 so that the direct video signal (*a*) is applied thereto so as to detect long vertical strokes in a character being scanned. The width of the character after the detection of a long vertical stroke is then effectively measured.

*Stroke Feature Detectors*

The video signals from the input terminal 50 are applied directly to one input of a black crossing or pulse analyzer 58, as well as through a delay circuit 60 to the other input of the analyzer 58. The delay circuit 60 includes multiple sections so that an EXTEND signal can be applied to an intermediate part thereof so as to artificially create a video signal, as will be explained later. The delay circuit 60 introduces a time delay into a signal applied to its input terminal of exactly one vertical scan interval, so that video signals from both the present or direct scan (*a*) and the previous or delayed scan (*b*) are applied coincidentally to the pulse analyzer 58. The pulse analyzer 58 compares the direct (*a*) and delayed (*b*) scan signals to generate signals denoting the beginning of a stroke as either a NEW stroke or a FORK, and denotes the termination of a stroke as a JOIN to another stroke or as an END by itself. The analyzer 58 recognizes the reoccurrences of strokes previously encountered by producing TRACK signals. In addition to the above signals, the pulse analyzer 58 also generates a signal denoting the occurrence of a long vertical stroke in a character.

Signals representing the detection of NEW, TRACK, FORK, JOIN and END stroke information are applied to a stroke tracker control circuit 62. The stroke tracker control circuit 62 functions to provide the necessary signals for the operation of a stroke counter and tracker circuit 64. The stroke tracker circuit 64 operates to count and "tag" with a differently coded label each of the NEW and FORK strokes detected in the pulse analyzer 58. The stroke tracker 64 associates the correct tag with its corresponding stroke each time the stroke is detected by the analyzer 58 so that the stroke is TRACKED from scan-to-scan. The stroke tracker 64 also utilizes the JOIN and END signals to alter the tags on the strokes to denote the ending of a stroke.

The stroke tracker circuit 64 directs the stroke information derived from the pulse analyzer 58 to four stroke decoder circuits 66, 68, 70 and 72, arbitrarily labelled stroke (A), stroke (B), stroke (C) and stroke (D) decoders, respectively. The labels (A), (B), (C) and (D) correspond one-for-one to the tags assigned to the strokes by the stroke tracker 64. The four tags (A), (B), (C), (D) represent the most number of strokes that can be counted in a character by the stroke tracker 64. In most fonts, no more than four strokes occur in any character. The stroke decoders 66, 68, 70 and 72 operate to extract and store the information that a stroke began as a FORK, ended as a JOIN, etc. The stroke decoders also generate an EXTEND signal which is applied to the delay circuit 60 to artificially generate a video signal if an END occurs before the sixteenth scan of a character. The stroke decoders 66, 68, 70 and 72 are coupled, respectively, to stroke direction analyzers 74, 76, 78 and 80 to apply the remaining stroke information thereto. The stroke direction analyzers 74, 76, 78 and 80, respectively, analyze and record the direction (UP, DOWN, HORIZONTAL) of each of the strokes "A" through "D."

The pulse analyzer 58, as well as the scan counter 54, are also coupled to a long vertical stroke position detector 82. The pulse analyzer 58 generates a long vertical stroke signal but does not indicate its position within the character. By counting the scan in which the long vertical stroke occurred, the horizontal position within the character of the long vertical stroke is ascertained and recorded in the detector 82.

*Cavity Feature Detectors*

The quantized video signals from the terminal 50 are also applied directly to top and bottom cavity detectors 84 and 86, respectively. The top cavity detector 84 measures the size of the top cavity in the characters being scanned as well as the squareness of the top left corner of the characters. Similarly, the bottom cavity detector 86 measures the size of the bottom cavity as well as the squareness of the bottom left corner of the characters being scanned. The bottom cavity detector 86 also measures the size of the bottom cavity in the center of a character. The output signals from the top and bottom cavity detectors 84 and 86 are applied to a top-to-bottom cavity comparator 88.

Upon the completion of the scanning of a character, the signals stored in the various stroke and cavity detectors, as well as in the width detector 56, are transferred to a feature output buffer register 90. The transfer of the feature signals to the buffer register 90, as well as the identification of which of the strokes (A), (B), (C) or (D) is actually the top or first stroke in a character is controlled by a buffer register control circuit 92.

ABBREVIATIONS

In order to facilitate the understanding of the detailed description of the feature recognition circuits, the following is a list of many of the abbreviations used in both the drawings and the specification.

SSP—Start of scan pulse
ESP—End of scan pulse
MOS—Memory operating signal
SFR—Start feature readout
SCP—Start of character pulse
ECP—End of character pulse
FF—Flip-flop
O.S. MULTI—One-shot multivibrator
μs.—Microseconds
SC1—Scan count of one
LVS—Long vertical stroke
LVLP—Long vertical left pulse
LVL—Long vertical left stroke
LVM—Long vertical middle stroke
LVR—Long vertical right stroke
CT1—Count of one
ASD—A stroke down
ASH—A stroke horizontal
ASU—A stroke up
ASJ—A stroke join
ASF—A stroke fork
2SH—Second stroke horizontal
2SU—Second stroke up
2SD—Second stroke down
2SJ—Second stroke join
2SF—Second stroke fork
TSQ—Top square corner
BSQ—Bottom square corner
STC—Small top cavity
LTC—Large top cavity
SBC—Small bottom cavity
LBC—Large bottom cavity
WA—Width A
WB—Width B
WC—Width C
1S—One stroke counted
SRC—Start recognition cycle

DETAILED DESCRIPTION OF FEATURE RECOGNITION CIRCUITS

The block diagrams of the individual feature recognition circuits 18 are shown in FIGURES 5 through 18. The logic circuits in the feature recognition circuits 18 are made up of a plurality of flip-flops, one-shot multivibrators, shift registers, counters, gates, etc., all of which may be of conventional or known design. The notation used in the drawings for the terminals of the flip-flops is S (set) for the set input terminal, R (reset) for the reset input terminal, "1" for the set output terminal and "0" for the reset output terminal. The one-shot multivibrators are circuits having an astable state of operation to which they are triggered by an input pulse. The multivibrators remain in their astable operating state for a predetermined time interval and produce an output level during this time. The multivibrators automatically return to their stable state at the end of the interval. The operating time interval is included on the drawing for each multivibrator. Similarly, the time delays introduced by the various delay circuits are also recorded on the drawings. Inhibit terminals in the various circuits are illustrated as small circles in the drawings and indicate that the circuits are disabled if a positive-going ("one") input signal is applied to these terminals.

CHARACTER CONTROL, SCAN COUNTER, AND WIDTH DETECTOR

Figure 5:
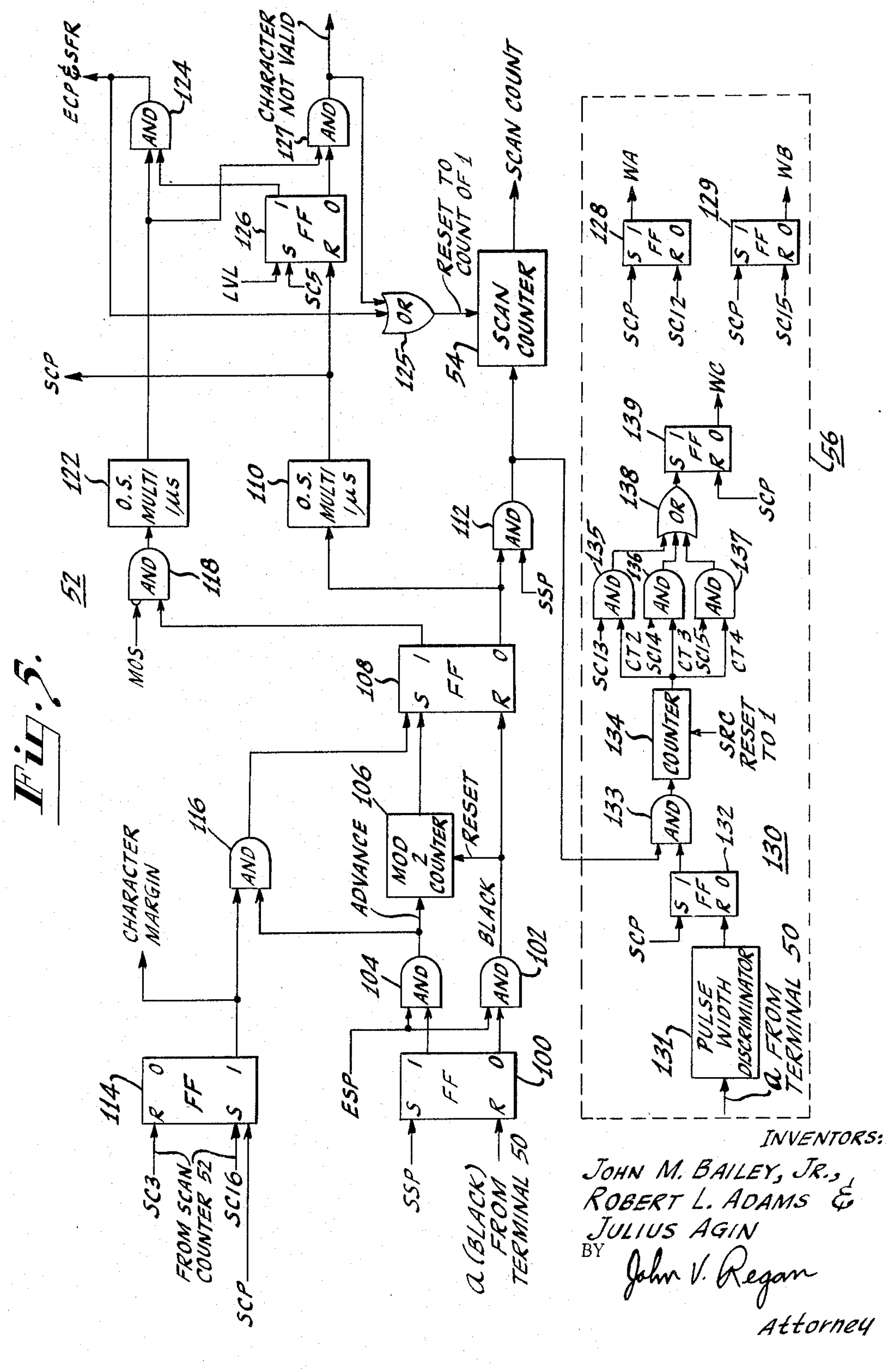
FIGURE 5 is a block diagram of the character control and scan counter circuits utilized in the recognition circuit of FIGURE 4.

Referring now to FIGURE 5, a character control circuit 52 includes an input flip-flop 100. The input terminal 50 of the feature recognition circuit 18 is coupled to apply direct scan video signals (*a*) to the reset terminal R of the flip-flop 100, while a start scan pulse (SSP), derived from the scanner 14, is applied to the set input terminal S thereof. Thus, the flip-flop 100 is set at the start of a scan and is not reset unless black video pulses occur in the scan. The "0" output terminal of the flip-flop 100 as well as an end of scan pulse, (ESP) derived from the scanner 14, are coupled to the input terminals of an AND gate 102. If the previously referenced copending application entitled "Optical Scanning System for Character Reader" is utilized, the SSP and ESP pulses may be derived from the trailing and leading edges, respectively, of the sample pulses disclosed therein. When the gate 102 is activated, the output thereof indicates that black video signals have been detected in a vertical scan line. The "1" output terminal of the flip-flop 100, as well as an ESP pulse, are coupled to an AND gate 104. When the gate 104 is activated, the output thereof indicates that an entirely white or blank scan occurred.

The output of the AND gate 102 is coupled to the reset terminals of both a MOD 2 counter 106 and a flip-flop 108. The output of the AND gate 104 is coupled to the advance terminal of the counter 106. Thus, the counter 106 is reset to zero on each scan which detects black video signals but is advanced on each blank scan up to a count of two. After a count of two, the next advance pulse returns the counter 106 to a count of zero. The "0" output terminal of the flip-flop 108 is coupled to a one-shot multivibrator 110 which produces a one microsecond (1 μs.) pulse when the flip-flop 108 is reset. The pulse output of the multivibrator 110 is a start character pulse (SCP) and indicates that the start of scanning a character has begun. The "0" output terminal of the flip-flop 108, as well as a start scan pulse (SSP) are coupled to an AND gate 112. The AND gate 112 is therefore activated at the start of every scan when a character is being read. The output of the AND gate 112 is coupled to the advance terminal of the scan counter 54, which is initially reset to a count of "1" and advances by a count of "1" upon each successive scan of a character. The scan counter 54 includes a plurality of output terminals, each successive one of which denotes a higher count.

The character control circuit 52 also generates an end of character pulse (ECP). A flip-flop 114 is set by a start character pulse (SCP) as well as a count of "16" (SC16) from the scan counter 54, and is reset by a count of "3" (SC3) from the scan counter 54. The "1" output terminal of the flip-flop 114, as well as the output of the AND gate 104, are coupled through an AND gate 116 to the set input terminal S of the flip-flop 108. Thus, the flip-flop 114 is initially set by a start character pulse, reset at the third scan of a character, and set again at the sixteenth scan of the character. It will be recalled that a normal width typewritten capital letter is completely scanned by sixteen vertical scans. The flip-flop 108 is therefore set by the flip-flop 114 when a normal width character is completely scanned since the AND gate 104 is active at this time. The count of "2" (CT2) output of the counter 106 is also coupled to the set terminal S of the flip-flop 108. Thus, the flip-flop 108 is also set at the end of two blank scans to provide for less than normal width characters. Such characters would otherwise not have an end of scan pulse produced.

The "1" output terminal of the flip-flop 108 is coupled to the direct input terminal of an AND gate 118 while a memory operating signal (MOS) is applied to the inhibit input terminal of this gate. The MOS signal is derived from the character determining circuit 20 (FIGURE 1) when the memory therein is operating, as will be described subsequently. Thus, the AND gate 118 is disabled while the memory in the character determining circuit 20 is operating to prevent any possible interference with the identification of a character. The AND gate 118 is coupled to a one-shot multivibrator 120 which, when triggered to operation, produces an output pulse which is applied as one input to an AND gate 124.

The other input to the gate 124 is derived from the "1" output terminal of a flip-flop 126. The flip-flop 126 is initially reset by a start character pulse (SCP) and is set by either a count of "5" (SC5) in the scan counter 54 or a long vertical left stroke (LVL) detected in long vertical stroke detector 82, to be described subsequently. Thus, the AND gate 124 is enabled by the flip-flop 126 and activated by the multivibrator 122 to produce an output pulse which is both an end character pulse (ECP) and a start feature readout (SFR) pulse. The pulse is applied through an OR gate 125 to reset the scan counter 54 to a count of "1." The SFR pulse initiates the readout of the features stored in the various feature detectors, as will be described subsequently. The "0" output terminal of the flip-flop 126 as well as the output of the multivibrator 122 are coupled to the input terminals of an AND gate 127 which, when activated, produces a pulse denoting that whatever is being scanned is not a valid character. The output of the AND gate 127 is coupled through the OR gate 125 to reset the scan counter 125 and also may be utilized as a general reset pulse for the various feature detectors through the feature recognition circuits 18. Thus, the character control circuit 52 signals the beginning of the scanning of a character, as well as the ending of the scanning of a valid character, and also initiates the recognition of the character.

Shown also in FIGURE 5 is the width detector 56. The width detector 56 includes a plurality of detectors for detecting the various widths of narrow width characters. The first width detector comprises a flip-flop 128 which is set by a start character pulse (SCP) and reset by a scan count of "12" (SC12) in the scan counter 54. If the flip-flop 128 remains set, the output from the "1" terminal thereof denotes that a width A (WA) character has been detected. The flip-flop 128 detects the narrowest characters in a font, such as the letter "I."

The flip-flop 129 detects characters having a width B (WB), which are characters wider than width A characters but narrower than normal width characters. A width B character may, for example, be a numeric "0." The numeric "0" in many fonts is narrower than the alphabetic "O" and their difference in width is substantially the major feature distinguishing the two characters. The flip-flop 129 is set by a start character pulse (SCP) and reset by a scan count of "15" (SC15) in the scan counter 54. If the flip-flop 129 remains set, the output from the "1" terminal thereof denotes that a width B character has been detected.

The remaining width detector 130 detects a width C (WC) and is utilized primarily to distinguish between the letter "B" and the numeral "8." The detector 130 includes a pulse width discriminator 131 which is coupled to the input terminal 50 of the feature recognition circuit 18 to have applied thereto video signals (*a*) from the direct scan of the characters. The discriminator 131 produces an output only if a pulse input signal is of at least a predetermined duration, in the present example 13 microseconds. Such a pulse duration is derived from scanning the left vertical stroke of the letter "B" and may be derived from scanning the numeral "8." The output of the discriminator is coupled to reset a flip-flop 132 which is set by a start character pulse (SCP). The "1" output terminal of the flip-flop 132 as well as the output of the AND gate 112 are coupled through an AND gate 133 to the advance terminal of a counter 134. The counter 134 is reset to a count of "1" by a start recognition cycle (SRC) signal, the origin of which will be described subsequently, and advances by a count of "1" at each scan of a character if a long vertical stroke is not detected by the discriminator 131. The counter 134 includes a plurality of output terminals each successive one of which denotes a higher count. The count of "2" (CT2) through the count of "4" (CT4) output terminals of the counter 134 are coupled to AND gates 135, 136 and 137, respectively. The other inputs to the AND gates 135, 136 and 137 comprise, respectively, scan counts of thirteen, fourteen and fifteen which are derived from the scan counter 54. All of the outputs of the gates 135–137 are coupled through an OR gate 138 to the set terminal of a flip-flop 139. The flip-flop 139 is initially reset by a start character pulse (SCP) and, if not thereafter set, indicates that a character having a width C (WC) has been detected.

Differentiating the letter "B" from the numeral "8" is predicated on the fact that a long vertical left stroke is detected initially in the letter "B." However, in the numeral "8" a long vertical left stroke will usually not be detected until after a few initial scans, if such a stroke is detected at all. Thus, in scanning the letter "B," the end of the first scan thereof produces a start character pulse (SCP) to set the flip-flop 132 and reset the flip-flop 139. At the start of the next scan, the counter 134 is advanced to a count of "2" (CT2). A long vertical stroke is detected during the scanning of the letter "B" and the flip-flop 132 is reset. The resetting of the flip-flop 132 prevents the further advancement of the counter 134 so that when the scan counter 54 reaches a count of "13" (SC13), the AND gate 135 produces an output which sets the flip-flop 139.

When scanning the numeral "8," a long vertical stroke may not be detected at all. In such a case, the counter 134 advances on each scan and the flip-flop 139 is not set. If a long vertical stroke is detected in the numeral "8," it is usually not detected in the initial scans of the character. Assuming a long vertical stroke is detected in the fourth scan of the numeral "8," the counter 134 advances to a count of "4" (CT4) and enables the AND gate 137. However, the gate 137 is never activated because the scan counter 54 does not reach a scan count of "15" (SC15) when the numeral "8" is scanned. This is because, as previously mentioned, the numeric characters in many typewriter fonts are narrower than the alphabetic characters. If a font is being read wherein the numeric and alphabetic characters are of the same width, then the scan counts applied to the AND gates 135, 136 and 137 are merely increased by an amount sufficient to prevent the activation of these gates by the numeral "8," as for example, increased up to scan counts of sixteen, seventeen and eighteen, respectively.

The remaining feature detectors in the feature recognition circuits 18 are divided into stroke feature detectors and cavity feature detectors.

STROKE FEATURE DETECTORS

The stroke feature detectors extract stroke data from the pulses occurring in the quantized video signal, derived from the outline traces of the characters being read.

*Pulse analyzer*

Figure 6:
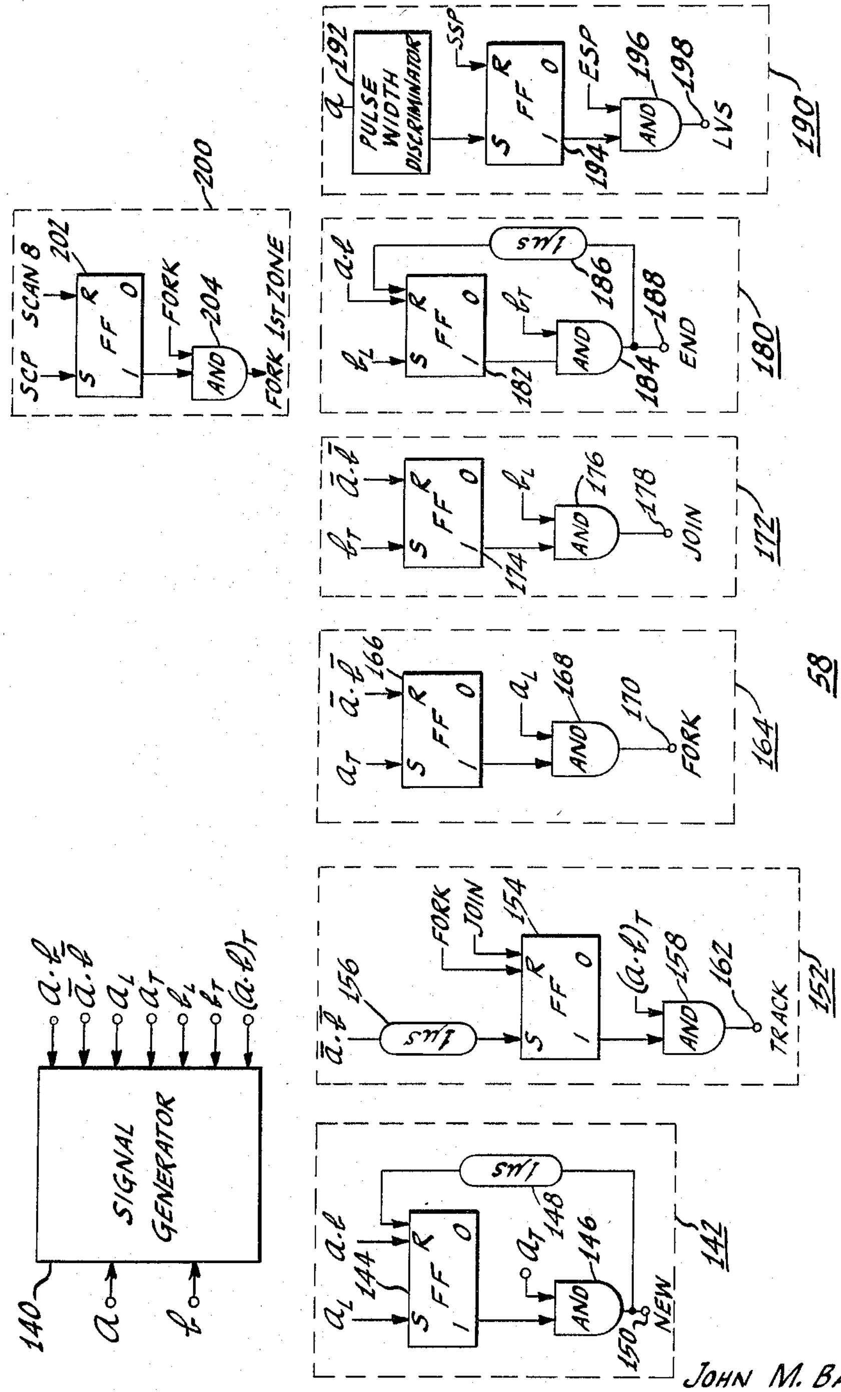
FIGURE 6 is a block diagram of a video pulse analyzer circuit utilized in the recognition circuit of FIGURE 4.

The pulse or black crossing analyzer 58 in FIGURE 6 detects the occurrence of the NEW, TRACK, FORK, JOIN, END and LVS stroke information from the black pulses in the video signal. The video signals from the direct and delayed scans are applied to a signal generator 140. As previously mentioned and shown in FIGURE 4, the letter (*a*) is used to designate the occurrence of black video signals during the direct or present scan, and the letter (*b*), the occurrence of black video signals in the delayed or previous scan (derived from the delay line 60, FIGURE 4). The signal generator 140 generates, from the signal (*a*) and the signal (*b*) by well known circuitry, the following signals:

$a.b$ black video signals simultaneously present or overlapping in both the present and previous scans $\bar{a}.\bar{b}$ white video signals simultaneously present or overlapping in both the present and previous scans $a_L$ pulse signal produced at leading edge of signal *a*

$a_T$ pulse signal produced at trailing edge of signal *a*

$b_L$ pulse signal produced at leading edge of signal *b*

$b_T$ pulse signal produced at trailing edge of signal *b*

$(a.b)_T$ pulse signal produced at trailing edge of signal $a.b$

Note particularly that signal $(a.b)_T$ occurs whenever both scans have been simultaneously black and either one or both of the scans go white. All of the above signals may, for example, be of one microsecond duration.

The pulse analyzer 58 includes a NEW stroke detector 142. The NEW stroke detector 142 includes a flip-flop 144 which is set by an $a_L$ signal and reset by an $a.b$ signal. The "1" output terminal of the flip-flop 144 is coupled to one input of an AND gate 146, the other input of which comprises an $a_T$ signal. A NEW stroke pulse is derived from the output terminal 150 of the AND gate 146 and is also fed back through a delay circuit 148 to reset the flip-flop 144.

Figure 3B:
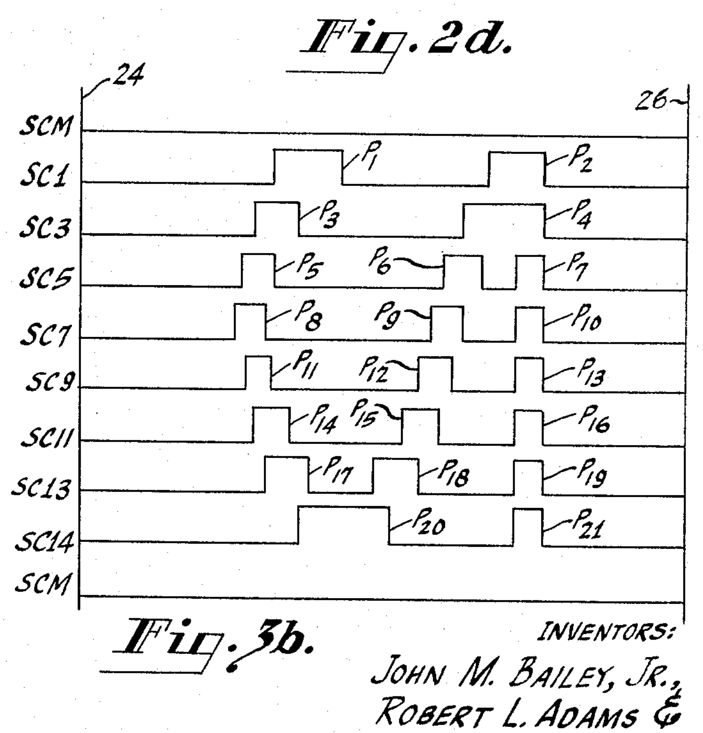

Thus, assuming the numeral "2" of FIGURE 3*a* is being read, the flip-flop 144 is set by the leading edge of a pulse in the present scan, such as the leading edge of the pulse $P_1$ in scan SC1 of FIGURE 3*b*. Since no black video signal pulses occur in scan SCM, no $a.b$ signal is produced to reset the flip-flop 144. Therefore, when the trailing edge of the pulse $P_1$ occurs, the AND gate 146 is activated and a NEW stroke pulse is derived from the terminal 150. Thus, the stroke 30 in the numeral "2" is detected. The pulse output of the gate 146 is fed back through the one microsecond delay circuit 148 to reset the flip-flop 144 after the ending of the $a_L$ signal and thus prepare the NEW stroke detector 142 for the next pulse $P_2$ in the scan. The pulse $P_2$ also produces a NEW stroke pulse and the stroke 32 in the numeral "2" is detected.

The NEW stroke detector 142 therefore compares the present and previous scans of a character to produce an output if a black video pulse which exists in the present scan does not exist in the previous scan. This means that a new portion of the outline trace of a new stroke of a character is being scanned.

A TRACK detector 152 is included in the pulse analyzer 58 to track strokes from scan-to-scan. The TRACK detector 152 includes a flip-flop 154 which is set by coupling an $\bar{a}.\bar{b}$ signal through a delay circuit 156 to the set terminal thereof. The flip-flop 154 is reset by an output signal from either a FORK detector 164 or a JOIN detector 172. The "1" output terminal of the flip-flop 154 is coupled to one input terminal of an AND gate 158, the other input of which comprises an $(a.b)_T$ signal. A TRACK pulse is derived from the output terminal 162 of the AND gate 158.

A TRACK pulse is generated when black video pulses appear simultaneously in both the present and previous scans and no FORK or JOIN occurs. The initial white in the direct scan SC3 and the delayed scan SC1 of the numeral "2" of FIGURE 3*a* sets the flip-flop 154 and enables the AND gate 158. The overlapping occurrence of pulses $P_1$ and $P_3$ in scans SC1 and SC3 produces an $a.b$ signal and the trailing edge of the pulse $P_3$ produces an $(a.b)_T$ signal. The AND gate 158 is activated and a TRACK pulse derived from the terminal 162 thereof. Thus, the TRACK detector 152 has detected the stroke 30 of the numeral "2" a second time. A TRACK pulse is also generated at the trailing edges of the pulses $P_2$ and $P_4$, and the stroke 32 of the numeral "2" is detected the second time.

In scan SC5, TRACK pulses are produced at the trailing edges of pulses $P_5$ and $P_6$ but not at the trailing edge of pulse $P_7$ since a FORK occurs to reset the flip-flop 154.

A FORK detector 164 is provided in the pulse analyzer 58 to detect the forking away of one stroke from another. The FORK detector includes a flip-flop 166 which is set by an $a_T$ signal and reset by an $\bar{a}.\bar{b}$ signal. The "1" output terminal of the flip-flop 166 is coupled to one input terminal of an AND gate 168, the other input of which is an $a_L$ signal.

The trailing edge of a pulse in a direct or present scan, such as the pulse $P_6$ in scan SC5 of FIGURE 3*a*, sets the flip-flop 166 and enables the AND gate 168. The AND gate 168 is then activated by the leading edge of the pulse $P_5$ because no intervening white occurred simultaneously in the present and previous scans. Thus, the FORK detector 164 effectively detects the forking away from stroke 32 of the stroke 34 in the numeral "2."

A JOIN detector 172 is included in the pulse analyzer 58 to detect the joining of two strokes. The JOIN detector 172 includes a flip-flop 174 which is set by a $b_T$ signal and reset by an $\bar{a}.\bar{b}$ signal. The "1" output of the flip-flop 174 is coupled to one input terminal of an AND gate 176, the other input of which comprises a $b_L$ signal.

During scan SC14 of FIGURE 3*b*, the trailing edge of the delayed scan pulse $P_{17}$ in scan SC13 sets the flip-flop 174 and enables the AND gate 176. No intervening white occurs simultaneously in both the present and previous scans to reset the flip-flop 174. The leading edge of the delayed scan pulse $P_{18}$ activates the gate 176 and produces a JOIN pulse at the output terminal 178 thereof. Thus, the JOIN detector 172 detects the merging of stroke 32 into stroke 30 in FIGURE 3*a*.

An END detector 180 is included in the pulse analyzer 58 to detect when a stroke ends by itself rather than by joining another stroke. The END detector 180 includes a flip-flop 182 which is set by a $b_L$ signal and reset by an $a.b$ signal. The "1" output terminal of the flip-flop 182 is coupled to one input of an AND gate 184, the other input of which comprises a $b_T$ signal. The output terminal 188 of the AND gate 184 is coupled through a delay circuit 186 to reset the flip-flop 182 when an END pulse is produced.

During scan SCM in FIGURE 3*a*, the leading edge of the pulse $P_{20}$ in the delayed scan SC14 sets the flip-flop 182. No intervening black occurs simultaneously in both the scans SC14 and SCM to reset the flip-flop 182, so the trailing edge of the pulse $P_{20}$ activates the AND gate 184 and produces an END pulse. The pulse output resets the flip-flop 182 in preparation for the generation of another END pulse for the pulse $P_{21}$. The END detector 180 therefore detects the ending of the strokes 30 and 34 in FIGURE 3*a* by detecting that no pulses representing these strokes appear in scan SCM.

A long vertical stroke LVS detector 190 is included in the pulse analyzer 58 to detect long vertical strokes, such as strokes 36 and 38 in the character "M" in FIGURE 2*a*. The long vertical stroke detector 190 includes a pulse width discriminator 192 to which the direct scan signal (*a*) is applied. The discriminator 192 produces an output only if a pulse input signal is of at least a predetermined duration, in the present example 14 microseconds duration or longer. It will be recalled that an active vertical scan is 44 microseconds and the character occupies 22 microseconds of the scan time. Thus, a long vertical stroke is therefore arbitrarily defined as one which is approximately two-thirds of a typewritten character height. The LVS detector 190 also includes a flip-flop 194 which is set by the output of the discriminator 192 and reset by a start of scan pulse (SSP). The "1" output terminal of the flip-flop 194 is coupled to one input terminal of an AND gate, the other input of which comprises an end of scan pulse (ESP).

Thus, when scanning a character containing a long vertical stroke such as the "M" in FIGURE 2*a*, the discriminator 192 produces an output pulse to set the flip-flop 194 during both the scans SC1 and SC15. The AND gate 196 is therefore enabled and is activated by an end of scan pulse (ESP). An output pulse denoting a long vertical stroke is derived from the output terminal 198 for each long pulse.

Also included in the pulse analyzer 58 is a detector 200 for denoting whether or not a FORK occurred in the first zone or initial portion of a character being scanned. The detector 200 includes a flip-flop 202 which is set by a start character pulse (SCP) and reset by a scan count of "8" from the scan counter 54. The "1" output terminal of the flip-flop 202 is coupled to one input terminal of an AND gate 204, the other input of which comprises a FORK signal pulse from the FORK detector 164.

Thus, the flip-flop 202 is set at the beginning of the scanning of a character and enables the AND gate 204. The AND gate 204 is activated if a FORK is detected before a scan count of "8" resets the flip-flop 202.

*Long Vertical Stroke Position Detector*

Figure 7:
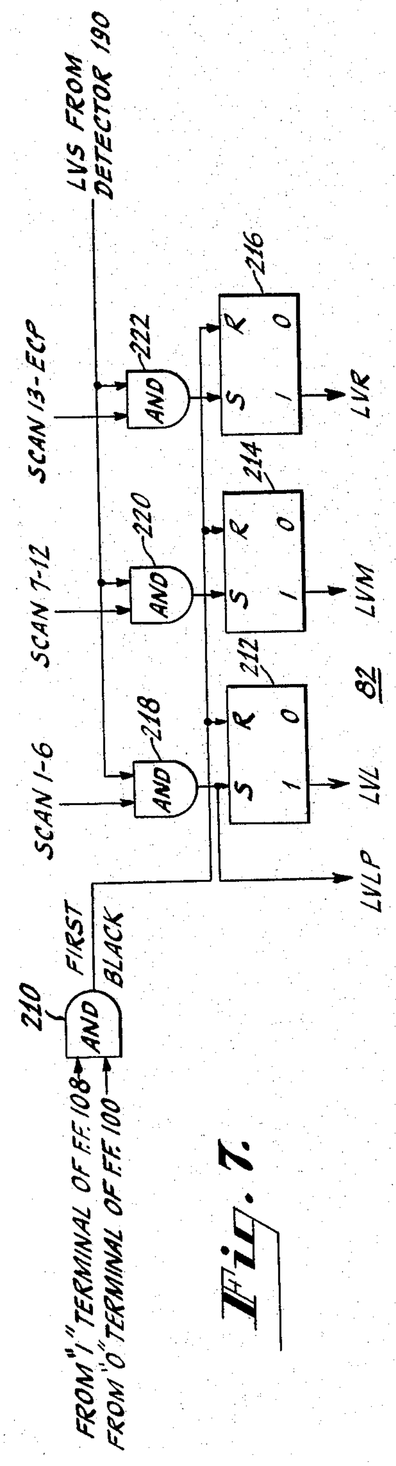
FIGURE 7 is a block diagram of a long vertical stroke detector utilized in the recognition circuits of FIGURE 4.

Referring now to FIGURE 7, a long vertical stroke position detector 82 is illustrated. The position detector 82 includes an AND gate 210, the inputs of which are derived from the "1" and "0" output terminals of the flip-flops 108 and 100, respectively, in the character control circuit 52 (FIGURE 5). It will be recalled that flip-flop 108 is set when a character has been completely scanned and the flip-flop 100 is reset when black video signals occur in a scan. Thus, the AND gate 210 of FIGURE 7 is activated on the first black video signal that occurs in scanning a new character.

The AND gate 210 is coupled to reset flip-flops 212, 214 and 216. The flip-flops 212, 214 and 216 are set by signals derived from AND gates 218, 220 and 222, respectively. The AND gate 218 is enabled by a count of from "1" to "6" in the scan counter 54 and activated by a long vertical stroke pulse from the LVS detector 190 (FIGURE 6). Thus, a long vertical stroke which occurs during the first six scans of a character is a long vertical left (LVL) stroke. A long vertical left pulse (LVLP) is also derived from the AND gate 218.

The AND gate 220 is enabled by a count of from "7" to "12" in the scan counter 54 and activated by a LVS pulse from the detector 190. Thus, a long vertical stroke which occurs during the second six scans of a character is a long vertical middle (LVM) stroke.

The AND gate 222 is enabled by a count of from "13" to "16" in the scan counter 54 as well as by an end character pulse (ECP). The gate 222 is activated by a LVS pulse. Thus, a long vertical stroke which occurs after the twelfth scan of a character is a long vertical right (LVR) stroke. The flip-flops 212 through 216 store the long vertical stroke positions pending the complete scanning of a character.

*Stroke Tracker Control*

Figure 8:
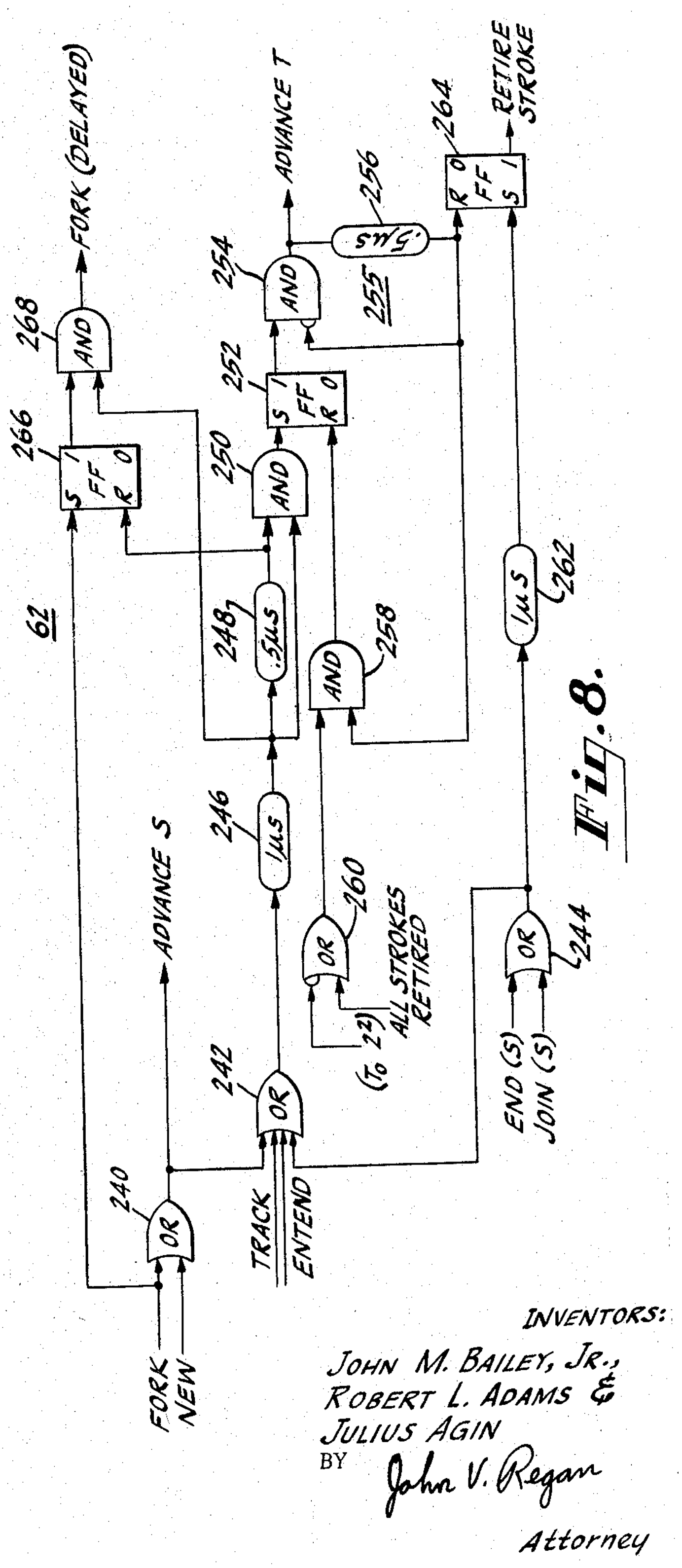
FIGURES 8 and 9 are block diagrams of a stroke tracker control circuit and a stroke tracker utilized in the recognition circuit of FIGURE 4.
Figure 9:
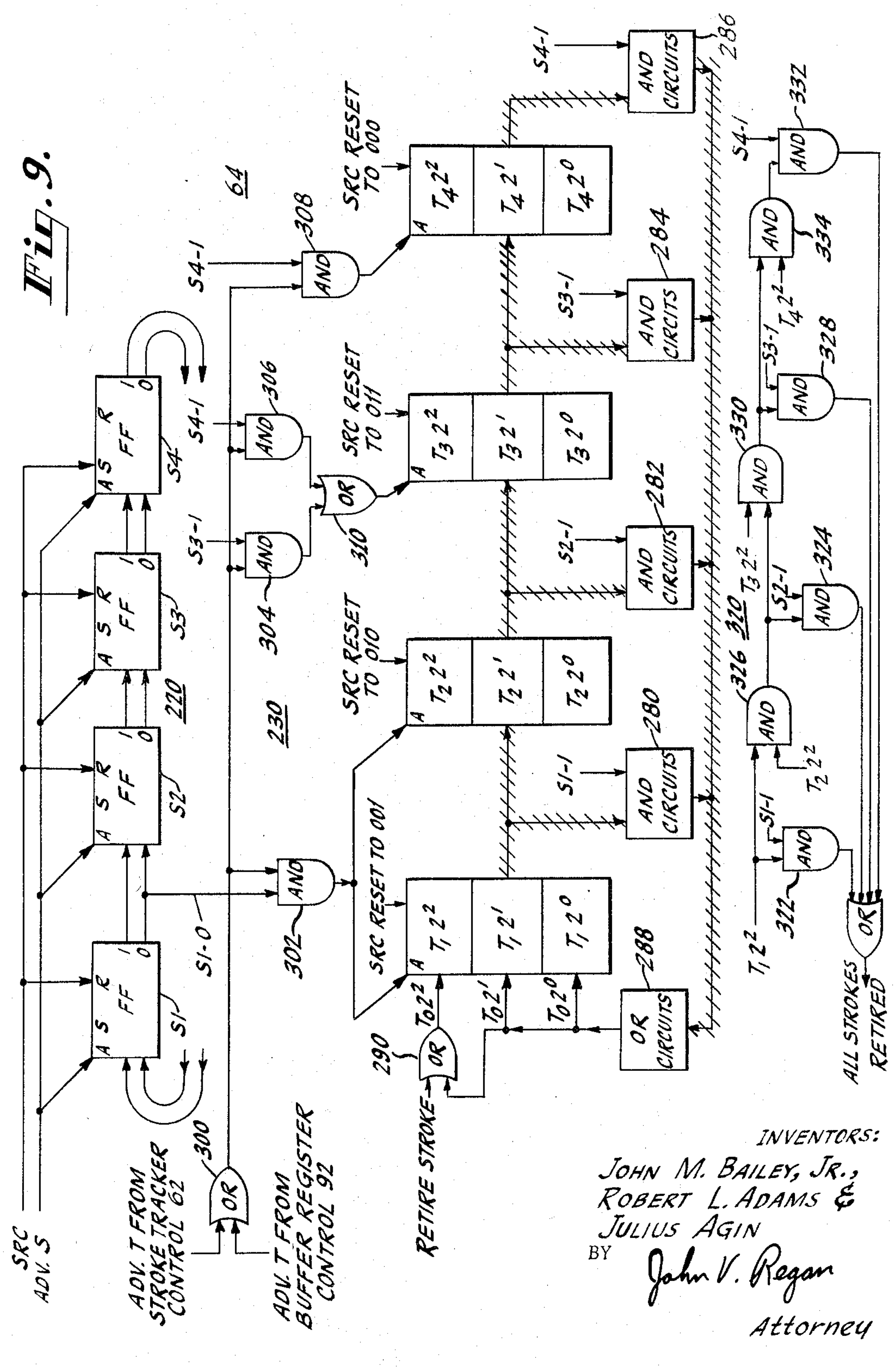

Referring now to FIGURE 8, a stroke tracker control circuit 62 is shown. The stroke tracker control circuit 62 generates the advance pulses for a stroke counter or S counter 220 and a stroke tracker or T register 230 in the stroke counter and tracker circuit 64 (FIGURE 9). The stroke tracker control circuit 62 includes an input OR gate 240, to which are applied FORK and NEW stroke detectors 164 and 142, respectively, of FIGURE 6. The output of the OR gate 240 comprises advance S pulses for the stroke counter 220 (FIGURE 9).

The stroke tracker control circuit 62 also generates advance T pulses for the stroke tracker 230 and includes another input OR gate 242, the inputs of which comprise a TRACK signal derived from the TRACK detector 152 (FIGURE 6), an advance S pulse derived from the OR gate 240, an EXTEND signal derived from any one of the stroke decoders 66, 68, 70 or 72, and an output pulse derived from a third input OR gate 244. The inputs to the OR gate 244 comprise JOIN(S) and END(S) signals derived from the stroke decoders 66, 68, 70 and 72. The (S) means any one of the strokes A through D. The OR gate 242 is coupled through first and second delay circuits 246 and 248 to one input of an AND gate 250. The other input to the AND gate 250 is derived from the junction of the delay circuits 246 and 248. Thus, the AND gate 250 is activated 1.5 microseconds after the OR gate 242 is activated. The gate 250 output sets a flip-flop 252 and the "1" output terminal of the flip-flop 252 is coupled to an AND gate 254. The output of the AND gate 254 is fed back through a delay circuit 256 to the other input terminal of the AND gate 254, which terminal is an inhibit terminal. The AND gate 254 supplies the advance T pulses for the stroke tracker 230 (FIGURE 9).

The flip-flop 252, AND gate 254 and delay circuit 256 comprise an oscillator 255 in that the AND gate 254 is activated by the setting of the flip-flop 252 and produces an output advance T pulse which is fed back after a .5 microsecond delay to cutoff the gate 254. The duration of the advance T pulse is therefore 0.5 microsecond. As long as the flip-flop 252 remains set, the AND gate 254 will be activated again and again at a one microsecond period to generate a succession of advance T pulses.

The flip-flop 252 is reset by the output of an AND gate 258, one input of which is derived from the delay circuit 256. The other input to the gate 258 is derived from an OR gate 260. The OR gate is activated by an all strokes retired signal denoting that all the strokes of a character have either ended or joined. The OR gate 260 is also activated by a particular retired stroke signal ($To2^2$) to be described subsequently. Both these signals are derived from the stroke tracker 230 (FIGURE 9). The signal ($To2^2$) is applied to an inhibit terminal of the OR gate 260 causing the gate 260 to be activated in the absence of this signal; which is the normal operating condition.

The stroke tracker control circuit 62 also produces a retire stroke signal indicating that a stroke has ended either as a JOIN or an END. The OR gate 244 is coupled through a delay circuit 262 to the set terminal of a flip-flop 264 which produces a retire stroke signal level from the "1" terminal thereof when set. The flip-flop 264 is reset by an advance T pulse derived from the delay circuit 256.

The stroke tracker control circuit 62 also produces a FORK signal pulse which is delayed with respect to an advance S pulse. The FORK input to the OR gate 240 is also coupled to the set terminal of a flip-flop 266, the reset terminal of which is coupled to the output of the second delay circuit 248. The "1" output terminal of the flip-flop 266, as well as the junction of the delay circuits 246 and 248, are coupled to the input terminals of an AND gate 268. The delayed FORK signal derived from the AND gate 268 is applied to one of the stroke decoders 66, 68, 70 or 72 to record that a particular stroke began as a FORK rather than as a NEW stroke.

*Stroke Counter And Tracker*

Referring to FIGURE 9, there is illustrated a stroke counter and tracker circuit 64. The stroke or S counter 220 comprises a four-stage ring counter including four flip-flop stages labelled S1 through S4. The flip-flops S1 through S4 are connected in tandem with the output of the last stage S4 being connected back to the input of the first stage S1. The stroke counter 220 is initially reset to a 0001 condition by applying a start recognition cycle (SRC) pulse, to be described later, to the reset terminals of the stages S1 through S3 and to the set terminal of the stage S4. The "1" stored initially in the last stage S4 is advanced to the first stage S1 by an advance S pulse applied to the advance terminals A when one stroke has been detected in scanning a character. Successive detections of other strokes cause the advance S pulses generated thereby to advance the "1" successively to the S2, S3, etc., stages of the counter. The ring counter 220 is coupled to control the cycling of the stroke tracker or T register 230. Ring counters of this type are known; therefore, the details of the interconnections have not been illustrated.

The stroke tracker 230 comprises a four-stage, three-level ring register including a plurality of flip-flop circuits. The four stages of the T register 230 are labelled $T_1$, $T_2$, $T_3$ and $T_4$, respectively, while the three levels are labelled $2^0$, $2^1$ and $2^2$, respectively. Thus, the flip-flop corresponding to the first stage in the first level is labelled $T_12^0$, the flip-flop corresponding to the third stage in the second level, $T_32^1$, etc.

The flip-flops in the $2^0$ level of the stroke tracker 230 are connected in tandem. The flip-flops in the $2^1$ and $2^2$ levels are each similarly connected. These multiple connections are represented in FIGURE 9 as a single lead line with diagonal strokes therethrough. An identical notation is utilized for other multiple connections both in FIGURE 9 and other figures of the drawings.

Each output of the four stages of the stroke tracker 230 is coupled back to the input of the first stage of its respective level. Thus, the outputs of each of the flip-flops in the four stages are coupled, respectively, to AND circuits 280, 282, 284 and 286, which circuits are, respectively, enabled by the "1" output level of the flip-flops S1 through S4 in the S counter 220. All of the AND circuits 280 through 286 are coupled to OR circuits 288. The first two levels of the stroke tracker 230, i.e., the $2^0$ and $2^1$ levels, are coupled via the OR circuits 288 directly to the input terminals of the flip-flops $T_12^0$ and $T_12^1$, respectively, while the third level is coupled through an OR gate 290 to the input terminals of the flip-flop $T_12^2$. The input leads to the first stage $T_1$ are labelled $T_02^0$, $T_02^1$, and $T_02^2$.

Figure 10:
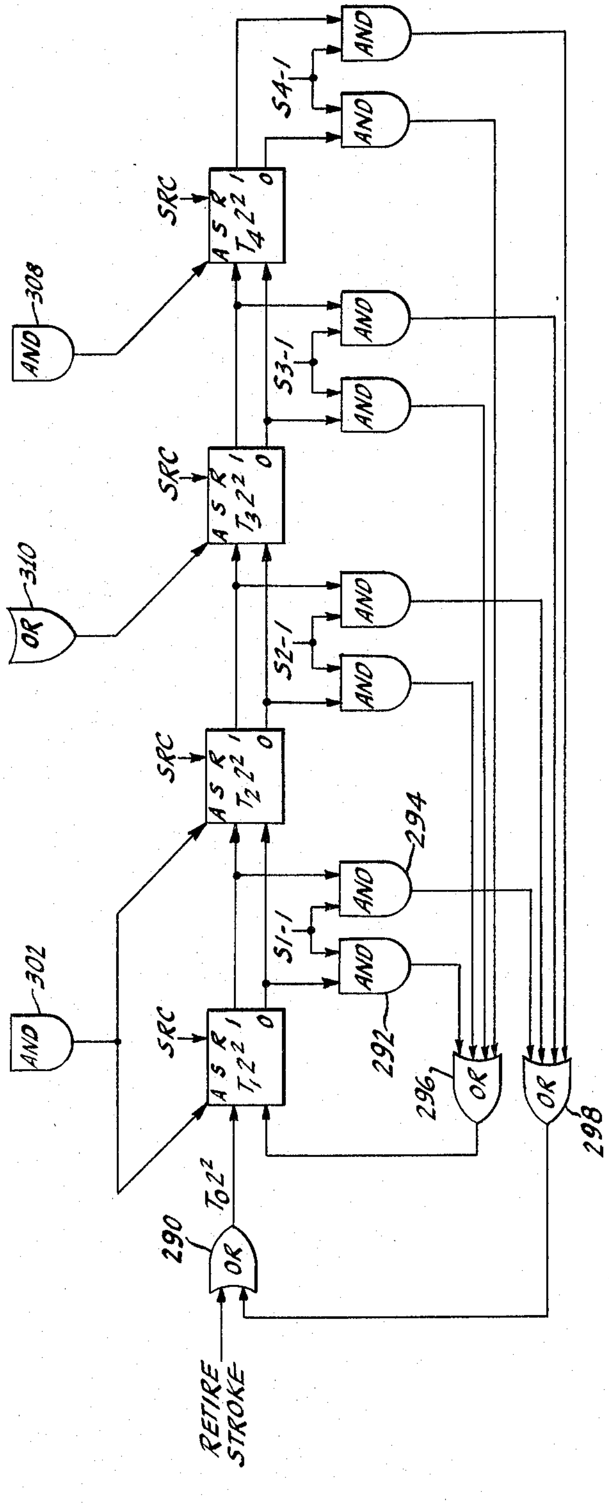
FIGURE 10 is a detailed schematic block diagram of one level of the stroke tracker of FIGURE 9.

A more detailed schematic of the various connections in the stroke tracker 230 for one level, the $2^2$ level, is shown in FIGURE 10. With the exception of the OR gate 290, the $2^0$ and $2^1$ levels of the stroke tracker 230 would be connected identically. Thus, it is apparent that the AND circuits 280 (FIGURE 9) includes AND gates 292 and 294 (FIGURE 10) as well as similar pairs of AND gates in the $2^0$ and $2^1$ levels. The same is true of the AND circuits 282 through 286. The OR circuits 288 include OR gates 296 and 298 as well as similar pairs of OR gates in the $2^0$ and $2^1$ levels.

Referring back to FIGURE 9, the four stages $T_1$–$T_4$ of the stroke tracker 230 each have a common advance terminal A. Advance T pulses are applied to the stroke tracker 230 from the stroke tracker control circuit 62 and from the feature output buffer register control circuit 92, to be described later, through an OR gate 300. The output of the gate 300 is coupled to one input terminal of AND gates 302, 304, 306 and 308. The other input to the AND gate 302 is derived from the "0" output terminal, lead S1–0, of the S1 stage of the stroke counter 220 and the output of the AND gate is coupled to the common advance terminals of the $T_1$ and $T_2$ stages of the stroke tracker 230. Thus, the $T_1$ and $T_2$ stages do not have advance T pulses applied when a "1" is stored in the flip-flop S1. The other inputs to the AND gates 304 and 306 are derived from the "1" output terminals of the stroke counter stages S3 and S4, respectively. The outputs of the AND gates 304 and 306 are coupled through an OR gate 310 to the common advance terminal A of the $T_3$ stage of the stroke tracker 230. Finally, the other input to the AND gate 308 is derived from the "1" output terminal of the S4 stage of the counter 220 and the output of the gate 308 is coupled to the common advance terminal A of the $T_4$ stage of the tracker 230. Thus, the application of advance pulses to the stroke tracker 230 stages are controlled by the stroke counter 220.

The $T_1$ stage of the tracker 230 is initially reset by a start recognition cycle (SRC) signal to store 001, by applying the SRC signal to the reset terminals of the flip-flops $T_12^2$ and $T_12^1$, respectively, and to the set terminal of the flip-flop $T_12^0$. Similarly, the stages $T_2$, $T_3$ and $T_4$ are reset to store 010, 011 and 000, respectively. The data stored in the $2^1$ and $2^0$ levels of each of the stages $T_1$ through $T_4$ correspond to the tags or labels given to strokes in a character being read. Thus, 01 is the tag for stroke (A), 10 for stroke (B), 11 for stroke (C) and 00 for stroke (D). The data stored in the $2^2$ level of each of the stages $T_1$–$T_4$ indicate whether or not a stroke has been retired as either a JOIN or an END. Initially, all of the stages $T_1$–$T_4$ have a "0" stored in the $2^2$ level. As a stroke ENDS or JOINS, a "1" is stored in the $2^2$ level for that stroke. Thus, 101 indicates that stroke (A) has retired.

Included in the stroke tracker 230 is a circuit 320 for indicating when all the strokes in a character have been retired. The all strokes retired circuit 320 includes a plurality of AND gates coupled to the $2^2$ or retired stroke level of the stroke tracker and to the stroke counter 220. Thus, if one stroke has been counted by the S1 stage in the S counter 220, an AND gate 322 is activated when a "1" is stored in the flip-flop $T_12^2$. Since only one stroke has been counted by the S counter 220, an all strokes retired signal is produced by an OR gate 324. If two strokes have been counted, an AND gate 324 is enabled by the output of the S2 stage of the S counter and activated when an AND gate 326 is first activated by "1"s stored in the retired strokes flip-flops $T_12^2$ and $T_22^2$ in the first two stages of the stroke counter 230. A pair of AND gates 328 and 330 perform the same function when three strokes, which are counted in a character, are retired. Another pair of AND gates 332 and 334 do the same for four strokes. The all strokes retired signal is applied to OR circuit 258 of FIGURE 8 to prevent the oscillator 255 in the stroke tracker control circuit 62 from producing any further advance T pulses.

It is to be noted that the stroke counter 220 and stroke tracker 230 of FIGURE 9 make provision only for a maximum of four strokes in a character. If some characters in a particular font contain more strokes, other stages can readily be added to the stroke counter and tracker.

*Stroke decoders*

Figure 11:
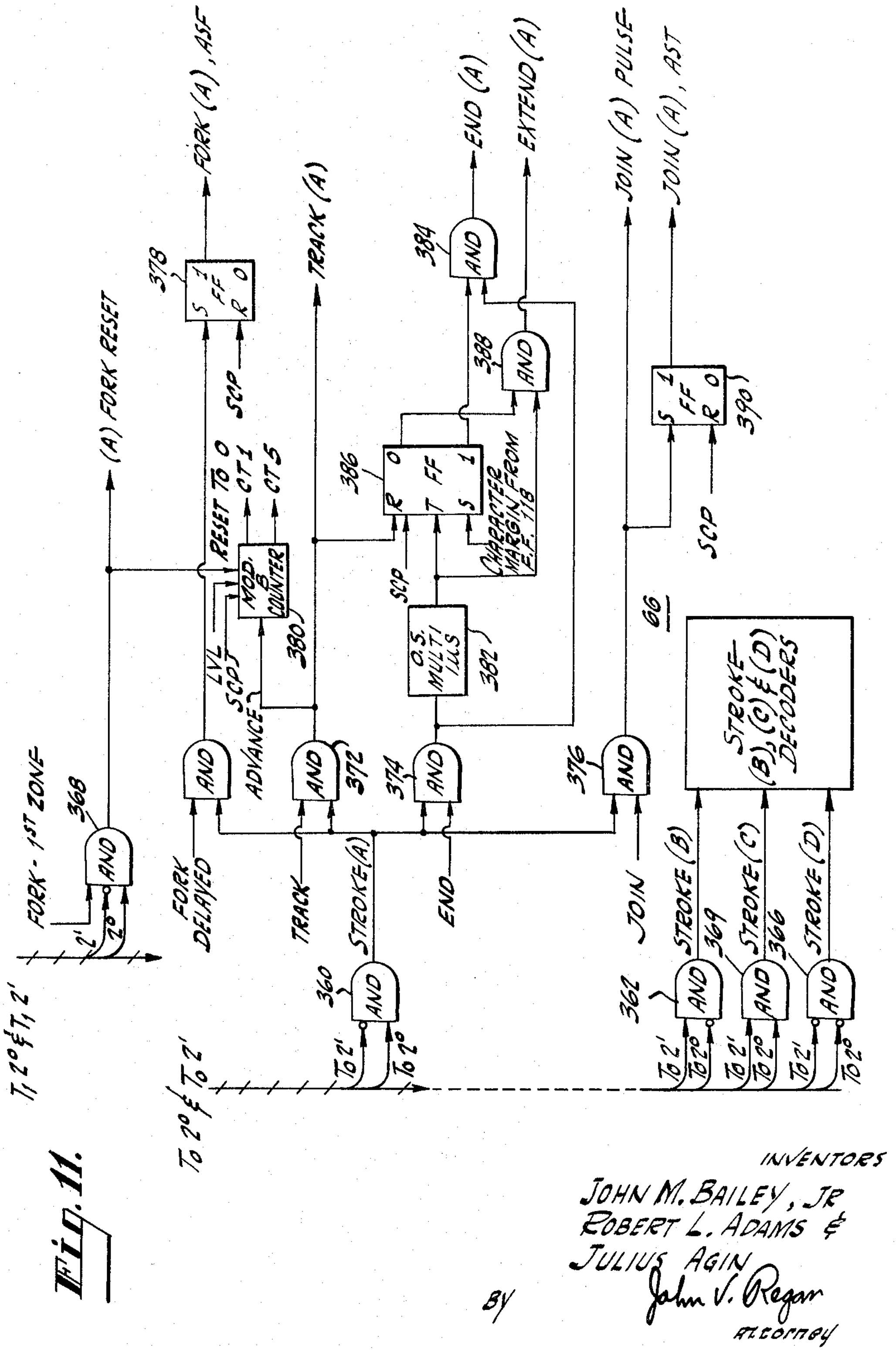
FIGURES 11 and 12 are block diagrams of stroke decoder and stroke direction analyzers utilized in the recognition circuit of FIGURE 4.

Referring now to FIGURE 11, the (A) stroke decoder 66 is shown in detail as well as input gates to the other stroke decoders in the feature recognition circuits 18.

The stroke decoders are utilized to extract stroke feature data from each of the four possible strokes that occur in an alpha-numeric characterter. Each stroke decoder includes an input AND gate 360, 362, 364 or 366. The inputs to all of the AND gates 360–366 are derived from the feedback input lead lines $T_0 2^0$ and $T_0 2^1$ to the first stage $T_1$ of the first and second levels of the stroke tracker 230. The $T_0 2^1$ lead line is coupled to an inhibit terminal of the AND gate 360 while the $T_0 2^0$ lead line is coupled to the direct input terminal of the gate. Thus, whenever the $T_0 2^1$ input is low, i.e., "0," and the $T_0 2^0$ input is high, i.e., "1," the AND gate 360 is activated. It will be recalled that the stroke (A) tag or code in the $2^1$ and $2^0$ levels of the stroke tracker 230 is 01. Consequently, the gate 360 and the (A) stroke decoder 66 will be activated whenever stroke (A) is tracked in the stroke tracker 230. Similarly, the tags 10, 11 and 00 activate the AND gates 362, 364 and 366, respectively, when the strokes (B), (C) and (D) are tracked.

The stroke decoder 66 also includes another input AND gate 368 coupled to the output of the first or $T_1$ stage of the stroke tracker 230. The AND gate 368 is enabled when the stroke (A) tag 01 is stored in the $T_1$ stage of the stroke tracker 230 and activated by a FORK signal if detected in the first zone of a character by the detector 200 in the pulse analyzer 58. The other stroke decoders 68, 70 and 72 also include AND gates similar to the gate 368. These gates are activated when the corresponding stroke appears in the $T_1$ stage of the stroke tracker 230 and a FORK signal is detected. The remaining circuits in the (A) stroke decoder 66 are identical to corresponding circuits in the other decoders which, for simplification, are not shown.

The output of the AND gate 360 is coupled to enable AND gates 370, 372, 374 and 376. The AND gate 370 is activated by a delayed FORK signal derived from the AND gate 268 in the stroke tracker control circuit 62 (FIGURE 7). The AND gate 370, when activated, sets a flip-flop 378 to denote that stroke (A) began as a FORK. The flip-flop 378, which is initially reset by a start character pulse (SCP), therefore stores one of the stroke features (FORK) detected by the feature recognition circuits 18.

The AND gate 372 is activated by a TRACK signal from the TRACK detector 152 (FIGURE 6) and the output of the gate denotes that stroke (A) has been tracked. The output of the AND gate 372 is also coupled to the advance terminal of a MOD 8 counter 380. The MOD 8 counter advances a count of "1" for each TRACK signal up until a count of "8." At the ninth TRACK signal, which is effectively the ninth scan which detected stroke (A) in a character, the counter 380 returns to a count of "1." Two outputs, a count of "1" (CT1) and a count of "5" (CT5), are derived from the counter 380. Thus, upon the receipt of every fourth TRACK signal, the counter 380 produces an output. The counter is reset to zero at the start of scanning a character by an SCP pulse and reset to zero during the scanning of a character if a FORK occurs in the first zone thereof or a long vertical left (LVL) stroke is detected.

The AND gate 374 is activated by an END signal and is coupled to trigger into operation a one-shot multivibrator 382 as well as enable an AND gate 384. The output of the multivibrator is coupled to the trigger terminal T of a triggerable flip-flop 386 as well as to one input terminal of an AND gate 388. The flip-flop 386 is reset initially by a start character pulse SCP and reset during the scanning of a character by TRACK (A) signals. The flip-flop 386 is set by a character margin signal derived from the flip-flop 114 in the character control circuit 52 (FIGURE 5) at the sixteenth scan of a character. The "1" and "0" output terminals of the flip-flop 386 are coupled to the other input terminals of the AND gates 384 and 388, respectively. The flip-flop 386 is triggered by the trailing edge of the multivibrator 382 pulse to switch from the stable state in which it had been operating before receipt of the pulse to the other stable state thereof. Thus, if an END signal occurs, as for example because of a break in stroke (A) of a character, the multivibrator 382 produces a 1 microsecond pulse. The flip-flop 386 will be in the reset condition and the AND gate 388 enabled. The leading edge of the multivibrator 382 pulse activates the gate 388 and produces an EXTEND pulse. The EXTEND pulse is applied to the delay circuit 60 (FIGURE 4). The trailing edge of the multivibrator pulse triggers the flip-flop 386 to the set condition thereof. Since the END signal occurred because of a break in the stroke, a TRACK signal will occur on the next scan to reset the flip-flop 386 if the break is not too large. If a TRACK signal does not occur, the EXTEND signal will produce another END signal and activate the AND gate 384 to produce an END (A) signal. Additionally, if the sixteenth scan of a character has occurred, the flip-flop 386 is held set by a character margin signal level and an END signal produces an END (A) signal without producing an EXTEND (A) signal.

The remaining input AND gate 376 is activated by a JOIN signal and the output of the gate 376 is coupled to set a flip-flop 390. A JOIN (A) signal is derived from the "1" output terminal of the flip-flop 390 which indicates that stroke (A) ended by joining another stroke.

*Stroke Direction Analyzer*

Figure 12:
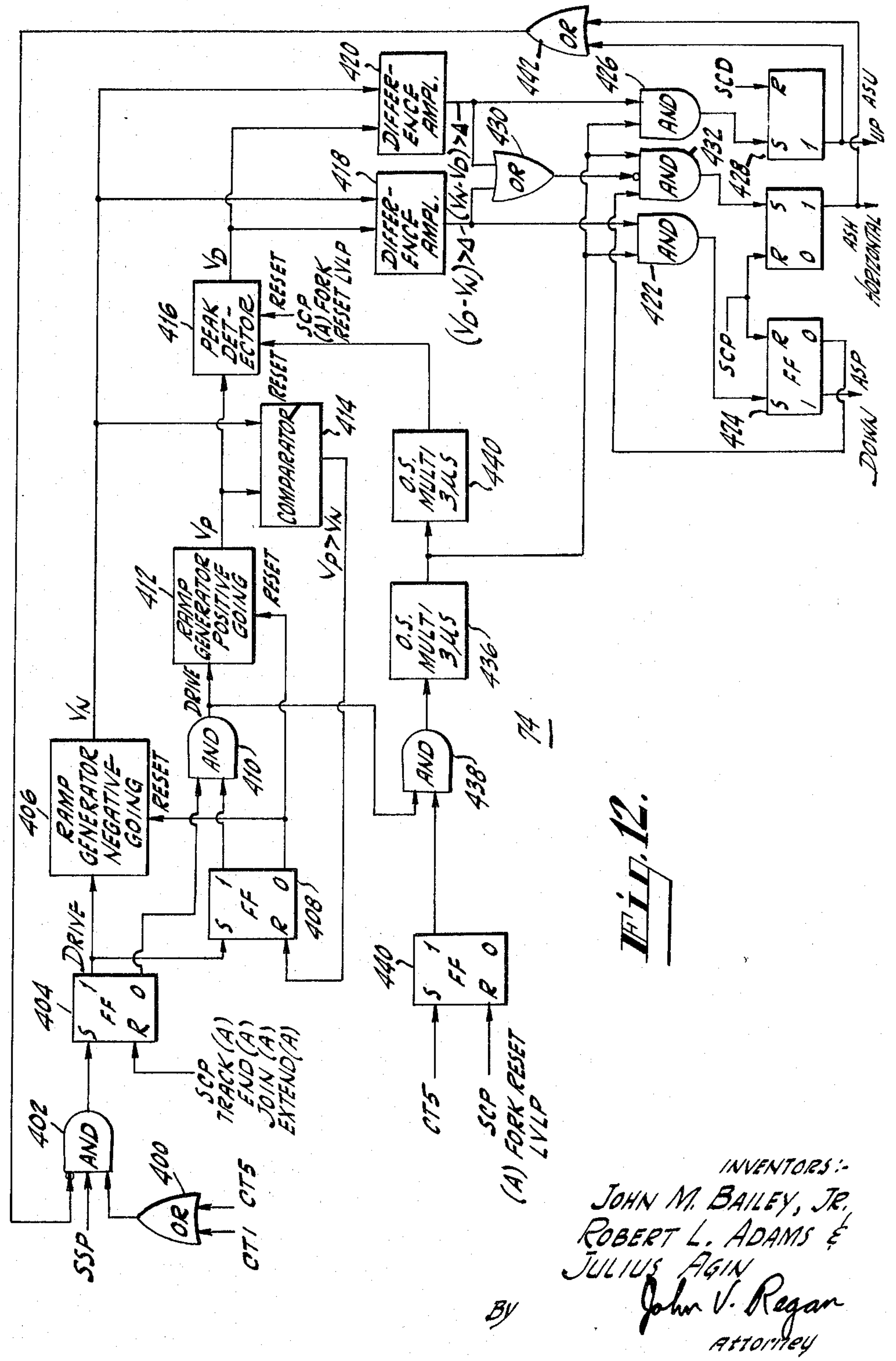

Referring now to FIGURE 12, the (A) stroke direction analyzer 74 of FIGURE 4 is shown in greater detail. The (B), (C) and (D) stroke direction analyzers 76, 78 and 80 are identical in configuration and operation to the (A) stroke direction analyzer 74. The analyzer 74 measures the direction of stroke (A). The analyzer 74 includes an input OR gate 400 and an input AND gate 402. The OR gate 400 is activated by a count of "1" (CT1) or a count of "5" (CT5) appearing in the counter 380 in the stroke decoder 66. The AND gate 402 is enabled by the activation of the OR gate 400 as well as by the absence of a signal denoting that the direction of the stroke is either UP or HORIZONTAL. The AND gate 402 is activated by a start scan pulse (SSP) at the beginning of a vertical scan. The output of the AND gate 402 is coupled to the set terminal of flip-flop 404 which is reset by any one of a start character pulse (SCP), a TRACK (A) signal, an END (A) signal, a JOIN (A) signal or an EXTEND (A) signal. The "1" output level of the flip-flop 404 is coupled to drive a negative-going sawtooth wave ramp generator 406. The ramp generator 406 produces an output voltage which starts at a preset initial level, which may, for example, be +6.5 volts, and decreases linearly in the negative direction while being driven. When the driving signal from the flip-flop 404 is removed, the ramp generator 406 remains at the voltage level to which it has been driven until reset to its initial level. The ramp generator 406 includes a capacitor (not shown) which provides the storage to hold at the voltage level to which the generator 406 is driven. The generator 406 is reset by discharging the capacitor. The ramp generator 406, as well as the other ramp generators, to be described, are conventional known circuits. The "1" output terminal of the flip-flop 404 is also coupled to the set terminal of a flip-flop 408. The "1" output terminal of the flip-flop 408 as well as the "0" output terminal of the flip-flop 404 are coupled to an AND gate 410 which, when activated, drives a positive-going sawtooth wave ramp generator 412. The positive-going ramp generator 412 produces an output voltage which starts at an initial present level, which may, for example, be −6.5 volts, and increases linearly in a positive direction while being driven. When the driving signal from the flip-flop 408 is removed, the ramp generator 412 remains at the voltage level to which it has been driven until reset to its initial level. The output voltages $V_N$ and $V_P$ from the negative-going and positive-going ramp generators 406 and 412, respectively, are coupled to a conventional voltage comparator 414 which compares the two input voltages and produces an output when the output voltage $V_P$ of the positive-going ramp generator 412 is more positive than the output voltage $V_N$ of the negative-going ramp generator 406. The output of the comparator 414 is coupled to the reset terminal of the flip-flop 408 and the "0" output terminal of the flip-flop is coupled to reset both of the ramp generators 406 and 412.

The output voltage of the ramp generator 412 is also applied to a peak detector 416. The peak detector 416 stores the highest level of voltage reached by the positive-going ramp generator 412. The peak detector 416 is reset by a start character pulse (SCP), an (A) FORK reset signal and a long vertical left stroke pulse LVLP. The output voltage $V_D$ of the peak detector 416 and the output voltage $V_N$ of the ramp generator 406 are each coupled to a pair of conventional difference amplifiers 418 and 420. The difference amplifier 418 produces an output when the voltage level of the peak detector 416 is more positive than the voltage level of the ramp generator 406 by a specified amount, i.e., $V_D-V_N>\Delta$. Conversely, the difference amplifier 420 produces an output when the voltage level of the ramp generator 406 is more positive than the voltage level of the peak detector 416 by the same specified amount, i.e., $V_N-V_D>\Delta$. The amount $\Delta$ is the deviation from the horizontal that a stroke must exhibit before being recorded as going UP or DOWN. The difference amplifier 418 effectively determines when a stroke goes DOWN, and the difference amplifier 420 effectively determines when a stroke goes UP. The combination of the two amplifiers determines when a stroke is HORIZONTAL.

The difference amplifier 418 is coupled to enable an AND gate 422 and the gate 422 is in turn coupled to the set terminal of a flip-flop 424. The flip-flop 424 when set stores the information that a stroke took a DOWN direction. The difference amplifier 420 is coupled to enable an AND gate 426 and the gate 426 is in turn coupled to the set terminal of a flip-flop 428. The flip-flop 428 when set stores the information that a stroke took an UP direction. Both the amplifiers 418 and 420 are coupled through an OR gate 430 to the inhibit terminal of an AND gate 432. Thus, when neither amplifier produces an output, the AND gate 432 has an enabling signal applied thereto. The second enabling signal for the AND gate 432 is derived from the "0" output terminal of the flip-flop 424. Thus, the AND gate 432 is disabled if a stroke has already been measured as a DOWN stroke. The output of the AND gate 432 is coupled to set a flip-flop 434. The flip-flop 434 when set indicates that a stroke is HORIZONTAL.

The AND gates 422, 426 and 432 are periodically sampled by a signal derived from a one-shot multivibrator 436. The one-shot multivibrator 436 is triggered into operation when an AND gate 438 is activated. The input to the AND gate 438 is derived from the "1" output terminal of a flip-flop 440 as well as from the output of the AND gate 410. The flip-flop 440 is set by a count of "5" (CT5) in the counter 380 in the (A) stroke decoder 66. The flip-flop 440 is reset by any one of a start character pulse (SCP), an (A) FORK reset, or a long vertical left stroke pulse LVLP. The one-shot multivibrator 436 is also coupled to trigger a second one-shot multivibrator 440 which in turn is coupled to reset the peak detector 416. Both the "1" output terminals of the flip-flops 428 and 434 are coupled through an OR gate 442 to the inhibit terminal of the input AND gate 402. Thus, when a stroke is measured as either being HORIZONTAL or going UP, the stroke direction analyzer 74 is deactivated.

*Operation of stroke feature detectors*

In describing the operation of the stroke feature detectors, it will be assumed that the numeral "2," in FIGURE 3 is being scanned by the scanner 14. To simplify the explanation, the operation of the stroke direction analyzers 74, 76, 78 and 80 will be deferred until the end of this section. As an aid in describing the operation, the table of FIGURE 13 will be utilized to trace the sequence of strokes in the stroke tracker 230. In the table of FIGURE 13, the notation $P_1L$ means the leading edge of $P_1$ in scan SC1 of FIGURES 3*b* and $P_1T$ means the trailing edge of this pulse. A similar notation is utilized for the other pulses. The notation ABCD means that the tags or codes 001, 010, 011 and 000 are stored in the stages $T_1$ through $T_4$, respectively, of the stroke tracker 230. As the strokes are tracked, the letters become scrambled, i.e., CBAD, etc. The first letter "C" indicates that the code 011 is stored in the first stage $T_1$ of the stroke tracker 230, etc. When one of the letters is primed, it means that this tag has a "1" stored in the $2^2$ level, i.e., $A'=101$. This indicates that the stroke has been retired as either a JOIN or an END. It is also to be recalled that not all of the scans of the numeral "2" are shown in FIGURE 3*a*, nor will they be described except when necessary for a complete understanding of the operation.

The scan SCM in FIGURE 3*b* produces no video pulses. The stroke counter 220 and stroke tracker 230 are initially set as shown in line (1) of FIGURE 13. In scan SC1, the leading edge of pulse $P_1$ resets flip-flop 100 in the character control circuit (FIGURE 5) and sets the NEW stroke flip-flop 144 in the black crossing analyzer 58 (FIGURE 6). The trailing edge of pulse $P_1$ activates the AND gate 146 and produces a NEW stroke pulse from the NEW stroke detector 142 (FIGURE 6). The flip-flop 144 is reset by this pulse. The NEW stroke pulse is applied to the OR gate 240 in the stroke tracker control circuit 62 (FIGURE 8) and produces an advance S pulse. The advance S pulse is applied to the ring counter 220 and advances the "1" stored in the S4 stage to the S1 stage. One stroke has therefore been counted.

The AND circuit 280 in the stroke tracker 230 is activated and the $T_0$ inputs contain the stroke A code. Thus, stroke 30 in FIGURE 3*a* has been detected and labelled stroke A.

The advance S pulse is coupled through the OR gate 242 (FIGURE 8) to set the flip-flop 252 after the 1.5 microsecond delay introduced by the delay circuits 246 and 248. The AND gate 254 is activated and an advance T pulse produced. The advance T pulse is fed back to inhibit the AND gate 254 as well as to activate the AND gate 258. The AND gate 258 had been previously enabled by the $T_02^2$ lead line. The flip-flop 252 is therefore reset preventing additional advance T pulses from being generated by the oscillator 255. The advance T pulse is applied to the OR gate 300 (FIGURE 9) but does not advance the stroke tracker 230 since none of the AND gates 302, 304, 306 and 308 are enabled by the stroke counter 220.

The trailing edge of the pulse $P_2$ causes another NEW stroke pulse to be generated by the NEW stroke detector 142 (FIGURE 6) and an advance S pulse by the stroke tracker control circuit 62 (FIGURE 8). The advance S pulse advances the "1" in the stroke counter 220 to the S2 stage thereof. The AND gate 302 and circuit 282 are activated and the AND circuit 280 deactivated (FIGURE 9).

The advance S pulse causes one advance T pulse to be generated by the oscillator 255 (FIGURE 8) and the advance T pulse activates the AND gate 302 (FIGURE 9) to advance the $T_1$ and $T_2$ stages of the stroke tracker 230. The B stroke code 010 in the $T_2$ stage is fed back through the AND circuit to the $T_1$ stage while the A stroke code 001 is advanced to the $T_2$ stage. The $T_3$ and $T_4$ stages do not change because no advance pulses are applied to them due to the disabling of the AND gates 304, 306 and 308 by the S3 and S4 stages of the stroke counter 220. Thus, the stroke 32 has been detected in FIGURE 3*a* and two strokes have been counted in the character. The new state of the stroke tracker 230 is BACD with the A stroke code in the last stage ($T_2$) of the active cycling stages of the stroke tracker 230. Thus, the $T_0$ inputs contain the stroke A code and the AND gate 360 in the stroke A decoder 66 (FIGURE 11) is activated and the decoder 66 is primed and searching for the reoccurrence of stroke A.

At the end of scan SC1, the scanner 14 produces an end scan pulse (ESP) and the AND gate 102 in the character control circuit 52 (FIGURE 5) is activated, resetting the flip-flop 108. The one-shot multivibrator 110 is triggered by the flip-flop 108 and a start character pulse (SCP) is produced. The flip-flop 126 is reset as well as various other flip-flops throughout the character reader 10. Thus, the start character pulse is generated at the end of the first scan of a character.

At the start of scan SC2 (not shown in FIGURE 3*a*), the start scan pulse (SSP) produced by the scanner 14 activates the AND gate 112 and advances the scan counter 54 to a count of "2." Each successive start scan pulse (SSP) advances the counter 54 one.

In scan SC3, the absence of black in the top portion of the delayed (*b*) and present (*a*) video signals sets the flip-flop 154 in the TRACK detector 152 (FIGURE 6). The trailing edge of pulse $P_3$ activates the AND gate 158 and produces a TRACK pulse. The TRACK pulse is applied to activate the AND gate 372 and advance the MOD 8 counter 380 (FIGURE 11). The MOD counter 380 would be advanced to a count of "2" because the scan SC2 (not shown) contains a pulse similar to $P_3$ which is tracked as stroke (A) and advances the MOD 8 counter 380 to a count of "1."

The TRACK pulse is applied to the OR gate 242 (FIGURE 8) and produces one advance T pulse. It is to be noted that no advance S pulse is produced since an existing stroke (i.e., stroke 30) has just repeated itself in a succeeding scan. The advance T pulse advances the stroke tracker 230 (FIGURE 9) and the sequence of strokes is ABCD as shown in line (4) of FIGURE 13. The intervening white after pulses $P_1$ and $P_3$ sets the flip-flop 154 and the trailing edge of pulse $P_4$ produces a TRACK pulse. The stroke tracker 230 is shifted to BACD (line (5), FIGURE 13).

In scan SC5, the trailing edge of pulse $P_5$ generates a TRACK pulse for stroke A (stroke 30) and the trailing edge of pulse $P_6$ generates one for stroke B (stroke 32). The sequence of strokes in the stroke tracker 230 is BACD. However, the present scan SC5 goes white after pulse $P_6$ and before pulse $P_7$ while the previous scan remained black during this interval. Thus, the flip-flop 166 in the FORK detector 164 (FIGURE 6) is set by the trailing edge of pulse $P_6$ and is not reset by the absence of black in both the present and previous scans. Thus, the leading edge of pulse $P_7$ activates the AND gate 168 and produces a FORK signal. The FORK signal is applied to reset the flip-flop 154 in the TRACK detector 152 to prevent a TRACK signal from being generated at the trailing edge of pulse $P_7$. The FORK signal is also applied to the AND gate 204 in the detector 200. Since the FORK signal is generated in scan SC5, the flip-flop 202 is still set and the FORK signal activates the gate 204 to produce a FORK signal in the first zone.

The FORK signal is applied to the OR gate 240 in the stroke tracker control circuit 62 (FIGURE 8) and produces an advance S pulse. The stroke counter 220 is advanced to a count of "3." Therefore, stroke 34 in FIGURE 3*a* has been counted. The AND circuit 282 is deactivated and the AND circuit 284 activated (FIGURE 9). Thus, the $T_3$ stage is now the last active stage of the stroke tracker 230 and the inputs $T_0$ contain the stroke C code 011.

The FORK signal is also applied to reset the flip-flop 266 (FIGURE 8) as well as through the OR gate 242 to the delay circuit 246. After a 1 microsecond delay, the output pulse of the delay circuit 246 activates the AND gate 268 and a delayed FORK pulse is produced. Since the input AND gate 364 of the C stroke decoder 70 is activated, and the AND gate 370C thereof enabled, the delayed FORK signal activates the AND gate 370C and sets the flip-flop 378C. The circuit 370C and 378C (not shown) are in the C stroke decoder 70 and correspond exactly to the circuits 370 and 378 in the A stroke decoder 66 (FIGURE 11). A similar notation is used for the B stroke decoder 68. The setting of the flip-flop 378C records that stroke C (stroke 34 in FIGURE 3*a*) began as a FORK.

The B stroke code 010 stored in the $T_1$ stage of the stroke tracker 230 enables the AND gate 368B in the B stroke decoder 68 (not shown). The first zone FORK signal from the AND gate 204 (FIGURE 6) activates the AND gate 368B and resets the MOD 8 counter 380B. The MOD 8 counter 380B for the B stroke (stroke 32, FIGURE 3*a*) is reset to prevent a stroke direction measurement on this stroke at a time when another stroke (stroke 34, FIGURE 3*a*) is forking away from it. This insures that erroneous direction measurements on stroke 32 do not occur.

The delayed FORK flip-flop 226 is reset by the output of the delay circuit 248 (FIGURE 8) and an advance T pulse is derived from the stroke tracker control circuit 62 (FIGURE 8). The advance T pulse activates the AND gates 302 and 304 in the stroke tracker 230 (FIGURE 9) and the C stroke code is shifted from the $T_3$ stage to the $T_1$ stage. The $T_1$ and $T_2$ stages are also shifted so that the sequence of strokes at the end of scan SC5 is CBAD (line (8), FIGURE 13). The third stroke (stroke C) has been correctly sequenced into the stroke tracker 230 and a FORK (C) has been recorded indicating that this stroke began as a FORK. The A stroke decoder 66 is now primed by the $T_0$ lead lines to search for a TRACK signal for stroke A and it occurs in the right sequence.

It is apparent that the stroke counter 220 not only counts strokes but also enlarges the stroke tracker 230 and correctly sequences into the tracker 230 another stroke when it is detected. The stroke tracker 230 tracks each stroke without confusion and also functions to switch into the right stroke decoders 66, 68, 70 and 72 the data for its corresponding stroke.

The scan SC7 produces TRACK signals for three strokes, i.e., strokes A, B and C in that order. The succeeding scans up to scan SC14 do the same. At the beginning of scan SC14, the sequence of strokes in the stroke tracker 230 is CBAD (line (15), FIGURE 13).

In scan SC14 the trailing edge of the delayed pulse $P_{17}$ produces a TRACK signal and the stroke tracker 230 is shifted to the sequence ACBD. The trailing edge of the delayed pulse $P_{17}$ sets the flip-flop 174 in the JOIN detector 172 and the AND gate 176 is activated by the leading edge of the delayed pulse $P_{18}$ (FIGURE 6). A JOIN signal is therefore produced and applied to the B stroke decoder 68 since the B stroke code is stored at this time in the inputs $T_0$ of the stroke tracker 230. The AND gate 376B in the B stroke decoder 68 is activated and the flip-flop 390B is set, recording that B stroke ended as a JOIN.

The JOIN (B) pulse derived from the AND gate 376B is applied to the OR gate 244 (FIGURE 8) which after a 1 microsecond delay sets the flip-flop 264 producing a retire stroke signal. The retire stroke signal is applied to the OR gate 290 in the stroke tracker 230 and causes the $T_0 2^2$ input to go from low to high, i.e., "0" to "1."

The output of the OR gate 244 (FIGURE 8) also is applied to produce an advance T pulse which causes the $T_1$ stage of the stroke tracker to store the code 110, or B′. Thus, stroke B is stored in the stroke tracker 230 as a retired stroke. The sequence of strokes in the tracker 230 is now B′ACD. The pulse $P_{21}$ produces a TRACK signal for stroke C and the sequence of strokes changes to CB′AD.

Scan SC14 is considered to be the last scan which intercepts any portion of the outline trace of the numeral "2." The reason why this scan is labelled SC14 instead of SC15 is so that a more detailed description of the operation of the stroke detectors may be given. During scan SCM, the leading edge of the delayed pulse $P_{20}$ sets the flip-flop 182 in the END detector 180 (FIGURE 6). The trailing edge of the delayed pulse $P_{20}$ activates the AND gate 184 and produces an END signal. The END signal activates the AND gate 374 in the A stroke decoder 66 (FIGURE 11) and triggers the one-shot multivibrator 382 to its astable operating state. The flip-flop 386 is in the reset condition because scan SCM is counted as the fifteenth scan and thus no character margin signal is produced by the flip-flop 114 in the character control circuit (FIGURE 5). The leading edge of the output pulse from the multivibrator 382 activates the AND gate 388 to produce an EXTEND A signal and the trailing edge of the pulse triggers the flip-flop 386 from the reset to the set condition.

The EXTEND (A) signal pulse is applied to the multisection delay circuit 60 (FIGURE 4) at a position such that the EXTEND pulse will arrive at the pulse analyzer 58 substantially one scan time later than the delayed pulse $P_{20}$. The EXTEND pulse is also applied to the OR gate 242 to generate a first advance T pulse which advances the stroke tracker 230 so that the strokes are sequenced ACB′D. The B′ stroke code 110 is in the $T_3$ stage and the OR gate 260 (FIGURE 8) is inhibited by the $T_0 2^2$ input. Thus, the first advance T pulse cuts off the AND gate 254 in the oscillator 255 and a half microsecond later a second advance T pulse is produced to advance the strokes in the stroke tracker 230 to the sequence AB′CD. The appearance of the C stroke code 011 in the $T_0$ lead lines activates the OR gate 260 and resets the flip-flop 252 to prevent the generation of another advance T pulse.

Thus, it is apparent that a retired stroke code causes an additional advance pulse to be generated so that the strokes are tracked properly.

The delayed pulse $P_{21}$ also produces an END signal which in turn also generates an EXTEND (C) signal. The EXTEND (C) signal is applied to the delay circuit 60 (FIGURE 4) similar to the EXTEND (A) signal. The EXTEND (C) signal generates one advance T pulse which advances the strokes in the stroke tracker 230 to the sequence CB′AD.

The first artificial video pulse during the second scan of the marginal space of the numeral "2" produces an END signal in the pulse analyzer 58 which is applied to the AND gate 374 (FIGURE 11) to trigger the multivibrator 382. The multivibrator 382 activates the AND gate 384, which gate was previously enabled by the flip-flop 386. An END (A) signal is produced and applied to the OR gate 244 (FIGURE 8) to produce a retire stroke level. The END (A) signal also produces a first advance T pulse which advances the A stroke code 001 from the $T_3$ to the $T_1$ stage of the tracker 230 and changes the code to the A′ code 101. Thus, the sequence of strokes in the tracker 230 in A′CB′D. The B′ code in the $T_3$ stage causes the oscillator 255 to generate a second advance T pulse which causes the stroke sequence to be B′A′CD (line (20), FIGURE 13).

The A′ code indicates that stroke 30 has ended and the character reader is now searching for the end of the last remaining stroke, i.e., stroke 34, labelled C.

The second artificial video pulse generates an END (C) signal which generates an advance T pulse and changes the C code 011 to the C′ code 111 while advancing C′ into the $T_1$ stage of the stroke tracker 230. The sequence of strokes in the tracker 230 is C′B′A′D.

The "1's" stored in the $2^2$ levels of the stroke tracker 230 stages $T_1$ through $T_3$ activate the AND gates 326, 330 and 328 in the all strokes retired circuit 320 (FIGURE 9), and generates an all strokes retired signal which is applied to the stroke tracker control circuit 62 (FIGURE 8) to prevent the generation of more advance T pulses.

The scan SCM is counted as the fifteenth scan by the scan counter 54 (FIGURE 5). However, no black video occurs during this scan to reset the flip-flop 100. Therefore, at the end of this scan, the MOD 2 counter 106 is advanced to one. The next marginal scan is counted as the sixteenth scan and the flip-flop 114, which had been reset at scan SC3, is set. The setting of the flip-flop 114 enables the AND gate 116, which gate is activated at the end of this scan. Additionally, the second scan of the margin advances the MOD 2 counter to a count of "2." Thus, by either signal the flip-flop 108 is set and the AND gate 118 activated to trigger the multivibrator 122. The multivibrator 122 produces an end of character pulse (ECP) which signifies that the scanning of a complete character has ended.

The ECP pulse activates the AND gate 124 since the gate is previously enabled by setting of the flip-flop 126 at a scan count of "5." The AND gate 124 produces a start feature readout (SFR) signal, the function of which will be described later.

*Stroke Direction Analyzer Operation*

To simplify the description of the operation of the stroke direction analyzers 74 through 80 only the measurement of the direction of stroke 30 (stroke A) of FIGURE 3*a* will be described in detail. The measurements of strokes 32 and 34 (strokes B and C) will be briefly mentioned where necessary for a full understanding of the operation of the analyzers.

The stroke direction analyzers are analog in nature and periodically measure the scanning time from the start of a scan until the interception of a stroke by the electron beam in the scanner 14. Since the start of a scan is a fixed reference point, the measurements taken periodically by the stroke direction analyzers effectively denote whether the stroke goes UP, DOWN or remains HORIZONTAL.

Referring now to FIGURE 12, the OR gate 400 is activated by a count of "1" (CT1) in the counter 380 (FIGURE 11) and enables the AND gate 402. The counter 380 contains a count of "1" when stroke A (stroke 30) has been tracked for the first time. It will be assumed that stroke A was tracked for the first time in scan SC2 (not shown). Therefore, at the beginning of scan SC3, the start scan pulse (SSP) activates the AND gate 402 which sets the flip-flop 404. The "1" of the flip-flop 404 sets the flip-flop 408 and also provides a driving signal for the negative-going ramp generator 406.

The ramp generator 406 is initially set at a voltage level $V_N1$ in FIGURE 3*c*, which may, for example, be +6.5 volts, and is driven negatively to produce a linearly decreasing sawtooth output voltage wave. A TRACK (A) signal is produced by pulse $P_3$ in scan SC3 when stroke A is encountered in this scan and the flip-flop 404 is reset. The ramp generator 406 holds at the level to which it has been driven, such as $V_N2$ in FIGURE 3*c*.

The resetting of the flip-flop 404 activates the AND gate 410 and a driving signal is applied to the positive-going ramp generator 412. The ramp generator 412 is initially set to a voltage level $V_P1$ in FIGURE 3*c*, which may, for example, be −6.5 volts, and is driven positively to produce a linearly increasing sawtooth output wave. Both the output voltages of the ramp generators 406 and 412 are applied to a comparator 414 which is activated when the positive-going ramp generator 412 output voltage $V_P2$ is more positive then the output voltage $V_N2$ of the ramp generator 406. The comparator 414 resets the flip-flop 408 which in turn resets the ramp generators 406 and 412 to their initial voltage levels $V_N1$ and $V_P1$, respectively. However, the peak detector 416, which is also coupled to the positive-going ramp generator 412, stores the voltage level $V_P2$, renamed $V_D1$, of the generator 412.

Thus, the peak detector 416 effectively stores a voltage level indicative of the scanning time from the start of scan SC3 to the interception of stroke 30 (stroke A). The voltage level is consequently also a measurement of the distance from the top of the scanning raster to stroke 30 of the numeral "2."

The counter 380 (FIGURE 11) is advanced once during each of the scans SC4 through SC7. Thus, at the pulse $P_8$ in scan SC7 the counter 380 produces a count of "5" (CT5) which sets the flip-flop 440 (FIGURE 12) and also activates the OR gate 400. The start scan pulse (SSP) at the start of the next scan SC8 (not shown in FIGURE 3*b*) again causes the negative-going ramp generator 406 to be driven negatively until a TRACK (A) pulse is generated. The TRACK (A) pulse generated on this scan occurs sooner than on scan SC3 since the stroke 30 curved upwardly. The flip-flop 404 is reset and the ramp generator 406 holds at the level to which it has been driven. The voltage level, shown as $V_N3$ in FIGURE 3*c*, is more positive than the level $V_N2$ on the scan SC3.

The resetting of the flip-flop 404 activates the AND gate 410 and the output of the gate 410 activates the AND gate 438. The one-shot multivibrator 436 is triggered and the pulse output thereof samples the difference amplifiers 418 and 420. The difference amplifier 418 does not produce an output since $V_N3$, the voltage level of the generator 406, is more positive than $V_D1$, the voltage level of the peak detector 416. The amplifier 420 does produce an output since $(V_N3-V_D1)>\Delta$, where $\Delta$ is a difference in voltage sufficient to indicate a deviation from the horizontal. Thus, the AND gate 426 is activated and the flip-flop 428 set. The setting of the flip-flop 428 records that stroke A (stroke 30) took an UP direction. The signal output of the flip-flop 428 is fed back through the OR gate 442 to disable the input AND gate 402 to prevent further measurements being taken.

The stroke 32 (FIGURE 3*a*) would be measured as UP by the (B) stroke direction analyzer 76 and the stroke 34 would be measured as HORIZONTAL by the (C) stroke direction analyzer 78.

Even though the stroke 30 later curves downwardly, the stroke is considered an UP stroke by the analyzer 74. No UP and then DOWN strokes are measured. However, a DOWN and then UP stroke, such as occurs in the character "M," is measured by the stroke direction analyzers. It is to be noted that once a stroke is measured as DOWN, it cannot be later measured as HORIZONTAL since the input AND gate 432 to the HORIZONTAL flip-flop 434 is inhibited by the output of the DOWN flip-flop 424.

Cavity Feature Detectors

The cavity feature detectors measure the size of the top and bottom cavities formed by the outline trace of some characters, such as the top cavity 40 and bottom cavity 42 of the character "M" in FIGURE 2*a*. The top and bottom cavity sizes are also compared to determine if the top cavity size is greater than the bottom cavity size. The cavity feature detectors also measure the squareness of the left corners of the characters as well as measure the bottom cavity at the center of the characters.

*Top cavity detector*

Figure 14:
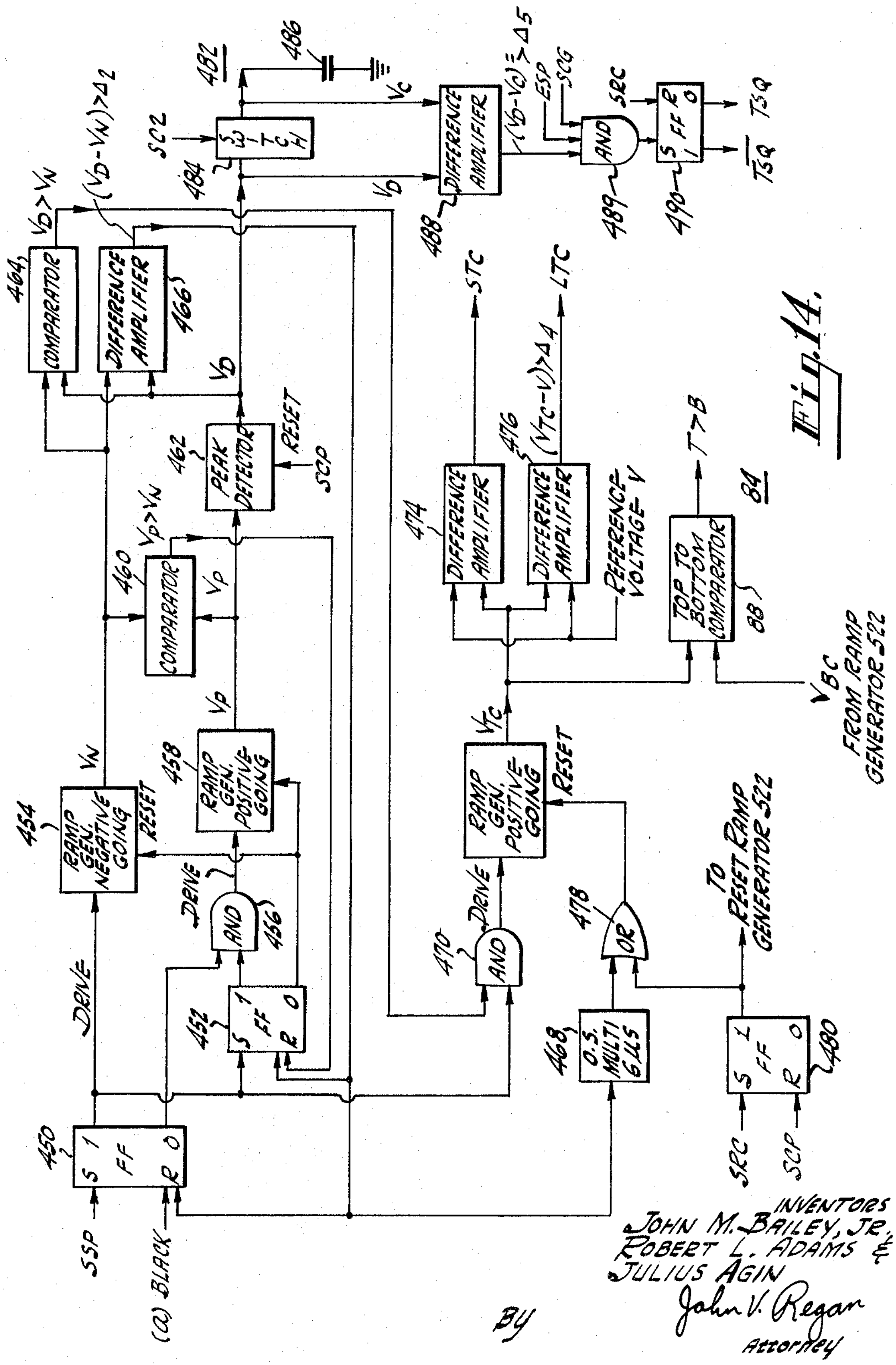
FIGURES 14 and 15 are block diagrams of top and bottom cavity analyzer circuits utilized in the recognition circuit of FIGURE 4.

The top cavity detector or analyzer 84 of FIGURE 14 is an analog circuit. The detector 84 includes an input flip-flop 450 which is set by a start scan pulse (SSP) and reset by black video (*a*) in a direct or present scan, derived from the input terminal 50 of the feature recognition circuits (FIGURE 4). The output of the "1" terminal of the flip-flop 450 is coupled to set a flip-flop 452 as well as to drive a negative-going ramp generator 454. The "1" output terminal of the flip-flop 452 as well as the "0" output terminal of the flip-flop 450 are coupled through an AND gate 456 to drive a first positive-going ramp generator 458. Both the positive and negative-going ramp generators 454 and 458 are reset when the flip-flop 452 is reset. Both the ramp generators 454 and 458 are coupled to the first comparator 460. The comparator 460 produces an output when the voltage level of the positive-going ramp generator 458 $V_P$ is more positive than the voltage level $V_N$ of the negative-going ramp generator 454. The output of the comparator 460 is coupled back to reset the flip-flop 452.

The ramp generator 458 is also coupled to a peak detector 462 which is reset by a start character pulse (SCP). The output of the peak detector 462 as well as the output of the negative-going ramp generator 454 are applied to a second comparator 464 as well as to a difference amplifier 466. The comparator 464 produces an output when the voltage level $V_D$ of the peak detector 462 is more positive than the voltage level $V_N$ of the negative-going ramp generator 454. The difference amplifier 466 produces an output when the voltage level $V_D$ of the peak detector 462 is more positive than the level $V_N$ of the negative-going ramp generator 454 by a predetermined amount $\Delta_2$.

The output of the difference amplifier 466 is coupled to reset the flip-flops 450 and 452 as well as to trigger a one-shot multivibrator 468. The output of the second comparator 464 and the "1" output terminal of the flip-flop 450 are coupled through an AND gate 470 to drive a second positive-going ramp generator 472. The voltage output of the positive-going ramp generator 472 as well as a predetermined reference voltage level V are applied to a pair of difference amplifiers 474 and 476. When the voltage level of the positive-going ramp generator 472 $V_{TC}$ is more positive than the reference voltage V by a predetermined amount $\Delta_4$, the difference amplifier 476 produces an output. An output from the difference amplifier 476 effectively denotes that a character has a large top cavity (LTC). When the voltage level of the positive-going ramp generator $V_{TC}$ is equal to the reference voltage V, or not greater than the reference voltage V by a predetermined amount $\Delta_3$, the difference amplifier 474 produces an output. An output from the difference amplifier 474 effectively denotes that a character has no top cavity or a small top cavity (STC). When an intermediate top cavity is detected, neither of the amplifiers 474 or 476 produce an output.

The ramp generator 472 is reset by the output of an OR gate 478 which is activated by the multivibrator 468 or the "1" output of a flip-flop 480. The flip-flop 480 is set by a start recognition cycle (SRC) signal, the origin of which will be described later. The flip-flop 480 is reset by a start character pulse (SCP).

Figure 15:
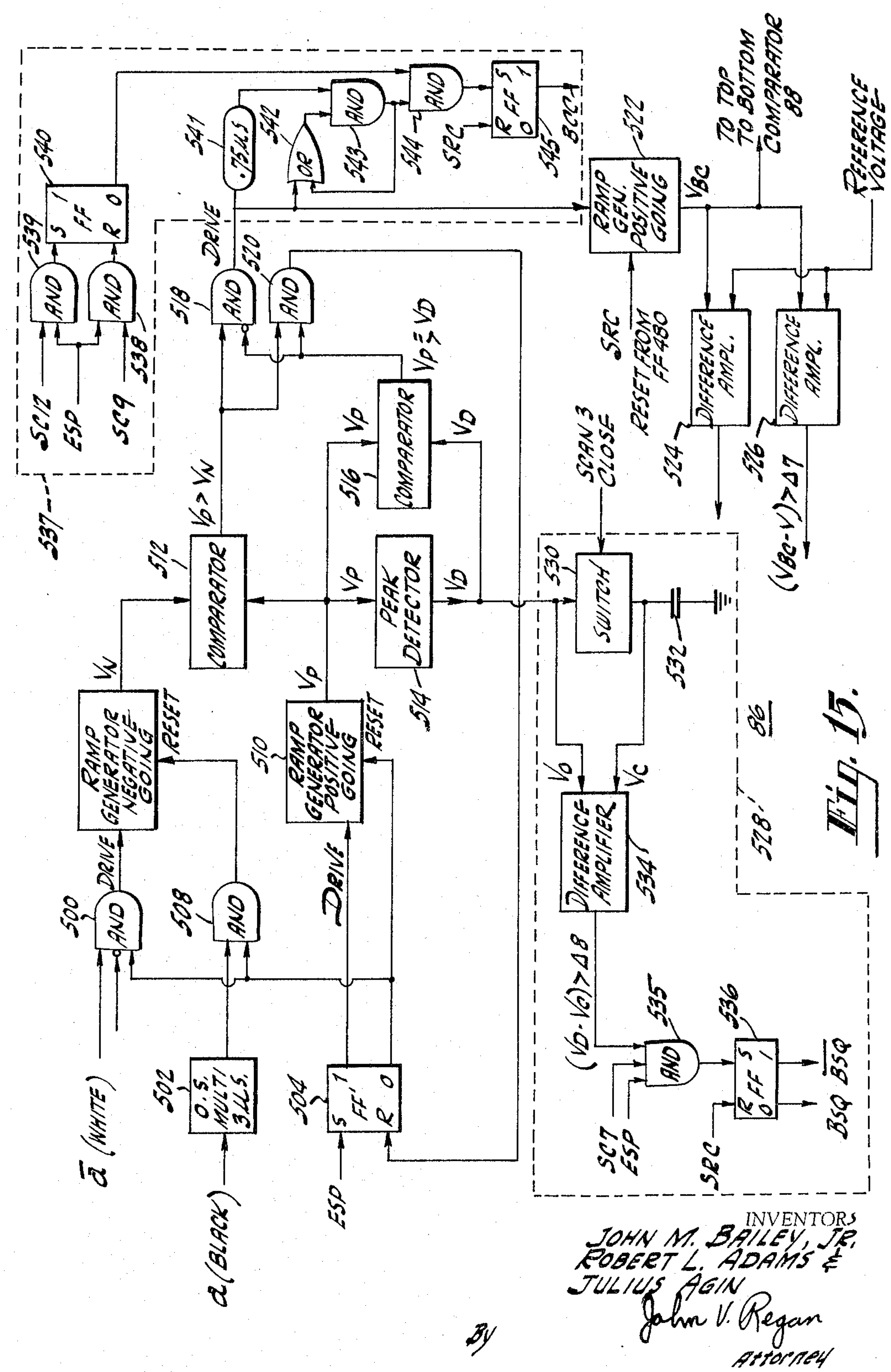

The ramp generator 472 is also coupled to the top-to-bottom cavity comparator 88. The other input to the comparator is derived from the bottom cavity detector 86 (FIGURE 15). The comparator 88 produces an output when the top cavity size exceeds the bottom cavity.

The top cavity detector 84 also includes a square corner detector 482 which measures the squareness of the top lefthand corner of a character. To accomplish this, a bilateral transistor switch 484 is coupled to the output terminals of the peak detector 462. The switch 482 is closed only during an output from the count of "2" terminal (SC2) of the scan counter 54 (FIGURE 5). A capacitor 486 is coupled to the switch 484 to charge up to the voltage level on the peak detector 462 when the switch 484 is closed. If the voltage on the capacitor 486 is greater than the voltage level of the peak detector 462, the capacitor 486 discharges through the bilateral transistor until it reaches the level of the peak detector. The capacitor 486 stores the voltage level of the peak detector 462 during the remaining scans of the character. The capacitor 486 (i.e., the ungrounded electrode thereof) and the peak detector 462 are coupled to a difference amplifier 488. The difference amplifier 488 produces an output when the peak detector 462 voltage $V_D$ is more positive than the capacitor 486 voltage $V_C$ by a predetermined amount $\Delta_5$ or an amount greater than $\Delta_5$. The output of the difference amplifier 488 is coupled to one input of an AND gate 489. The other inputs to the AND gate 489 comprise an end of scan pulse (ESP) and a scan count of "6" (SC6). Thus, the amplifier 488 is sampled at the end of scan six. The AND gate 489 is coupled to set a flip-flop 490 when the amplifier 488 produces an output. An outut from the "1" output terminal of the flip-flop 490 denotes the absence of a top square corner ($\overline{TSQ}$). The flip-flop 490 is reset by an SRC signal, to be described later.

*Operation of top cavity detector*

Figure 2C:
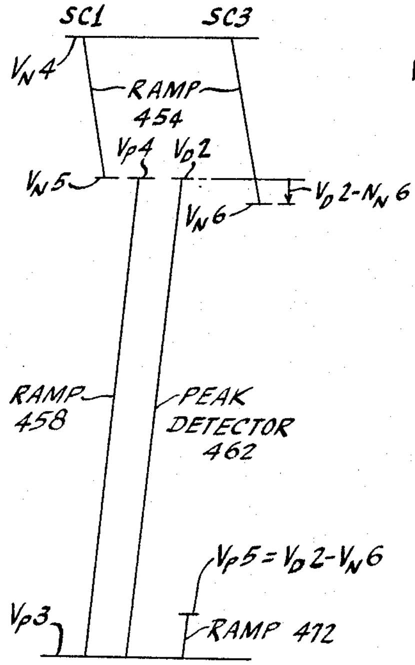

The character "M" in FIGURE 2*a* is utilized to aid in the description of the operation of the top cavity analyzer circuit 84. The input flip-flop 450 is set by a start scan pulse (SSP) at the beginning of scan SC1 (FIGURE 2*b*). The setting of the flip-flop 450 (FIGURE 14) provides a driving signal for the ramp generator 454. The ramp generator 454, which is initially set to a voltage level $V_N4$ in FIGURE 2*c*, which may, for example, be +6.5 volts, produces an output sawtooth voltage wave which decreases linearly. When the first black video occurs in this scan, which is the leading edge of pulse $P_{22}$, the flip-flop 450 is reset. The ramp generator 454 holds at the voltage level $V_N5$ to which it has been driven (FIGURE 2*c*).

The resetting of the flip-flop 450 activates the AND gate 456 (FIGURE 14) and provides a driving signal for the first positive-going ramp generator 458. The ramp generator 458, which is initially set to a voltage level $V_P3$ in FIGURE 2*c*, which may, for example, be −6.5 volts, produces an output sawtooth voltage wave which increases linearly until it is more positive than the voltage level $V_N5$ of the negative-going ramp generator 454. When the voltage level of the positive ramp generator 458 is more positive than the voltage level of the negative-going ramp generator 454, the comparator 460 is activated and resets the flip-flop 452 as well as the ramp generators 454 and 458. However, the voltage level of the positive-going ramp generator 458 is stored in the peak detector 462, i.e., $V_P4=V_D2$ (FIGURE 2*c*).

On the scan SC3, the flip-flop 450 is set by the start scan pulse (SSP) and the ramp generator 454 is driven negatively until the outline trace of the character "M" is intercepted, i.e., the leading edge of pulse $P_{23}$ (FIGURE 2*b*). It is to be noted that the final voltage level $V_N6$ to which the negative-going ramp generator 454 is driven on this scan is below or more negative than the level $V_N5$ it was driven to on the scan SC1 (FIGURE 2*c*) because the outline trace of the character "M" dips in the middle. When the voltage level of the negative-going ramp generator 454 decreases below the voltage level $V_D2$ of the peak detector 462 (which is substantially the same level as $V_N5$), the second comparator 464 produces an output and activates the AND gate 470. The AND gate 470 provides a driving signal for the second positive-going ramp generator 472. The ramp generator 472 voltage increases linearly (FIGURE 2*c*) until the negative-going ramp generator 454 is stopped by the resetting of the flip-flop 450. The second positive-going ramp generator 472 therefore stores a voltage level $V_P5=V_D2-V_N6$.

The resetting of the flip-flop 450 again drives the positive-going ramp generator 458 (not shown in FIGURE 2*c*) until its voltage output is more positive than the voltage of the negative-going ramp generator 454, i.e., $V_N6$. At this point the first comparator 460 resets the flip-flop 452 which resets both the ramp generators 454 and 458. Both the peak detector 462 and the positive-going ramp generator 472 hold their voltage levels.

It is to be noted that the voltage level $V_D2$ stored in the peak detector 462 is a reference level representing the highest point of the outline trace of the character "M." The ramp generator 472 in scan SC3 as well as in each remaining scan of the character stores a voltage which is a measurement of the portion of a scan which occurs below this reference level but above the outline trace of the character, i.e., $V_D2-V_N6$. Thus, the voltage of the ramp generator 472 increases in each successive scan and effectively integrates the portions of the scans occurring in the top cavity 40 of the character "M" or the amount of time spent in scanning the top cavity. A top cavity is therefore effectively defined by the character reader 10 as the area to the right of, and above black, in a character. With this machine definition, the character "A" would have a top cavity as well as characters such as "Y" and "M."

The succeeding scans of the character "M" cause the second positive-going ramp generator 472 to increase in voltage each time the negative-going ramp generator 454 decreases below the voltage exhibited by the peak detector 462. Thus, at the end of scanning the entire character, the ramp generator 472 contains a measurement of the size of the top cavity 40 in the character "M."

When the inter-margin space between the character "M" and the next character on the document 12 is reached in scan SCM, the negative-going ramp generator 454 is driven negatively far below the peak detector 462 voltage level since no outline trace is intercepted in this scan. Thus, the ramp generator 472 is driven far above its correct voltage level. However, when the peak detector 462 voltage level is greater than the voltage level of the negative-going ramp generator 454 by a predetermined amount $\Delta_2$, the difference amplifier 466 produces an output which resets both the flip-flops 450 and 452. The flip-flop 452 resets both the ramp generators 454 and 458 back to their initial levels. Additionally, the difference amplifier 466 output also triggers the one-shot multivibrator 468. The pulse output of the multivibrator 468 is coupled to the reset terminal of the second positive-going ramp generator 472. The pulse output of the one-shot multivibrator 480 is selected to be of a sufficient duration to return the ramp generator 472 to its correct level. In the character reader 10, a pulse duration of 6 microseconds is of sufficient duration to return the ramp generator 472 to the correct voltage level.

The final voltage level $V_{TC}$ in the second positive-going ramp generator 472 as well as a reference voltage V (from a source not shown) are applied to the difference amplifiers 474 and 476. An output from the difference amplifier 474 indicates that a small top cavity (STC) has been detected. An output from the amplifier 476 indicates that a large top cavity (LTC) has been detected. The reference voltage V is selected for each font to be read so that the measurements of the size of the top cavities will be a reliable feature in differentiating the characters.

The final voltage level of the ramp generator 472 along with a similar voltage level from the bottom cavity detector are applied to a top-to-bottom cavity comparator 88. The comparator 88 produces an output if the top cavity exceeds the bottom cavity in size.

The top cavity analyzer 84 also measures the squareness of the top left corner of characters. The transistor switch 484 is closed on scan SC2 and the voltage level $V_D2$ of the peak detector 462 is stored at this time by the capacitor 486. The switch is opened on the scan count SC3 but the capacitor 486 retains the peak detector voltage $V_D2$ throughout the remaining scans of the character "M." Since the voltage level of the peak detector 462 does not rise above the level $V_D2$ by an amount equal to or greater than a predetermined amount $\Delta_5$ at the scan count of "6" (SC6), the difference amplifier 488 does not produce an output. Thus, the flip-flop 490 remains reset which denotes the presence of a top square corner (TSQ) in the character "M."

The flip-flop 480 resets the ramp generator 472 when a start recognition cycle (SRC) signal is received, as will be described later, to prepare the top cavity detector 84 for the next character.

*Bottom Cavity Detector*

Referring now to FIGURE 15, the bottom cavity analyzer or detector 86 is shown. The bottom cavity detector 86 is an analog circuit which is somewhat similar to the top cavity detector 84. The detector 86 includes an input AND gate 500 having three input terminals, one of which is an inhibit terminal. The first input terminal of the gate 500 is coupled to the input terminal 50 of the feature recognition circuits 18 (FIGURE 4) so as to be enabled when white video signals ($\bar{a}$) are applied thereto and disabled when black video signals are applied. The second, inhibit, input terminal of the gate 500 is coupled to the output terminal of a one-shot multivibrator 502, which multivibrator is triggered by a black video signal ($a$) applied to its input terminal. The third input to the AND gate 500 is derived from the "0" output of a flip-flop 504. The output of the AND gate 500 is coupled to drive a negative-going ramp generator 506. The ramp generator 506 is reset by a signal derived from an AND gate 508. The AND gate 508 is activated when the flip-flop 504 is reset and the one-shot multivibrator 502 is triggered to its astable operating state.

The "1" output terminal of the flip-flop 504 is coupled to drive a first positive-going ramp generator 510. The ramp generator 510 is reset by the resetting of the flip-flop 504. Both the positive- and negative-going ramp generators 510 and 506 are coupled to a first comparator 512. The comparator 512 produces an output when the voltage level $V_P$ of the first positive-going ramp generator 510 is more positive than the voltage level $V_N$ of the negative-going ramp generator 506. The first positive-going ramp generator 510 is also coupled to a peak detector 514, as well as to a second comparator 516. The second input to the comparator 516 is derived from the peak detector 514. The second comparator 516 produces an output when the voltage level $V_P$ of the ramp generator 510 equals or is more positive than the voltage level $V_D$ of the peak detector 514. The output of the second comparator 516 is applied to an inhibit input terminal of an AND gate 518 and directly to an AND gate 520. The second inputs to the AND gates 518 and 520 are derived from the first comparator circuit 516. The output of the AND gate 520 is coupled back to reset the flip-flop 504. The output of the AND gate 518 is coupled to drive a second positive-going ramp generator 522. The ramp generator 522 is coupled to a pair of difference amplifiers 524 and 526, the other inputs to which comprise a reference voltage level V.

The difference amplifier 526 produces an output when the voltage $V_{BC}$ of the ramp generator 522 is more positive than the reference voltage V by a predetermined amount $\Delta_7$. The output indicates that the character scanned has a large bottom cavity (LBC). The difference amplifier 526 produces an output when the voltage $V_{BC}$ of the ramp generator 522 is equal to the reference voltage V, or not greater than the reference voltage V, by a predetermined amount $\Delta_6$. The output indicates that the character scanned has no bottom cavity or a small bottom cavity (SBC). The voltage $V_{BC}$ of the ramp generator 522 is also applied to the top-to-bottom cavity comparator 88 (FIGURE 14). The ramp generator 522 is reset by the flip-flop 480 (FIGURE 14) during the start recognition cycle.

A bottom square corner detector 528 is also included in the bottom cavity detector 86 and includes a bilateral transistor switch 530 coupled between the peak detector 514 and a capacitor 532. The transistor switch 530 is closed by a scan count of "3" (SC3) from the scan counter 54 so as to transfer the voltage stored in the peak detector 514 at this scan count to the capacitor 532.

Both the peak detector 514 voltage $V_D$ and the voltage $V_C$ stored by the capacitor 532 are applied to a difference amplifier 534. The difference amplifier 534 produces an output when the voltage $V_D$ of the peak detector 514 exceeds the voltage $V_C$ of the capacitor 532 by a predetermined amount $\Delta_8$. The output of the difference amplifier 534 is coupled to one input terminal of an AND gate 535. The other inputs to the AND gate 535 comprise an end of scan pulse (ESP) and a scan count of "7" (SC7). Thus, the difference amplifier 534 is sampled at the end of scan seven. An output from the amplifier 534 and gate 535 sets a flip-flop 536 and such a setting denotes the absence of a bottom square corner ($\overline{BSQ}$). The flip-flop 536 is reset by an SRC signal.

Also included in the bottom cavity detector 86 is a bottom center cavity detector 537 which is utilized primarily to differentiate between the letter "S" and the numeral "5." The detector 537 includes a pair of input AND gates 538 and 539 which are enabled by an end of scan pulse (ESP) and activated by a scan count of "9" (SC9) and a scan count of "12" (SC12), respectively. The output of the AND gate 538 is coupled to the reset terminal of a flip-flop 540 while the output of the AND gate 539 is coupled to the set terminal thereof.

The detector 537 also includes a delay circuit 541 and an OR gate 542 coupled to the output terminal of the AND gate 518. The outputs of the delay circuit 541 and OR gate 542 are coupled to an AND gate 543, the output of which is fed back to comprise the other input to the OR gate 542. The output of the AND gate 543 as well as the "0" output terminal of the flip-flop 540 are coupled to an AND gate 544, the output of which is coupled to the set terminal of a flip-flop 545. The flip-flop 545 is reset by a start recognition cycle (SRC) signal, to be described subsequently. The setting of the flip-flop 545 denotes that a character being read exhibits a bottom center cavity (BCC).

Thus, the bottom center cavity detector 537 detects the presence of a bottom cavity in the center portion of a character. The delay circuit 541 exhibits a predetermined delay of, for example, 0.75 microsecond so as to cause the detector 537 to discriminate against short duration signals from the AND gate 518. Signals which are passed through the AND gate 543 are fed back through the OR gate 542 to stretch them to their former width.

*Operation of Bottom Cavity Detector*

Figure 2D:
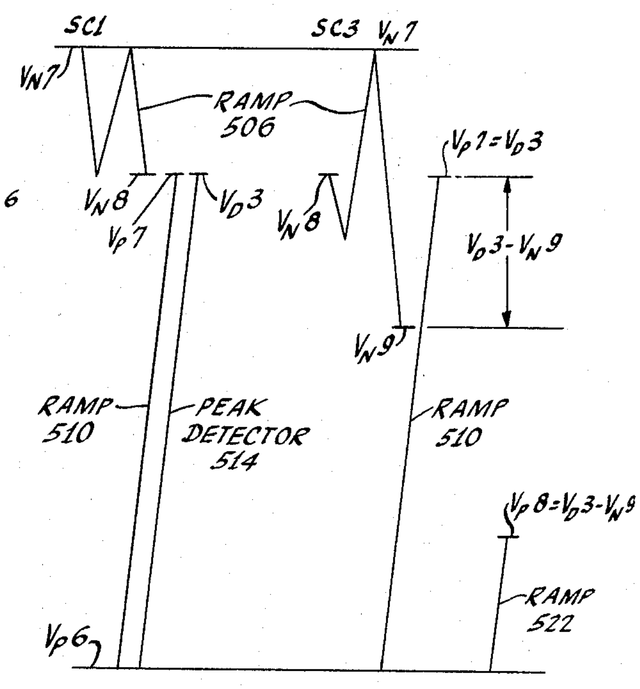

In describing the operation of the bottom cavity detector 86, it will be assumed that the character "M" in FIGURE 2*a* is being scanned. During the first scan SC1 of the character "M," the AND gate 500 will be activated at the start of the scan due to the absence of black video ($\bar{a}$) and the initial reset condition of the flip-flop 504. A driving signal is therefore applied to the negative-going ramp generator 506 which produces a sawtooth output voltage decreasing linearly from its initial level of $V_N7$ (FIGURE 2*d*). When the scan SC1 intercepts the outline trace of the character "M" at the left vertical stroke 36, at the leading edge of pulse $P_{22}$ thereof, the one-shot multivibrator 502 is triggered to its astable operating state and cuts off the AND gate 500. Simultaneously, the AND gate 508 is activated by the multivibrator 502 and the ramp generator 506 is reset back to its initial level $V_N7$ (FIGURE 2*d*) by the 3 $\mu$s. pulse output of the multivibrator 502. When the multivibrator 502 returns to its stable state, the AND gate 500 is still disabled because the scanning of the left vertical stroke 36 of the character "M" is continuing (FIGURE 2*a*). When the scan SC1 goes below the left vertical stroke 36, the AND gate 500 is again activated and drives ramp generator 506 negatively. At the end of scan SC1, an end scan pulse (ESP) sets the flip-flop 504 and cuts off the ramp generator 506. The ramp generator 506 holds at the voltage level $V_N8$ to which it has been driven (FIGURE 2*d*). The setting of the flip-flop 504 drives the first positive-going ramp generator 510 from its initial voltage level $V_P6$ so as to increase linearly in a positive direction. When the voltage level $V_P7$ of the first positive-going ramp generator 510 exceeds the voltage level $V_N8$ of the negative-going ramp generator 506, the first comparator 512 produces an output which is applied to the AND gate 520. Concurrently with the above, the peak detector 514 stores continuously the voltage level to which the positive-going ramp generator 510 is driven and the output voltage of the peak detector 514 is applied to the second comparator 516. The comparator 516 continuously produces an output since the voltage levels of the ramp generator 510 and the peak detector 514 are continuously increasing together and therefore are equal. Thus, the AND gate 520 is continuously enabled by the output of the comparator 516 while the AND gate 518 is continuously disabled thereby. Consequently, the signal output from the first comparator 512 activates the AND gate 520 and resets the flip-flop 504. The resetting of the flip-flop 504 resets the first positive-going ramp generator 510 back to its initial voltage level $V_P6$. However, the peak detector 514 stores the voltage level to which the first positive-going ramp generator 510 has been driven, i.e., $V_D3=V_P7$ (FIGURE 2*d*). The peak detector 514 voltage level $V_D3$ is effectively a measurement of the scanning time between the trailing edge of pulse $P_{22}$ and the end of the scan (FIGURE 2*b*). This measurement effectively establishes the lowest black in the character "M" as a reference level.

On the scan SC3 of the character "M," the AND gate 500 is activated by the absence of a black video signal and the ramp generator 506 is driven negatively from its hold voltage level $V_N8$ until reset by the multivibrator 502 which is triggered by the pulse $P_{23}$. Upon the reoccurrence of white video ($\bar{a}$) below the outline trace of the character, the ramp generator 506 is again driven negatively until an end of scan pulse (ESP) resets the flip-flop 504. The ramp generator 506 holds at the voltage level $V_N9$ to which it has been driven (FIGURE 2*d*). The setting of the flip-flop 504 drives the first positive-going ramp generator 510. When the voltage of the positive-going ramp generator 510 exceeds the voltage $V_N9$ of the negative-going ramp generator 506, the first comparator 512 produces an output to activate the AND gate 518. The AND gate 518 is activated because there is no output signal from the second comparator 516. There is no output from the second comparator 516 as long as the positive-going ramp generator 510 output voltage is less than the peak detector 514 voltage $V_D3$.

The activation of the AND gate 518 drives the second positive-going ramp generator 522 positively. When the voltage level of the first positive-going ramp generator 510 equals the voltage level $V_D3$ previously stored by the peak detector 514, i.e., $V_P7=V_D3$, the first comparator 512 deactivates the AND gate 518 and activates the AND gate 520. The activation of the AND gate 520 resets the flip-flop 504 which in turn resets the first positive-going ramp generator 510. The ramp generator 522 holds the voltage level ($V_P8=V_D3-V_N9$) to which it is driven. The voltage level $V_P8$ is effectively a measurement of the portion of the scan SC3 which occurred below the trailing edge of pulse $P_{23}$ (FIGURE 2*b*) but above the lowest black in the character "M," i.e., above the trailing edge of pulse $P_{22}$. This may be seen by considering the voltage difference ($V_N7-V_N9$) of the negative-going ramp generator 506 (FIGURE 2*d*) as a measurement of the scanning time spent below the outline trace of the character "M" but above the bottom of the scan line raster. The voltage difference ($V_N7-V_N8$) is the time spent in scanning between the lowest point in the left vertical stroke 36 (the lowest black in the character "M") and the end of the scan. Therefore, the voltage difference $V_D3-V_N9$ is the portion of the scanning time spent below the outline trace of the character "M" but above the lowest black in the character.

Thus, the bottom cavity detector 86 effectively utilizes the lowest black in a character as a reference level and measures the time spent in scanning to the right of and above this level, but below the outline trace of the character. Thus, each succeeding scan of the character "M" increases the voltage level of the second positive-going ramp generator 522. Therefore, the ramp generator 522 effectively integrates the time spent in scanning the bottom cavity 42 of the character "M" or measures the size of this cavity.

At the end of scanning the character "M," the final voltage $V_{BC}$ of the second positive-going ramp generator 522 exceeds the voltage level V by the predetermined amount $\Delta_7$ and the difference amplifier 526 produces an output denoting that a large bottom cavity (LBC) occurs in the character "M." The difference amplifier 524 does not produce an output denoting the absence of a small bottom cavity.

At the scan count of "3" (SC3), the transistor switch 530 is closed and the voltage $V_D3$ of the peak detector 514 is transferred to the capacitor 532.

At the end of scan seven (SC7), the AND gate 535 is enabled to sample the difference amplifier 534. The peak detector 514 voltage does not increase above the level $V_D3$ between the scans SC3 and SC7 since no black lower than the lowest point of the left vertical stroke 36 is detected during these scans. Thus, the difference amplifier 534 does not produce an output to set the flip-flop 536. The flip-flop 536 remains reset and thus denotes the presence of a bottom square corner (BSQ) in the character "M."

The bottom center cavity detector 537 of course detects a bottom center cavity for the character "M" but the major use for this detector is to differentiate between the leter "S" and the numeral "5." It is to be noted that in the center portion of the characters, the bottom stroke of the numeral "5" slopes or curves upwardly while the bottom stroke of the letter "S" remains substantially horizontal. Thus, the detector 537 will detect a bottom center cavity in the numeral "5" but not in the letter "S."

Feature Output Buffer Register and Control

*General description*

At the end of scanning a character, the features of the character detected by the various stroke and cavity feature detectors, as well as the width detectors, are transferred to the feature output buffer register 90 (FIGURE 4). The first step in the transferral or start feature readout operation is to determine which of the strokes A through D is the top or first stroke of the character. The stroke A, which is the first stroke detected in scanning a character, need not be the top stroke in the outline trace of a character. For example, the center diagonal stroke in the numeral "2" in some fonts extends more to the left than the top stroke in the character. It would therefore be detected first and tagged stroke (A) even though it is not the top stroke in the character. The sequence of strokes in the stroke tracker 64, however, is correct even though it may not be known which of these strokes is actually the first or top stroke in the character.

It is important that the first or top stroke in a character be correctly identified so that the stroke feature data, such as FORKS, JOINS, etc., be associated with the correct stroke to aid in the recognition of the character. For example, consider the numerals "2" and "5." Each character has three strokes as well as a JOIN and a FORK. However, the FORK and JOIN in each character are associated with different strokes as numbered from top to bottom. The second stroke in the numeral "5" begins as a FORK while the third stroke begins as a NEW stroke. However, in the numeral "2," the second stroke begins as a NEW stroke while the third stroke begins as a FORK. Additionally, the second stroke in the numeral "2" ends as a JOIN while in the numeral "5" it is the third stroke that ends as a JOIN. If the top or first stroke in these characters is not correctly identified so as to associate the right features with the correct strokes, a misreading can occur.

Thus, it is apparent that in the recognition of the characters in the reader 10, the correct identification of the first, second, etc., strokes of the characters is important.

*Feature Output Buffer Register Control*

Figure 16:
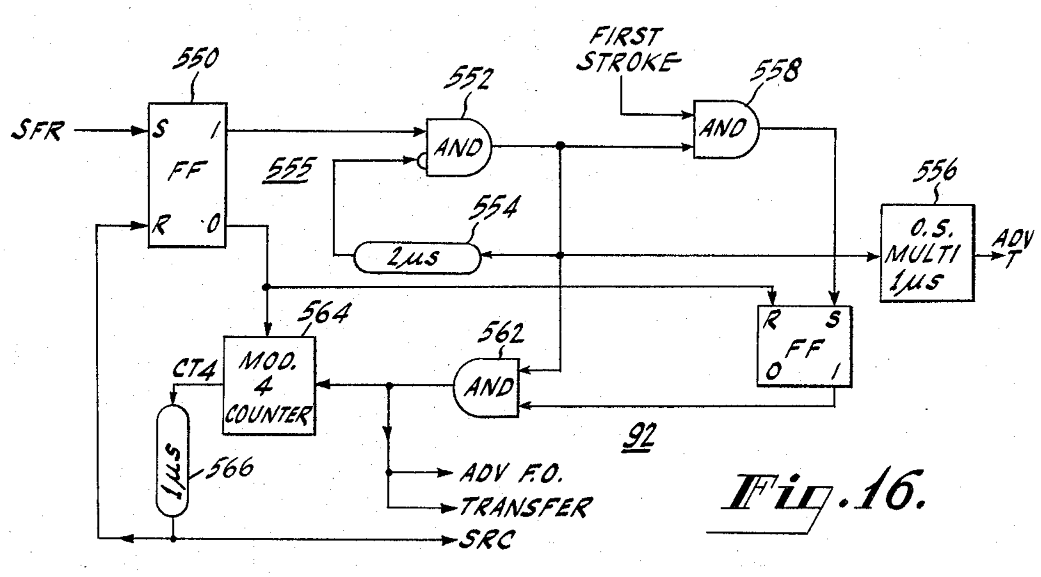
FIGURES 16, 17 and 18 are block diagrams of a feature output buffer register and a control circuit therefor which are utilized in the recognition circuit of FIGURE 4.

Referring now to FIGURE 16 a control circuit 92 for the feature output register 90 is shown. The control circuit 92 operates to provide the advance T pulses to cycle the stroke tracker 64 until the first stroke is detected. The stroke data and other feature signals are transferred to the output buffer register 90 (FIGURE 4) by the control circuit 92. The start recognition cycle of the character determining circuits 20 (FIGURE 1) is also initiated by the control circuit 92 (FIGURE 16).

The control circuit 92 includes an input flip-flop 550 which is set by a start feature readout (SFR) signal derived from the character control circuit at the end of scanning a character. The "1" output terminal of the flip-flop 550 is coupled to one input terminal of an AND gate 552. The output of the AND gate 552 is coupled through a delay circuit 554 to the other input of the AND gate 552, which is an inhibit input terminal. Thus, the flip-flop 550, AND gate 552 and delay circuit 554 function as an oscillator 555 in which the setting of the flip-flop 550 causes an output pulse to be produced which inhibits the AND gate 552 after a 2 μs. delay. The AND gate 552 is again activated at the termination of the output pulse and the process repeats itself. The output of the AND gate 552 is coupled to a one-shot multivibrator 556. The one-shot multivibrator 556 is triggered to produce an advance T pulse on the trailing edge of the output pulse of the oscillator 555.

The output of the AND gate 552 is also coupled to one input of an AND gate 558. The other input to the gate 558 comprises a first stroke signal derived from the feature output register 90 when the top or first stroke of a character is ascertained. The activation of the AND gate 558 sets a flip-flop 560. The "1" output terminal of the flip-flop 560 as well as the output pulses of the oscillator 555 are coupled to an AND gate 562. The AND gate 562 is coupled to a MOD 4 counter 564. A count of "4" (CT4) in the counter 564 produces an output which is applied to a second delay circuit 566. The output of the delay circuit 566 is fed back to reset the input flip-flop 550.

Thus, the pulse output of the oscillator 555 produces advance T pulses for cycling the stroke tracker 64. When the first stroke is found, the pulse output of the oscillator 555 provides advance pulses (adv F.O.) for the feature output buffer register 90 to transfer stroke data thereto. The advance pulses for the register 90 are counted in the counter 564 and at a count of "4" (CT4) the input flip-flop 550 is reset and a start recognition cycle (SRC) signal is generated.

*Feature Output Buffer Register*

Figure 17:
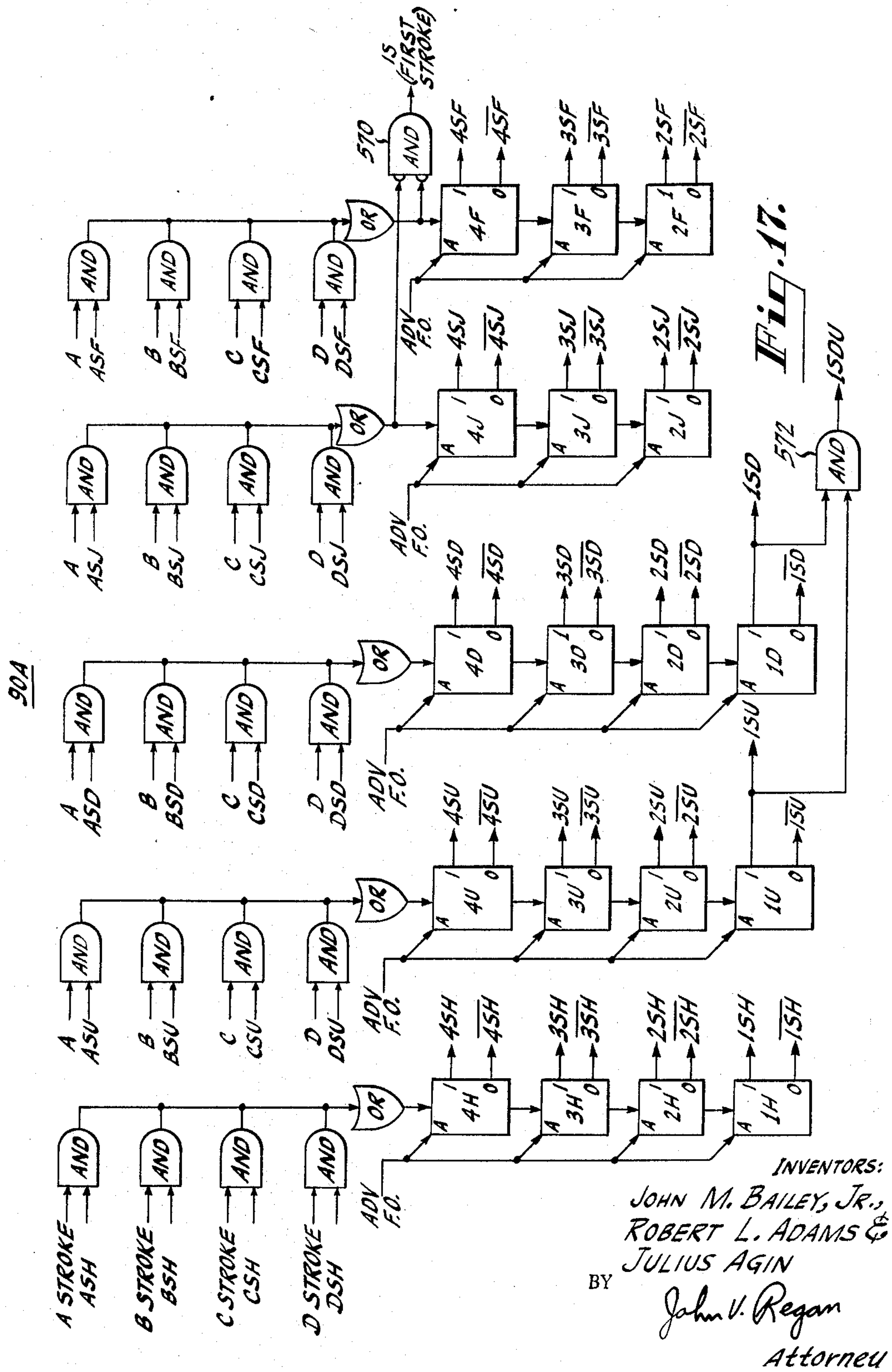

The feature output buffer register 90 is composed of two parts. The first part 90A is shown in FIGURE 17 and includes a plurality of AND gates arranged in rows and columns. There are four rows of AND gates, one for each of the strokes A through D that could be detected in scanning a character, and five columns of AND gates, one for each of the five stroke features detected in the decoders 66, 68, 70 and 72, and direction analyzers 74, 76, 78 and 80. The first column is a HORIZONTAL (H) feature column and the AND gates are coupled to the corresponding flip-flops which store this feature in the stroke direction analyzers. Thus, the AND gate in the first row and first column is an A stroke gate which is enabled by the "1" output of the flip-flop 434 in the A stroke direction analyzer 74 (FIGURE 12). The gate is activated when the input AND gate 360 in the A stroke decoder 66 (FIGURE 11) is activated by the A stroke code being stored in the last active stage of the stroke tracker 64. The other gates in this column are connected to corresponding circuits. The remaining columns in FIGURE 17, reading from left to right, are UP (U), DOWN (D), JOIN (J) and FORK (F) feature columns. The AND gates in these columns are similarly connected to their corresponding circuits.

Each column of AND gates is coupled through an OR gate to the serial input of a shift register. The HORIZONTAL or first column shift register includes four stages of flip-flops labelled 1H, 2H, 3H and 4H from bottom to top. The UP and DOWN shift registers in the second and third columns also include four stages of flip-flops similarly labelled.

The JOIN and FORK shift registers, i.e., the fourth and fifth column registers, include only three stages of flip-flops since the first or top stroke in a character is the one stroke in a character which cannot contain a JOIN or a FORK. Thus, the fourth stage flip-flops are not required.

Advance F.O. pulses derived from the buffer register control circuit 92 (FIGURE 16) are applied to the common advance terminal of each shift register. When a flip-flop in one of the shift registers is set, the "1" output indicates the presence of a particular stroke feature. Alternatively, if the flip-flop is reset, the "0" output indicates the inverse of this stroke feature.

The OR gates in the JOIN and FORK columns are also coupled to the inhibit input terminals of an AND gate 570. The output of the gate 570 indicates that the first or top stroke of a character has been detected because there is no FORK or JOIN present. Additionally, the "1" output terminals of the first stroke UP flip-flop (1U) and the first stroke DOWN flip-flop (1D) are coupled to an AND gate 572. An output from the gate 572 indicates that the first stroke direction was both DOWN and UP, (1SDU).

Figure 18:
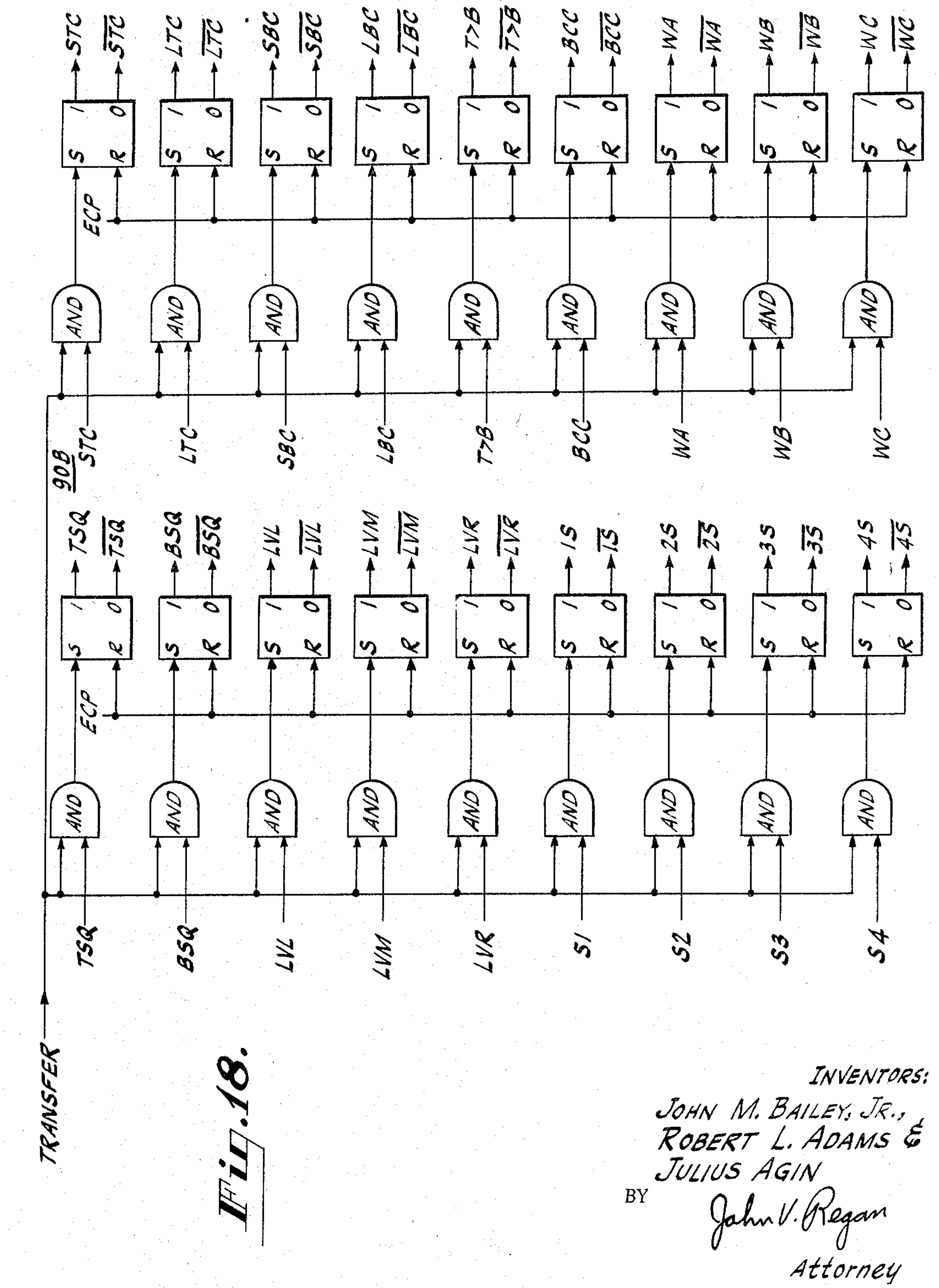

The second part 90B of the feature output buffer register is shown in FIGURE 18 and includes a plurality of flip-flops to store the remaining features of the character. The features are transferred from their respective feature detectors to the flip-flops by a plurality of AND gates which are activated by a transfer signal from the buffer register control circuit 92 (FIGURE 16).

*Operation of Feature Output Buffer Register*

It will be assumed that the signals corresponding to the numeral "2" are to be transferred to the feature output buffer register 90. The first step in the readout operation is to ascertain which of the strokes stored in stroke tracker 230 (FIGURE 9) at the end of scanning a character is the top or first stroke of the character. It will be recalled that at the end of scanning the numeral "2," the sequence of strokes in the stroke tracker 230 is (C'B'A'D) (line 21, FIGURE 13). Since the stroke A code is stored in the last active stage $T_3$ of the stroke tracker 230, the AND gates for stroke A in the first row of each column in the buffer register 90 (FIGURE 17) will be enabled by the output of the gate 360 (FIGURE 11). However, the AND gates in the FORK and JOIN columns will not be activated because no JOIN or FORK occurs in stroke A (stroke 30, FIGURE 3*a*). None of the other AND gates in the JOIN or FORK columns are activated because their stroke codes do not appear in the last active stage $T_3$ of the stroke tracker 230. Thus, the AND gate 570 (FIGURE 17) is activated and a first stroke enabling signal is applied to the AND gate 558 in the buffer register control circuit 92 (FIGURE 16).

At the end of the sixteenth scan (the scan after SCM in FIGURE 3*b*), a start feature readout (SFR) signal is generated in the character control circuit 52 (FIGURE 5). The flip-flop 550 in the buffer register control circuit 92 (FIGURE 16) is set and the oscillator 555 generates a 2 μs. pulse. On the leading edge thereof, the AND gate 558 is activated to set the flip-flop 560 and produce an advance F.O. pulse. The stroke A features from the feature detectors are coupled through the first row AND gates and advanced into the column shift register (FIGURE 17). Only the 4U flip-flop stage in the second column or UP shift register goes high due to the stroke A direction measurement of UP.

The output pulse of the AND gate 562 (FIGURE 16) also produces a transfer signal which transfers the other feature signals derived from scanning the numeral "2" into the buffer register part 90B (FIGURE 18). The counter 564 counts the first pulse from the oscillator 555.

The trailing edge of the output pulse from the oscillator 555 generates an advance T in the multivibrator 556. Thus, the B stroke code is advanced to the $T_3$ stage of the stroke tracker 230 and the B stroke or second row AND gates in the buffer register (FIGURE 17) are activated. The second advance F.O. pulse advances the B stroke features into the column shift registers. The C stroke features are similarly advanced into the column shift registers. A fourth advance F.O. pulse is generated even though four strokes have not been detected in the numeral "2" so as to position the stroke features in the correct stages of the column shift registers. When the fourth advance F.O. pulse is generated, the delayed output level of the counter 564 resets the flip-flop 550 preventing the further generation of advance F.O. pulses. Additionally, the delayed output level of the delay circuit 566 comprises a start recognition cycle (SRC) signal which starts the recognition cycle in the character determining circuits 20.

CHARACTER DETERMINING CIRCUIT

*General Description*

Figure 19:
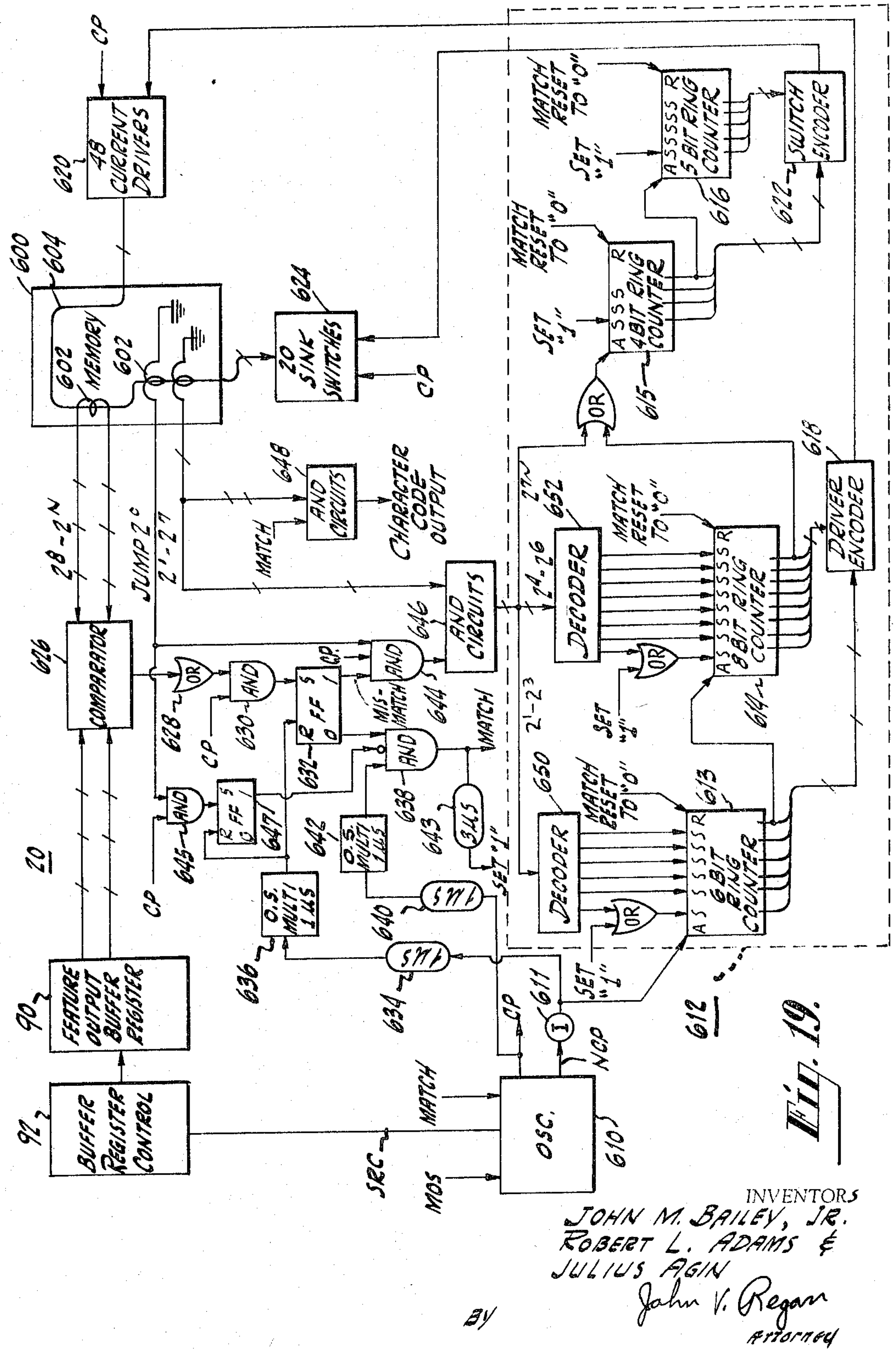
FIGURE 19 is a block diagram of the character determining circuit of FIGURE 1.

The various detected feature signals stored in the feature output buffer register 90 are applied to a character determining circuit 20, shown in FIGURE 19, in order to recognize the character scanned. Recognition is based upon matching the detected feature signals in the buffer register 90 with feature signals stored in a memory 600. These stored feature signals describe or define each character in term of the features of the character. Storing a description of each character in the memory 600 is complicated by the fact that most characters include one or more features which may or may not be detected when the character is scanned. For example, when scanning, a 0, C, 6, etc., a long vertical left (LVL) stroke may or may not be detected. This is in contrast to an M, H, L, etc., where a long vertical left stroke is positively present or an X, 2, S, etc., where it is positively absent. To accommodate the "present," "absent" and "may be present" classifications of a feature, a ternary notation 1, 0 and X, respectively, is here utilized and the memory 600 is here selected to implement these classifications.

Figure 20:
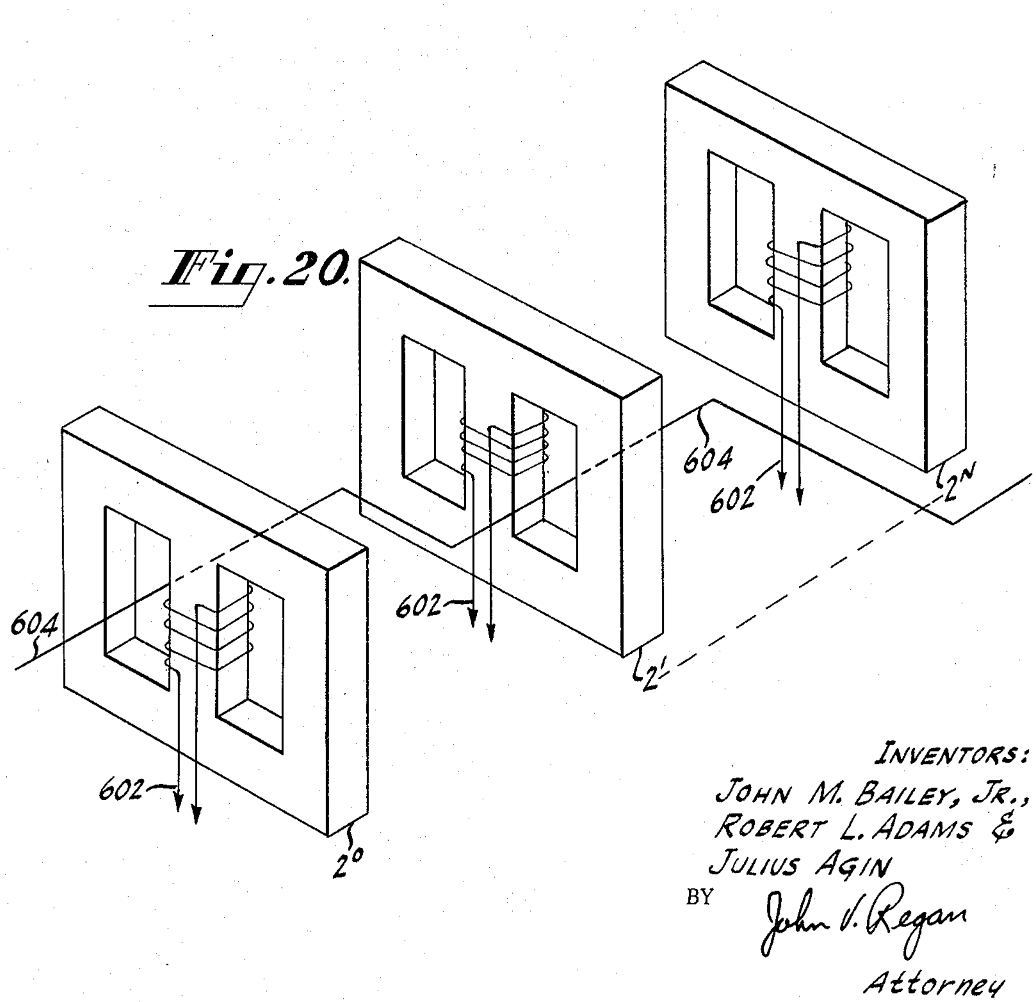
FIGURE 20 is an isometric view of a group of magnetic cores utilized in the memory of the character determining circuit of FIGURE 19; and, FIGURE 21, comprising

The memory 600 in the exemplary embodiment comprises a "read-only" memory which includes a plurality of two apertured "E" cores, a group of which is shown in FIGURE 20. Such read-only memories have been fully described in a copending application entitled "Read-Only Memory," by Chia Ying Hsueh and Henry P. Cichon, Serial No. 232,388, filed October 23, 1962, and assigned to the same assignee as the present application.

Each E-core, labelled $2^0$ through $2^N$ in FIGURE 20, includes a sense or secondary winding 602 wound around the center leg of the core and a primary or drive winding 604 threaded through either one or neither of the apertures of each core. If a primary or drive winding 604 is threaded through one aperture of an E-core, a drive current applied to the primary winding 604 causes a voltage of one polarity to be induced in the secondary or sense winding 602. Such one polarity voltage is used to denote a "1" or present signal. If the drive winding 604 is threaded through the other aperture, a drive current induces a voltage of the opposite polarity in the sense winding 602. Such opposite polarity voltage denotes a "0" or absent signal. If the drive winding 604 is threaded through neither of the apertures, no voltage is induced in the sense winding 602 and this absence of voltage denotes an "X."

A separate E-core is utilized to store each different feature that can be detected in a character. A description of a character is provided in the memory 600 by threading a drive winding 604 through the one aperture of an E-core if the particular feature represented by that core is absolutely present; through the other aperture of the next E-core if the next feature is absolutely absent; outside the next E-core if the next feature may be present; and so on, until the drive winding passes through or outside all of the E-cores. It is therefore apparent that the memory 600 is "word organized" and includes a drive winding 604 for each different character word.

To avoid searching the entire memory 600 (pulsing each drive winding 604 in turn), the character descriptions or words stored in the memory 600 are arranged in groups where each word of any group has a set of selected features in common with the other words of its group. Thus, each group has its own individual set of common features. A separate jump word, as described hereinafter, is stored to guard each group. Each jump word stores the common set of features of its individual group. The feature signals stored in the feature output buffer register 90 are compared against the features of the jump words guarding the different groups of alpha-numeric characters. Each successive jump word is compared in turn and when the matching group is located, each alpha-numeric word in that group then is searched one after the other until a match is obtained between the features from buffer 90 and from memory 600.

The grouping of characters with common features may be understood by referring to FIGURE 21 which is a truth table for recognizing characters printed on a document by an IBM Selectric typewriter utilizing a Manifold 10 font. It is to be noted that in each of the groups there are one or more features which are common to each alpha-numeric character in the group. Thus, for example, in Group III, the common feature is that each character is a one stroke (1S) character.

*Detailed description*

The character determining circuit 20 shown in FIGURE 19 includes a clock source such as a 250 kilocycle oscillator 610 which is activated by a start recognition cycle (SRC) signal from the feature output buffer register control circuit 92. The oscillator 610, when activated, produces a train of clock pulses CP which may comprise the positive half cycles of the output waves of the oscillator 610. The negative half cycles (NCP) of the output waves are inverted in an inverter 611 to provide the advance pulses to drive memory address selection circuits 612 sequentially. The memory address circuits 612 may, for example, include a plurality of multi-stage ring counters 613, 614, 615 and 616. The ring counters 613 and 614 are coupled to an encoder 618 to sequentially select successive ones of a plurality of current drivers 620. Similarly, the ring counters 615 and 616 are coupled to an encoder 622 to select corresponding ones of a plurality of sink switches 624. It is assumed that 960 words are stored in the memory 600 and thus twenty sink switches 624 and forty-eight current drivers 620 are utilized to select a desired one of the 960 (20×48) drive windings 604. Thus, each current driver 620 is coupled to all the input terminals of twenty different drive windings 604 while each sink switch 624 is coupled to all the output terminals of forty-eight drive windings 604. Both the current drivers 620 and sink switches 624 are clocked by the train of clock pulses (CP).

The counters 613 and 614, respectively, include six flip-flop stages and eight flip-flop stages connected as ring counters. A count of "1" is initially set into each counter. The inverted negative clock pulses are applied to the common advance terminal of the counter 613 to increase the count by one upon each successive advance pulse. The count of six output terminal of the counter 613 is coupled to the common advance terminal of the ring counter 614 to advance the counter 614 by one for each count of six in the counter 613. The encoder 618 comprises a 6 x 8 diode matrix encoder to sequentially address the current drivers 620. Analogously, the counters 615 and 616 are, respectively, four-stage and five-stage ring counters. The sink switch encoder 622 may therefore comprise a 4 x 5 diode matrix encoder to sequentially address the sink switches 624.

The memory 600 stores both jump words and alpha-numeric character words. The $2^0$ core may be selected to comprise the jump core. Thus, in a jump word a "1" is stored in this core to provide a jump signal whereas in an alpha-numeric word a "0" is stored in this core. The next seven cores, $2^1$–$2^7$, are the character identification code, or machine language code, in the alpha-numeric words. However, these cores in a jump word are selected to store the amount by which the memory address selection circuits 612 must be incremented to jump to the next jump word. The remaining cores $2^8$–$2^N$ in an alpha-numeric word store the features which describe the word. Analogously, these cores in a jump word store the features which are common to the group which the jump word is guarding. Thus, the jump word guarding the characters in Group III of the truth table of FIGURE 21 would only have a drive winding 604 threaded through the "1" aperture of the E-core which represents one stroke (1S) and the drive winding 604 would pass outside of the remaining $2^8$–$2^N$ cores.

An (N–8) stage comparator 626, one stage for each feature that may be detected, compares the features stored in the memory 600 with the features detected and stored in the flip-flop stages of the feature output buffer register 90. The sense winding 602 of each of the $2^8$–$2^N$ cores is coupled to its corresponding comparator 626 stage and both the "1" and "0" output terminals of the corresponding flip-flop in the register 90 are also coupled to the same stage. The comparator 626, which is a known circuit, produces no output when the voltage induced in the sense windings 602 is of the same polarity as the voltage applied from the flip-flops in the register 90. Thus, if a "1" is stored in a core and the corresponding flip-flop in the register 90 is set, no output is produced by the comparator 626. When a "0" is stored in a core and the corresponding buffer flip-flop is set thus storing a "1," the comparator 626 provides an output signal. When an "X" is stored in a core, i.e., the drive winding 604 passes through neither of the apertures in the core, the absence of an induced voltage in the sense winding 602 does not apply a signal and no output is produced by the comparator 626 regardless of the condition of the corresponding flip-flop in the register 90. Thus, the comparator 626 only produces an output when a complete mismatch occurs. This aspect permits the comparator 626 to compare the single active sense winding 602 for the jump word for Group III in FIGURE 21 solely against the one stroke (1S) flip-flop in the register 90.

The output terminals of all of the stages of the comparator 626 are coupled through an OR gate 628 to an AND gate 630. The AND gate 630 is clocked by the clock pulses (CP). The output terminal of the AND gate 630 is coupled to the set terminal of a flip-flop 632. The setting of the flip-flop 632 indicates that a MISMATCH occurred. The flip-flop 632 is reset by the inverted negative clock pulses which are applied from the inverter 611 through a delay circuit 634 and a one-shot multivibrator 636 to the reset terminal of the flip-flop 632. The "0" output terminal of the flip-flop 632 is coupled to one input of an AND gate 638. The AND gate 638 is clocked by the clock pulses (CP) which are applied through a delay circuit 640 and a one-shot multivibrator 642 to the other input terminal of the gate 638. An output signal from the AND gate 638 indicates that a MATCH occurs. The MATCH signal clears the counters 613, 614, 615 and 616 to zero and also deactivates the oscillator 610. The MATCH signal is also applied to a delay circuit 643 to derive a signal to set the counters 613 through 616 to a count of "1."

One terminal of the sense winding 602 of the jump or $2^0$ core is grounded while the other terminal is coupled to one input of each of a pair of AND gates 644 and 645. The other inputs to the AND gate 644 comprise a MISMATCH signal from the flip-flop 632 and the clock pulses (CP). Thus, the AND gate 644 only produces an output when a MISMATCH occurs and a "1" is stored in the $2^0$ core only in a jump word so that only mismatched jump words can cause an output from the AND gate 644. The other input to the AND gate 645 is a clock pulse (CP). The AND gate 645 is activated when a "1" is stored in the jump core $2^0$ and is coupled to set a flip-flop 647. The flip-flop 647 is reset by a delayed inverted negative clock pulse. The "1" output terminal of the flip-flop 647 is coupled to inhibit the AND gate 638 to prevent a MATCH signal from being produced by a jump word that matches the features in the buffer register 90.

One terminal of each of the sense windings of the cores $2^1$–$2^7$ is grounded while the other terminals of these cores are coupled to AND circuits 646 and 648. The other input to the AND circuits 648 comprises a MATCH signal while the second input to the AND circuits 646 comprises the mismatched jump output of the AND gate 644.

The AND circuits 648 comprise seven parallel AND gates which, when activated by a MATCH signal, produce the machine language code for the recognized character. The AND circuits 646 also comprise seven parallel AND gates and when activated by a MISMATCH signal produce the binary number necessary to increment the memory address selection circuits 612 by an amount necessary to advance to the next jump word. Thus, the gates in the AND circuits 646 corresponding to the $2^1$–$2^3$ cores are coupled to a decoder 650 which in turn is coupled to increment the ring counter 613. Similarly, the $2^4$–$2^6$ gates in the AND circuits 646 are coupled to a decoder 652 which in turn is coupled to increment the ring counter 614. Finally, the remaining or $2^7$ gate of the AND circuits 646 is coupled through the OR gate 654 to the advance terminal of the ring counter 615. Thus, depending on the settings of the $2^1$–$2^7$ cores in a jump word, the memory address selection circuits 612 can be incremented up to a count of forty-eight. If larger jumps are required, an additional decoder may be coupled to the ring counter 615.

*Operation*

After a character is completely scanned and then properly positioned in the feature output buffer register 90, a start recognition cycle (SRC) signal from the feature output buffer register control circuit 92 activates the oscillator 610. The oscillator 610 produces a memory operating signal (MOS) which inhibits the AND gate 118 in the character control circuit 52 (FIGURE 5). This prevents a start feature readout (SFR) signal from being generated by the next character being scanned while recognition of the present character is being determined in the character determining circuit 20.

The memory address selection circuits 612 are set to address the first word in the memory 600 by the MATCH signal from the previous character. The first clock pulse (CP) causes the driving winding 604 of the first word to be pulsed and the signals from the sense windings 602 of the word are applied to the comparator 626. The first word in the memory 600 may, for example, be the letter "I" in Group I of FIGURE 21. Assuming that the letter "L" in Group III is the character to be recognized, the comparator 626 produces an output signal which sets the flip-flop 632 and produces a MISMATCH signal. No jump word is used to guard the sole letter "I" in Group I. Therefore, a "0" is stored in the jump core $2^0$ of the letter "I" and the AND circuits 644 and 646 are not activated.

The inverted negative clock pulse on the next half cycle of the oscillator 610 advances the ring counter 613 to a count of "2" and, after a delay, resets the flip-flops 632 and 645. The next positive half cycle of the oscillator 610 produces the next clock pulse (CP). The jump word guarding Group II is therefore read. The jump word for this group stores the common features shown in FIGURE 21 for this group. These features are not matched by the detected features of an "L." The comparator 626 therefore produces an output which sets the flip-flop 632.

The AND gate 644 is activated by the "1" stored in the jump core $2^0$ and the MISMATCH signal from the flip-flop 632. Therefore, the AND circuits 646 are also activated and the number stored in the cores $2^1$–$2^7$ of the jump word for Group II is applied through the decoders 650 and 652 to increment the selection circuits 612. The selection circuits 612 are therefore incremented to read the jump word guarding the Group III at the next clock pulse (CP).

The character "L" occurs in Group III so the jump word guarding this group does not produce an output from the comparator 626. Therefore, the flip-flop 632 remains reset. However, the "1" stored in the jump core $2^0$ for this jump word sets the flip-flop 647 and applies an inhibit signal to the inhibit terminal of the AND gate 638. Thus, the AND gate 638 is not activated by the delayed clock pulse (CP) and does not produce a MATCH signal.

The next inverted negative clock pulse therefore advances the memory address selection circuit 612 by one and the letter "J" in Group III (FIGURE 21) is read. This letter produces a MISMATCH signal but a "0" is stored in the jump core $2^0$ of this word so othe AND gate 644 is disabled. The next clock pulse therefore drives the winding for the letter "J," and since this word is the one stored in the buffer register 90, no output is produced in the comparator 626. The flip-flops 632 and 645 remain reset and the AND gate 638 is activated by the delayed clock pulse to produce a MATCH signal. The MATCH signal activates the AND circuits 648 to read out from the cores $2^1$–$2^7$ the character code for the letter "J." The coded output is directly useable by a computer. The MATCH signal also sets the ring counters 613, 614, 615 and 616 to a count of "1" and deactivates the oscillator 610. The feature signals from the next character may then be advanced into the buffer register 90.

The jump aspect of the circuit 20 permits the memory 600 to be scanned rapidly to identify a character. This is particularly important where the feature signals of characters from a variety of fonts are stored in the memory 600. The capacity of the memory 600 permits a large number of fonts to be stored therein and the character recognition circuits 19 are capable of recognizing characters from a wide variety of standard fonts. Thus, the same font need not be used for each input document.

*Summation*

Thus, the character reader described extracts selected topographical features from the outline trace of a character to provide a manifestation of the identity of the character. The selected topographical features include stroke, cavity, and width features. Such features are reliable in differentiating one character from another and are universal in that the same features may be extracted from the outline traces of characters printed by a wide variety of different fonts. Characters including serifs may be read by introducing a filter into the input to the feature recognition circuits 18 to filter the video so as to eliminate the narrow width pulses caused by the serifs. Thus, the character reader may be programmed to recognize characters from a variety of standard fonts permitting great flexibility in the use of the reader. A character reader constructed as described above exhibited a reading rate of 10 lines per second for original input page size documents.

What is claimed is:

1. In a character reader for reading alpha-numeric characters from a document, different ones of said characters being formed of different outline traces on said document, the outline traces of said characters exhibiting a plurality of topographical features including strokes, said character reader including means for scanning successive ones of said characters by a plurality of scans to derive video signals representing the topography of said characters, the combination comprising, means for analyzing said video signals to detect strokes in a character, a stroke tracker having a plurality of positions with each containing a differently coded signal for tagging each detected stroke with a different label, and means for succesively positioning each of said coded signals into a prescribed position in said stroke tracker on every scan to signal the successive redetections of the strokes corresponding to said coded signals so as to track each of said detected strokes from scan to scan.

2. In a character reader for reading characters from a document, different ones of said characters being formed of different outline traces on said document, the outline traces of said characters exhibiting a plurality of topographical features including strokes, said character reader including means for scanning successive ones of said characters by a plurality of scans to derive video signals representing the topography of said characters, the combination comprising, means for detecting pulses in said video signals to detect strokes in a character, means for comparing pulses in successive scans of a character to generate stroke information signals for each stroke detected in said character, a plurality of stroke analyzing circuits, one for each stroke in a character, for analyzing said stroke information signals, a stroke tracker having a plurality of positions with each containing a differently coded signal for tagging each detected stroke with a different label, means for successively positioning each of said coded signals into a prescribed position in said stroke tracker on every scan to signal the successive redetections of the strokes corresponding to said coded signals so as to track each of said detected strokes from scan to scan, a plurality of gates, each one coupled to a different stroke analyzing circuit, for coupling said stroke information signals to said stroke analyzing circuits, each of said gates being activated by a different one of said coded signals, and means for applying each successive coded signals in said prescribed position to all of said gates to pass the stroke information signals from a detected stroke into its corresponding stroke analyzing circuit.

3. In a character reader for reading characters from a document, different ones of said characters being formed of different outline traces on said document, the outline traces of said characters exhibiting a plurality of topographical features including strokes, said character reader including means for scanning successive ones of said characters by a plurality of scans to derive video signals representing the features of said character, the combination comprising, means for analyzing said video signals to detect strokes in a character, means for tagging each detected stroke with a differently coded signal, and means for successively positioning each of said coded signals into a prescribed position upon the reoccurrences of the strokes corresponding to said coded signals.

4. In a character reader for reading characters from a document, different ones of said characters being formed of different outline traces on said document, the outline traces of said characters exhibiting a plurality of topographical features including strokes, said character reader including means for scanning successive ones of said characters by a plurality of scans to derive video signals representing the features of said character, the combination comprising, means for detecting pulses in said video signals to detect strokes in a character, means for comparing pulses in successive scans of a character to generate stroke information signals for each stroke detected in said character, a plurality of stroke analyzing circuits, one for each stroke in a character, for analyzing said stroke information signals, a multi-level stroke tracking shift register having a plurality of stages corresponding to the number of strokes in a character with each stage set to contain a differently coded signal for tagging each stroke detected in a character, a first plurality of gates for separately coupling back the output of each stage of said shift register to the input of the first stage thereof, means coupled to said shift register for activating a corresponding gate as each stroke is detected in a character so that the number of active stages in said shift register equals the number of strokes detected in said character, a second plurality of gates, each one coupled to a separate stroke analyzing circuit, for coupling said stroke information signals to said stroke analyzing circuits, each of said second plurality of gates being activated by a different one of said coded signals, means coupled to said shift register to shift successively said coded signals into a prescribed stage of said shift register when the strokes corresponding to said coded signals are redetected so as to track each detected stroke from scan to scan, and means for coupling the coded signal in said prescribed stage to all of said second plurality of gates to pass the stroke information signals from a detected stroke to the stroke analyzing circuit corresponding to said detected stroke.

5. In a character reader for reading characters from a document, different ones of said characters being formed of different outline traces on said document, portions of said outline traces forming cavities of partially bounded document areas in some characters, said character reader including means for scanning said characters by a plurality of scans, the combination comprising, means for locating an extremity of the portion of an outline trace forming a cavity in a character, and means for measuring in each scan after locating said extremity the time spent in scanning between said extremity and the outline trace of said character so as to provide an indication of the size of said cavity.

6. In a character reader for reading characters from a document, different ones of said characters being formed of different outline traces on said document, portions of said outline traces forming cavities of partially bounded document areas at the top of some characters, said character reader including means for scanning successive ones of said characters by a plurality of vertical scans, the combination comprising, means for locating the highest point of an extremity of the outline trace of a character, and means for measuring in each scan after locating the highest point of said extremity the time spent in scanning below said highest point and above the outline trace of the character so as to provide an indication of the size of the top cavity of said character.

7. In a character reader for reading characters from a document, different ones of said characters being formed of different outline traces on said document, portions of said outline traces forming cavities of partially bounded document areas at the bottom of some characters, said character reader including means for scanning successive ones of said characters by a plurality of vertical scans, the combination comprising, means for locating the lowest point of an extremity of the outline trace of a character, and means for measuring in each scan after locating the lowest point of said extremity the time spent in scanning above said lowest point and below the outline trace of a character so as to provide an indication of the size of the cavity.

8. In a memory for a character reader for storing a plurality of feature signals representing the topographical features formed by the outline traces of alpha-numeric characters, the combination comprising, means for storing in said memory a plurality of words of two sets, each different word in one of said sets comprising a plurality of feature signals corresponding to the topographical features which define one of said alpha-numeric characters, means for dividing into separate groups words in said one set which exhibit common topographical feature signals, and means for storing at the beginning of each group a word of another set which includes the topographical feature signals common only to the group.

9. In a character reader for reading alpha-numeric characters from a document, different ones of said characters being formed of different outline traces on said document, the outline traces of said characters exhibiting a plurality of topographical features, said character reader including means for scanning successive ones of said characters by a plurality of scans to derive video signals generated by the topographical features of said characters, the combination comprising, means for extracting from said video signals a plurality of feature signals representing the topographical features of a character, a memory for storing feature signals coresponding to the topographical features of said characters, said feature signals being stored in said memory, word by word, with each word defining a different alphanumeric character, said alpha-numeric words being divided into separate groups in said memory based on the occurrence of common topographical feature signals within a group, means for storing a separate jump word to guard each group of alpha-numeric characters, said jump words comprised of the common topographical feature signals of a group of alpha-numeric words, memory address selection circuits coupled to said memory for addressing in succession said jump words and said alpha-numeric words, means for comparing the extracted features of a scanned character against the common stored topographical feature signals in a jump word guarding a group of alpha-numeric character words in said memory, and means for advancing said memory address selection circuits by increments to successive jump words when a mismatch occurs between the stored feature signals and the extracted feature signals.

10. In a character reader for reading characters from a document, different ones of said characters being formed of different outline traces on said document, the outline traces of said characters exhibiting a plurality of topographical features including strokes, said character reader including means for scanning successive ones of said characters by a plurality of scans to derive video pulses serially representing the stroke features of said character, the combination comprising, means coupled to said scanning means for generating stroke information signals when a stroke begins by itself, begins as a fork from another stroke, ends by itself, and ends as a join to another stroke, the top stroke of each character being defined as one which begins and ends by itself, shift register means coupled to said generating means for storing said stroke information signals, and means for cycling said shift register means until stroke information signals derived from the top stroke of a character appear in a prescribed position in said shift register.

11. In a character reader for reading characters from a document, different ones of said characters being formed of different outline traces on said document, the outline traces of said characters exhibiting a plurality of topographical features including stroke features, said character reader including means for scanning successive ones of said characters by a plurality of scans to derive video signals representing the strokes of said character, a stroke tracker comprising the combination of, a multilevel shift register having a plurality of stages with each stage set to contain a different code for labeling each stroke detected in a character, means coupled to said shift register for activating a stage of said shift register each time a different stroke is detected so that the number of active stages in said shift register equals the number of strokes detected in a character, and means coupled to said shift register to shift the code of a stroke to a prescribed stage in the shift register when the stroke is redetected so that each stroke of a character is tracked from scan to scan throughout the scanning of a character.

12. In a character reader for reading characters from a document, different ones of said characters being formed of different outline traces on said document, the outline traces of said characters exhibiting a plurality of topographical features including stroke features, said character reader including means for scanning successive ones of said characters by a plurality of scans to derive video signals representing the strokes of said character, the combination comprising, a counter having a plurality of stages coupled to said scanning means for counting the number of strokes detected in a character, a stroke tracking shift register for coding each stroke in a character when it is first detected and tracking the stroke by its code as it is redetected in the remaining scans of a character, said shift register including a plurality of multi-level stages with each stage having an advance terminal common to all the levels in the stage, said shift register stages coupled in tandem and each stage set to store a different code, a plurality of gated feedback circuits, each one coupled from the output of a different stage of said shift register back to the input of the first stage thereof, means coupling successive stages of said counter to successive ones of said feedback circuits to gate open the feedback circuit corresponding to the count in said counter and gate closed the other feedback circuits, gate means coupling said counter to the advance terminals of said shift register stages with the number of advance terminals gated open equal to the count of strokes in said counter, and means for applying stroke feature signals to said gate means to advance the code of the stroke which generated the feature signal to the first stage of said shift register and thereby track each stroke from scan to scan.

References Cited by the Examiner

UNITED STATES PATENTS

| | | | |
|---|---|---|---|
| 2,889,535 | 6/1959 | Rochester et al. | 340—146.3 |
| 3,178,687 | 4/1965 | Perotto | 340—146.3 |
| 3,178,688 | 4/1965 | Hill et al. | 340—146.3 |
| 3,210,729 | 10/1965 | Lozier et al. | 340—146.3 |
| 3,213,423 | 10/1965 | Congleton | 340—146.3 |

MAYNARD R. WILBUR, *Primary Examiner.*

DARYL W. COOK, MALCOLM A. MORRISON, *Examiners.*

J. S. IANDIORIO, J. E. SMITH, *Assistant Examiners.*